(12) United States Patent
Youb et al.

(10) Patent No.: US 12,737,804 B2
(45) **Date of Patent: *Sep. 15, 2026**

(54) METHOD FOR CREATING COMMODITY ASSETS FROM UNREFINED COMMODITY RESERVES UTILIZING BLOCKCHAIN AND DISTRIBUTED LEDGER TECHNOLOGY

(71) Applicant: Stichting IP-Oversight, Lutebroek (NL)

(72) Inventors: Christopher Youb, Edmonton (CA); Bruce Youb, Puerto Plato (DO)

(73) Assignee: Stichting IP-Oversight, Lutjebroek (NL)

( * ) Notice: Subject to any disclaimer, the term of this patent is extended or adjusted under 35 U.S.C. 154(b) by 81 days.

This patent is subject to a terminal disclaimer.

(21) Appl. No.: 18/432,729

(22) Filed: Feb. 5, 2024

(65) Prior Publication Data

US 2024/0296493 A1 Sep. 5, 2024

Related U.S. Application Data

(63) Continuation of application No. 17/537,450, filed on Nov. 29, 2021, now Pat. No. 11,893,626, which is a (Continued)

(51) Int. Cl.

*G06Q 10/10* (2023.01)
*G06F 16/18* (2019.01)

(Continued)

(52) U.S. Cl.

CPC ..... *G06Q 30/0645* (2013.01); *G06F 16/1805* (2019.01); *G06F 21/64* (2013.01);

(Continued)

(58) Field of Classification Search

CPC ............. G06Q 30/0645; G06Q 20/065; G06Q 20/38215; G06Q 20/401; G06Q 30/02;

(Continued)

(56) References Cited

U.S. PATENT DOCUMENTS 7,139,730 B1 * 11/2006 Shimko .................. G06Q 40/03 705/37
7,788,154 B1 * 8/2010 Jones ..................... G06Q 40/06 705/36 R (Continued)

*Primary Examiner* — Jonathan P Ouellette

(74) *Attorney, Agent, or Firm* — Hoffberg & Associates; Steven M. Hoffberg

(57) ABSTRACT

A token system and method, employing a token representing an interest in a smart contract, comprising: a distributed ledger, storing parameters of a smart contract, the smart contract representing an agreement, secured by a security interest in property, to execute the security interest unless a token is returned within a period; a communication port configured to interface with an automated communication network for communications between a plurality of cryptographic hardware processors; and an automated distributed virtual state machine, hosted by the plurality of cryptographic hardware processors, employing a distributed consensus model for transaction validation, the automated distributed virtual state machine being configured to: communicate distributed consensus messages through the automated communication network; communicate the token; execute the smart contract defined by the parameters, receiving inputs and producing outputs on a blockchain; and communicate an immutable message for exercise of the security interest.

20 Claims, 6 Drawing Sheets

Related U.S. Application Data continuation of application No. 15/916,128, filed on Mar. 8, 2018, now Pat. No. 11,188,977.

(60) Provisional application No. 62/468,764, filed on Mar. 8, 2017.

(51) Int. Cl.

| | |
|---|---|
| ***G06F 21/64*** | (2013.01) |
| ***G06Q 20/06*** | (2012.01) |
| ***G06Q 20/38*** | (2012.01) |
| ***G06Q 20/40*** | (2012.01) |
| ***G06Q 30/02*** | (2023.01) |
| ***G06Q 30/0645*** | (2023.01) |
| ***G06Q 40/00*** | (2023.01) |
| ***G06Q 40/04*** | (2012.01) |
| ***G06Q 40/06*** | (2012.01) |
| ***G06Q 50/16*** | (2012.01) |
| ***H04L 9/06*** | (2006.01) |
| ***H04L 9/32*** | (2006.01) |
| *H04L 9/00* | (2022.01) |

(52) U.S. Cl.

CPC ..... *G06Q 20/065* (2013.01); *G06Q 20/38215* (2013.01); *G06Q 20/401* (2013.01); *G06Q 30/02* (2013.01); *G06Q 40/00* (2013.01); *G06Q 40/04* (2013.01); *G06Q 50/16* (2013.01); *H04L 9/0643* (2013.01); *H04L 9/3213* (2013.01); *G06Q 2220/00* (2013.01); *H04L 9/50* (2022.05)

(58) Field of Classification Search

CPC ........ G06Q 40/00; G06Q 40/04; G06Q 50/16; G06Q 2220/00; G06F 16/1805; G06F 21/64; H04L 9/0643; H04L 9/3213; H04L 9/50

USPC .......................... 705/1.1–912, 306, 307, 313

See application file for complete search history.

(56) References Cited

U.S. PATENT DOCUMENTS

| | | | | |
|---|---|---|---|---|
| 10,552,904 | B2 * | 2/2020 | Wager | H04L 9/3234 |
| 11,915,332 | B2 * | 2/2024 | Code | G06Q 40/02 |
| 12,002,024 | B2 * | 6/2024 | Yantis | G06Q 20/389 |
| 2016/0343074 | A1 * | 11/2016 | Wheeler | G06Q 40/03 |
| 2017/0232300 | A1 * | 8/2017 | Tran | G06F 1/163<br>434/247 |
| 2019/0130484 | A1 * | 5/2019 | de Jong | G06Q 20/401 |

* cited by examiner

METHOD FOR CREATING COMMODITY ASSETS FROM UNREFINED COMMODITY RESERVES UTILIZING BLOCKCHAIN AND DISTRIBUTED LEDGER TECHNOLOGY

CROSS REFERENCE TO RELATED APPLICATIONS

The present application is a Continuation of U.S. patent application Ser. No. 17/537,450, filed Nov. 29, 2021, now U.S. Pat. No. 11,893,626, issued Feb. 6, 2024, which is a Continuation in Part from U.S. patent application Ser. No. 15/916,128, filed Mar. 8, 2018, now U.S. Pat. No. 11,188, 977, issued Nov. 30, 2021, which Claims benefit of priority from U.S. Provisional Patent Application Ser. No. 62/468, 764, filed Mar. 8, 2017, the entirety of which is incorporated herein by reference.

FIELD OF THE INVENTION

The present invention relates to the field of securitized transactions and smart contracts, and encompasses systems and methods for conducting transactions.

BACKGROUND OF THE INVENTION

Each reference cited herein is expressly incorporated herein by reference in its entirety, for all purposes.

Tokenization of Assets

In the current marketplace, a commodity asset owner can go to a lender and securitize the commodity assets thereby gaining liquidity. The problem with this current model is that it requires a liquid commodity, and when securitized, the commodity may be restricted from beneficial use. Further, the value of the commodity may be deeply discounted, and ongoing interest charges are accrued.

Frolov et al., U.S. Pat. No. 9,747,586, discloses a system and method for issuance of electronic currency substantiated by a reserve of assets. The reserve is a commodity or asset that is actively traded.

Miner, US 20150332256, discloses a system and method for converting cryptocurrency to virtual assets whose value is substantiated by reserve of assets. The reserve is, for example, book entries for fiat currencies, which are actively traded.

Doney, US 20170213289, expressly incorporated herein by reference in its entirety, describes creation of collateralized portfolios, as a collection of income-producing assets, generated through transactions that exchange estimated asset value for liquid instruments in the portfolio. Transaction elasticity is provided by liquid instruments (reserve funds and portfolio-owned shares) held in reserve in the portfolio's reservoir which provides a market smoothing function to adapt to changes in asset demand and risk. Each portfolio's reservoir is collectively owned by the shareholders; continuously replenishing itself with income generated by assets in the portfolio. Shares can be represented by digital tokens, traded as digital currency such as cryptocurrency, and monetized with the convenience of cash through a network of exchanges and payment gateways.

Vieira et al., US20180047111, expressly incorporated herein by reference in its entirety, describes enhanced organizational transparency using a linked activity chain in a ledger, employing a block chain.

Distributed Ledger

A distributed ledger is a database that is consensually shared and synchronized across multiple sites, institutions, or geographies, accessible by multiple entities. It allows transactions to have public "witnesses." The participant at each node of the network can access the recordings shared across that network and can own an identical copy of it. Any changes or additions made to the ledger are reflected and copied to all participants in a matter of seconds or minutes. A distributed ledger stands in contrast to a centralized ledger, which is the type of ledger that most companies use. A centralized ledger is more prone to cyber attacks and fraud, as it has a single point of failure.

A distributed ledger is a database that is synchronized and accessible across different sites and geographies by multiple participants. The need for a central authority to keep a check against manipulation is eliminated by the use of a distributed ledger.

Distributed ledgers may be permissioned or permissionless. This determines if anyone or only approved people can run a node to validate transactions. They also vary between the consensus algorithm—proof of work, proof of stake, voting systems and hashgraph. They may be mineable (one can claim ownership of new coins contributing with a node) or not (the creator of the cryptocurrency owns all at the beginning). All blockchain is considered to be a form of DLT. There are also non-blockchain distributed ledger tables.

Blockchain

A blockchain is a growing list of records, called blocks, that are linked together using cryptography. Each block contains a cryptographic hash of the previous block, a timestamp, and transaction data (generally represented as a Merkle tree). The timestamp proves that the transaction data existed when the block was published in order to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. en.wikipedia.org/wiki/Blockchain.

Blockchains are typically managed by a peer-to-peer network for use as a publicly distributed ledger, where nodes collectively adhere to a protocol to communicate and validate new blocks. Although blockchain records are not unalterable as forks are possible, blockchains may be considered secure by design and exemplify a distributed computing system with high Byzantine fault tolerance.

Cryptographer David Chaum first proposed a blockchain-like protocol in his 1982 dissertation "Computer Systems Established, Maintained, and Trusted by Mutually Suspicious Groups." Further work on a cryptographically secured chain of blocks was described in 1991 by Stuart Haber and W. Scott Stornetta. They wanted to implement a system wherein document timestamps could not be tampered with. In 1992, Haber, Stornetta, and Dave Bayer incorporated Merkle trees to the design, which improved its efficiency by allowing several document certificates to be collected into one block.

A blockchain is a decentralized, distributed, and oftentimes public, digital ledger consisting of records called blocks that is used to record transactions across many computers so that any involved block cannot be altered retroactively, without the alteration of all subsequent blocks. This allows the participants to verify and audit transactions independently and relatively inexpensively. A blockchain database is managed autonomously using a peer-to-peer network and a distributed timestamping server. In the case of Blockchain and other game theoretic reliance systems, they are authenticated by mass collaboration powered by collective self-interests. Such a design facilitates robust workflow where participants' uncertainty regarding data security is marginal. The use of a blockchain removes the characteristic of infinite reproducibility from a digital asset. It confirms that each unit of value was transferred only once, solving the long-standing problem of double spending. A blockchain has been described as a value-exchange protocol. A blockchain can maintain title rights because, when properly set up to detail the exchange agreement, it provides a record that compels offer and acceptance.

Logically, a blockchain can be seen as consisting of several layers: infrastructure (hardware); networking (node discovery, information propagation and verification); consensus (proof of work, proof of stake); data (blocks, transactions); and application (smart contracts/decentralized applications, if applicable).

Blocks hold batches of valid transactions that are hashed and encoded into a Merkle tree. Each block includes the cryptographic hash of the prior block in the blockchain, linking the two. The linked blocks form a chain. This iterative process confirms the integrity of the previous block, all the way back to the initial block, which is known as the genesis block. To assure the integrity of a block and the data contained in it, the block is usually digitally signed.

Sometimes separate blocks can be produced concurrently, creating a temporary fork. In addition to a secure hash-based history, any blockchain has a specified algorithm for scoring different versions of the history so that one with a higher score can be selected over others. Blocks not selected for inclusion in the chain are called orphan blocks. Peers supporting the database have different versions of the history from time to time. They keep only the highest-scoring version of the database known to them. Whenever a peer receives a higher-scoring version (usually the old version with a single new block added) they extend or overwrite their own database and retransmit the improvement to their peers. There is never an absolute guarantee that any particular entry will remain in the best version of the history forever. Blockchains are typically built to add the score of new blocks onto old blocks and are given incentives to extend with new blocks rather than overwrite old blocks. Therefore, the probability of an entry becoming superseded decreases exponentially as more blocks are built on top of it, eventually becoming very low. For example, bitcoin uses a proof-of-work system, where the chain with the most cumulative proof-of-work is considered the valid one by the network. There are a number of methods that can be used to demonstrate a sufficient level of computation. Within a blockchain the computation is carried out redundantly rather than in the traditional segregated and parallel manner.

The block time is the average time it takes for the network to generate one extra block in the blockchain. Some blockchains create a new block as frequently as every five seconds. By the time of block completion, the included data becomes verifiable. In cryptocurrency, this is practically when the transaction takes place, so a shorter block time means faster transactions. The block time for Ethereum is set to between 14 and 15 seconds, while for bitcoin it is on average 10 minutes.

A hard fork is a rule change such that the software validating according to the old rules will see the blocks produced according to the new rules as invalid. In case of a hard fork, all nodes meant to work in accordance with the new rules need to upgrade their software. If one group of nodes continues to use the old software while the other nodes use the new software, a permanent split can occur.

For example, Ethereum has hard-forked to "make whole" the investors in The DAO, which had been hacked by exploiting a vulnerability in its code. In this case, the fork resulted in a split creating Ethereum and Ethereum Classic chains. Alternatively, to prevent a permanent split, a majority of nodes using the new software may return to the old rules. In the case of smart contracts, and especially those that automatically control transfer of rights or assets, a split is infeasible, unless the rights themselves are present on the old and new blockchains. Since the smart contract was written under the original rules, these should apply to the result, unless all parties to the transaction agree to updating the software/rule set.

By storing data across its peer-to-peer network, the blockchain eliminates a number of risks that come with data being held centrally. The decentralized blockchain may use ad hoc message passing and distributed networking. One risk of a lack of a decentralization is a so-called "51% attack" where a central entity can gain control of more than half of a network and can manipulate that specific blockchain record at will, allowing double-spending. A key advantage to a decentralized blockchain implementation is that the business risk of a central clearing agent is abated, and should the originator no longer be available, smart contracts on the blockchain technically survive. It remains underdetermined what happens if the community supporting the blockchain ceases to operate, though an interested party could maintain a node and process its own transaction, though with greatly diminished distributed consensus protections.

Peer-to-peer blockchain networks lack centralized points of vulnerability that computer crackers can exploit; likewise, it has no central point of failure. Blockchain security methods include the use of public-key cryptography. A public key (a long, random-looking string of numbers) is an address on the blockchain. Value tokens sent across the network are recorded as belonging to that address. A private key is like a password that gives its owner access to their digital assets or the means to otherwise interact with the various capabilities that blockchains now support. Data stored on the blockchain is generally considered incorruptible.

Every active mining node in a decentralized system has a copy of at least the last block of the blockchain. Data quality is maintained by massive database replication and computational trust. No centralized "official" copy exists and (in a pure proof of work consensus system) no user is "trusted" more than any other. Transactions are broadcast to the network using software. Messages are delivered on a best-effort basis. Mining nodes validate transactions, add them to the block they are building, and then broadcast the completed block to other nodes. Blockchains use various time-stamping schemes, such as proof-of-work, to serialize changes. Alternative consensus methods include proof-of-stake. Growth of a decentralized blockchain is accompanied by the risk of centralization because the computer resources required to process larger amounts of data become more expensive.

An advantage to an open, permissionless, or public, blockchain network is that guarding against bad actors is not required and no access control is needed. This means that applications can be added to the network without the approval or trust of others, using the blockchain as a transport layer.

Bitcoin and other cryptocurrencies currently secure their blockchain by requiring new entries to include a proof of work. To prolong the blockchain, bitcoin uses Hashcash puzzles.

While Hashcash was designed in 1997 by Adam Back, the original idea was first proposed by Cynthia Dwork and Moni Naor and Eli Ponyatovski in their 1992 paper "Pricing via Processing or Combatting Junk Mail".

Permissioned blockchains use an access control layer to govern who has access to the network. In contrast to public blockchain networks, validators on private blockchain networks are vetted by the network owner. They do not rely on anonymous nodes to validate transactions nor do they benefit from the network effect. It has been argued that permissioned blockchains can guarantee a certain level of decentralization, if carefully designed, as opposed to permissionless blockchains, which are often centralized in practice.

A blockchain, if it is public, provides anyone who wants access to observe and analyse the chain data, given one has the know-how.

Blockchain-based smart contracts are proposed contracts that can be partially or fully executed or enforced without human interaction.] One of the main objectives of a smart contract is automated escrow. A key feature of smart contracts is that they do not need a trusted third party (such as a trustee) to act as an intermediary between contracting entities; the blockchain network executes the contract on its own. This may reduce friction between entities when transferring value and could subsequently open the door to a higher level of transaction automation.

Blockchain technology has been used for tracking the origins of gemstones and other precious commodities. In 2016, The Wall Street Journal reported that the blockchain technology company, Everledger was partnering with IBM's blockchain-based tracking service to trace the origin of diamonds to ensure that they were ethically mined. As of 2019, the Diamond Trading Company (DTC) has been involved in building a diamond trading supply chain product called Tracr.

A sidechain is a designation for a blockchain ledger that runs in parallel to a primary blockchain. Entries from the primary blockchain (where said entries typically represent digital assets) can be linked to and from the sidechain; this allows the sidechain to otherwise operate independently of the primary blockchain (e.g., by using an alternate means of record keeping, alternate consensus algorithm, etc.).

"An Untraceable Currency? Bitcoin Privacy Concerns—FinTech Weekly". FinTech Magazine Article. 7 Apr. 2018.

"Blockchain Overview". NIST. 25 Sep. 2019.

"Blockchain". standards.org.au. Standards Australia. Retrieved 21 Jun. 2021.

"CEN and CENELEC publish a White Paper on standards in Blockchain & Distributed Ledger Technologies". cencenelec.eu.

"ISO/TC 307 Blockchain and distributed ledger technologies". iso.org. ISO.

"Standards". blockchain.ieee.org/standards. IEEE Blockchain.

Alzahrani, Naif; Bulusu, Nirupama (15 Jun. 2018). "Block-Supply Chain: A New Anti-Counterfeiting Supply Chain Using NFC and Blockchain". Proceedings of the 1st Workshop on Cryptocurrencies and Blockchains for Distributed Systems. CryBlock'18. Munich, Germany: Association for Computing Machinery: 30-35. doi:10.1145/3211933.3211939. ISBN 978-1-4503-5838-5. S2CID 169188795.

Andoni, Merlinda; Robu, Valentin; Flynn, David; Abram, Simone; Geach, Dale; Jenkins, David; McCallum, Peter; Peacock, Andrew (2019). "Blockchain technology in the energy sector: A systematic review of challenges and opportunities". Renewable and Sustainable Energy Reviews. 100: 143-174. doi:10.1016/j.rser.2018.10.014. S2CID 116422191.

Antonopoulos, Andreas (20 Feb. 2014). "Bitcoin security model: trust by computation". Radar. O'Reilly.

Antonopoulos, Andreas M. (2014). Mastering Bitcoin. Unlocking Digital Cryptocurrencies. Sebastopol, CA: O'Reilly Media. ISBN 978-1449374037. Archived from the original on 1 Dec. 2016. Retrieved 3 Nov. 2015.

Bakos, Yannis; Halaburda, Hanna; Mueller-Bloch, Christoph (February 2021). "When Permissioned Blockchains Deliver More Decentralization Than Permissionless". Communications of the ACM. 64 (2): 20-22. doi:10.1145/3442371. S2CID 231704491.

Balagurusamy, V. S. K.; Cabral, C.; Coomaraswamy, S.; Delamarche, E.; Dillenberger, D. N.; Dittmann, G.; Friedman, D.; Gökçe, O.; Hinds, N.; Jelitto, J.; Kind, A. (1 Mar. 2019). "Crypto anchors". IBM Journal of Research and Development. 63 (2/3): 4:1-4:12. doi:10.1147/JRD.2019.2900651. ISSN 0018-8646. S2CID 201109790.

Bashir, Imran (2017). Mastering Blockchain. Packt Publishing, Ltd. ISBN 978-1-78712-544-5. OCLC 967373845.

Bayer, Dave; Haber, Stuart; Stornetta, W. Scott (March 1992). Improving the Efficiency and Reliability of Digital Time-Stamping. Sequences. 2. pp. 329-334. CiteSeerX 10.1.1.71.4891. doi:10.1007/978-1-4613-9323-8_24. ISBN 978-1-4613-9325-2.

Beck, Roman; Mueller-Bloch, Christoph; King, John Leslie (2018). "Governance in the Blockchain Economy: A Framework and Research Agenda". Journal of the Association for Information Systems: 1020-1034. doi: 10.17705/1jais.00518.

Belchior, Rafael; Vasconcelos, André; Guerreiro, Sérgio; Correia, Miguel (May 2020). "A Survey on Blockchain Interoperability: Past, Present, and Future Trends". arXiv: 2005.14282.

Bhaskar, Nirupama Devi; Chuen, David LEE Kuo (2015). "Bitcoin Mining Technology". Handbook of Digital Currency. pp. 45-65. doi:10.1016/B978-0-12-802117-0.00003-5. ISBN 978-0-12-802117-0.

Brenig, Christian, Rafael Accorsi & GUnter Müller (Spring 2015). "Economic Analysis of Cryptocurrency Backed Money Laundering". Association for Information Systems AIS Electronic Library (AISeL).

Brito, Jerry; Castillo, Andrea (2013). Bitcoin: A Primer for Policymakers. Fairfax, VA: Mercatus Center, George Mason University.

Casey, Michael, 1967—(16 Jul. 2018). The impact of blockchain technology on finance: a catalyst for change. London, UK. ISBN 978-1-912179-15-2. OCLC 1059331326.

Catalini, Christian; Gans, Joshua S. (23 Nov. 2016). "Some Simple Economics of the Blockchain" (PDF). SSRN. doi:10.2139/ssrn.2874598. hdl:1721.1/130500. S2CID 46904163. SSRN 2874598.

Catalini, Christian; Tucker, Catherine E. (11 Aug. 2016). "Seeding the S-Curve? The Role of Early Adopters in Diffusion". doi:10.2139/ssrn.2822729. S2CID 157317501. SSRN 2822729.

Chen, Huashan; Pendleton, Marcus; Njilla, Laurent; Xu, Shouhuai (12 Jun. 2020). "A Survey on Ethereum Systems Security: Vulnerabilities, Attacks, and Defenses". ACM Computing Surveys. 53 (3): 3-4. arXiv: 1908.04507. doi:10.1145/3391195. ISSN 0360-0300. S2CID 199551841.

Chowdhury, Niaz (16 Aug. 2019). Inside Blockchain, Bitcoin, and Cryptocurrencies. CRC Press. pp. 22-. ISBN 978-1-00-050770-6.

Crosby, Michael; Nachiappan; Pattanayak, Pradhan; Verma, Sanjeev; Kalyanaraman, Vignesh (16 Oct. 2015). BlockChain Technology: Beyond Bitcoin (PDF) (Report). Sutardja Center for Entrepreneurship & Technology Technical Report. University of California, Berkeley. Retrieved 19 Mar. 2017.

Deshmukh, Sumedha; Boulais, Océane; Koens, Tommy. "Global Standards Mapping Initiative: An overview of blockchain technical standards" (PDF). weforum.org. World Economic Forum.

Distributed Ledger Technology: Hybrid Approach, Front-to-Back Designing and Changing Trade Processing Infrastructure, By Martin Walker, First published: 24 Oct. 2018 ISBN 978-1-78272-389-9

Extance, Andy (30 Sep. 2015). "The future of cryptocurrencies: Bitcoin and beyond". Nature. 526 (7571): 21-23. Bibcode:2015Natur.526 . . . 21E. doi:10.1038/526021a. ISSN 0028-0836. OCLC 421716612. PMID 26432223.

Felin, Teppo; Lakhani, Karim (2018). "What Problems Will You Solve With Blockchain?". MIT Sloan Management Review.

Franco, Pedro (2014). Understanding Bitcoin: Cryptography, Engineering and Economics. John Wiley & Sons. p. 9. ISBN 978-1-119-01916-9.

Gatteschi, Valentina; Lamberti, Fabrizio; Demartini, Claudio; Pranteda, Chiara; Santamaría, Victor (20 Feb. 2018). "Blockchain and Smart Contracts for Insurance: Is the Technology Mature Enough?". Future Internet. 10 (2): 20. doi:10.3390/fi10020020.

Gervais, Arthur; Karame, Ghassan O.; Capkun, Vedran; Capkun, Srdjan. "Is Bitcoin a Decentralized Currency?". InfoQ. InfoQ & IEEE computer society.

Governatori, Guido; Idelberger, Florian; Milosevic, Zoran; Riveret, Regis; Sartor, Giovanni; Xu, Xiwei (2018). "On legal contracts, imperative and declarative smart contracts, and blockchain systems". Artificial Intelligence and Law. 26 (4): 33. doi:10.1007/s10506-018-9223-3. S2CID 3663005.

Haber, Stuart; Stornetta, W. Scott (January 1991). "How to time-stamp a digital document". Journal of Cryptology. 3 (2): 99-111. CiteSeerX 10.1.1.46.8740. doi:10.1007/bf00196791. S2CID 14363020.

Hardjono, T.; Hargreaves, M.; Smith, N. (2 Oct. 2020). An Interoperability Architecture for Blockchain Gateways (Technical report). IETF. draft-hardjono-blockchain-interop-arch-00.

Hardjono, Thomas. "An Interoperability Architecture for Blockchain/DLT Gateways". ietf.org. IETF.

Hsieh, Ying-Ying; Vergne, Jean-Philippe; Anderson, Philip; Lakhani, Karim; Reitzig, Markus (12 Feb. 2019). "Correction to: Bitcoin and the rise of decentralized autonomous organizations". Journal of Organization Design. 8 (1): 3. doi:10.1186/s41469-019-0041-1. ISSN 2245-408X.

Iansiti, Marco; Lakhani, Karim R. (January 2017). "The Truth About Blockchain". Harvard Business Review. Harvard University.

Janssen, Marijn; Weerakkody, Vishanth; Ismagilova, Elvira; Sivarajah, Uthayasankar; Irani, Zahir (2020). "A framework for analysing blockchain technology adoption: Integrating institutional, market and technical factors". International Journal of Information Management. Elsevier. 50: 302-309. doi:10.1016/j.ijinfomgt.2019.08.012.

Kakavand, Hossein; De Sevres, Nicolette Kost; Chilton, Bart (12 Oct. 2016). The Blockchain Revolution: An Analysis of Regulation and Technology Related to Distributed Ledger Technologies (Report). Luther Systems & DLA Piper. SSRN 2849251.

Knirsch, Fabian; Unterweger, Andread; Engel, Dominik (2019). "Implementing a blockchain from scratch: why, how, and what we learned". EURASIP Journal on Information Security. 2019. doi:10.1186/s13635-019-0085-3. S2CID 84837476.

Koens, Tommy; Poll, Erik (2019), "The Drivers Behind Blockchain Adoption: The Rationality of Irrational Choices", Euro-Par 2018: Parallel Processing Workshops, Lecture Notes in Computer Science, 11339, pp. 535-546, doi:10.1007/978-3-030-10549-5_42, ISBN 978-3-030-10548-8, S2CID 57662305

Köhler, Susanne; Pizzol, Massimo (20 Nov. 2019). "Life Cycle Assessment of Bitcoin Mining". Environmental Science & Technology. 53 (23): 13598-13606. Bibcode: 2019EnST . . . 5313598K. doi:10.1021/acs.est.9b05687. PMID 31746188.

Kopfstein, Janus (12 Dec. 2013). "The Mission to Decentralize the Internet". The New Yorker. Archived from the original on 31 Dec. 2014. Retrieved 30 Dec. 2014.

Kotobi, K., and S. G. Bilen, "Secure Blockchains for Dynamic Spectrum Access: A Decentralized Database in Moving Cognitive Radio Networks Enhances Security and User Access", IEEE Vehicular Technology Magazine, 2018.

Kumar, Randhir; Tripathi, Rakesh (November 2019). "Implementation of Distributed File Storage and Access Framework using IPFS and Blockchain". 2019 Fifth International Conference on Image Information Processing (ICIIP). IEEE: 246-251. doi:10.1109/iciip47207.2019.8985677. ISBN 978-1-7281-0899-5. S2CID 211119043.

Li, Jerry (2020), "Blockchain technology adoption: Examining the Fundamental Drivers", Proceedings of the 2nd International Conference on Management Science and Industrial Engineering, ACM Publication, April 2020, pp. 253-260. dl.acm.org/doi/abs/10.1145/3396743.3396750 Archived 5 Jun. 2020 at the Wayback Machine Lumineau, Fabrice; Wang, Wenqian; Schilke, Oliver (2020). "Blockchain Governance A New Way of Organizing Collaborations?". Organization Science. 32 (2): 500-521. doi:10.1287/orsc.2020.1379.

Ma, Jinhua; Lin, Shih-Ya; Chen, Xin; Sun, Hung-Min; Chen, Yeh-Cheng; Wang, Huaxiong (2020). "A Blockchain-Based Application System for Product Anti-Counterfeiting". IEEE Access. 8: 77642-77652. doi:10.1109/ACCESS.2020.2972026. ISSN 2169-3536. S2CID 214205788.

Marvin, Bob (30 Aug. 2017). "Blockchain: The Invisible Technology That's Changing the World". PC MAG Australia. ZiffDavis, LLC.

Mazonka, Oleg (29 Dec. 2016). "Blockchain: Simple Explanation" (PDF). Journal of Reference.

Melanie Swan (2015). "Proof_of_Existence" Blockchain: Blueprint for a New Economy. O'Reilly Media. pp. 38-39. ISBN 9781491920473.

Nakamoto, Satoshi (October 2008). "Bitcoin: A Peer-to-Peer Electronic Cash System" (PDF). bitcoin.org.

Narayanan, Arvind; Bonneau, Joseph; Felten, Edward; Miller, Andrew; Goldfeder, Steven (2016). Bitcoin and cryptocurrency technologies: a comprehensive introduction. Princeton: Princeton University Press. ISBN 978-0-691-17169-2.

Orcutt, Mike. "It's getting harder to hide money in Bitcoin". MIT Technology Review. Retrieved 15 May 2019.

Puthal, D., N. Malik, S. P. Mohanty, E. Kougianos, and G. Das, "Everything you Wanted to Know about the Blockchain", IEEE Consumer Electronics Magazine, Volume 7, Issue 4, July 2018, pp. 06-14.

Raval, Siraj (2016). Decentralized Applications: Harnessing Bitcoin's Blockchain Technology. O'Reilly Media, Inc. pp. 1-2. ISBN 978-1-4919-2452-5, ISBN 9781491924549.

Saito, Kenji; Yamada, Hiroyuki (June 2016). What's So Different about Blockchain?Blockchain is a Probabilistic State Machine. IEEE 36th International Conference on Distributed Computing Systems Workshops. International Conference on Distributed Computing Systems Workshops (Icdes). Nara, Nara, Japan: IEEE. pp. 168-75. doi:10.1109/ICDCSW.2016.28. ISBN 978-1-5090-3686-8. ISSN 2332-5666.

Sherman, Alan T.; Javani, Farid; Zhang, Haibin; Golaszewski, Enis (January 2019). "On the Origins and Variations of Blockchain Technologies". IEEE Security Privacy. 17 (1): 72-77. arXiv:1810.06130. doi:10.1109/MSEC.2019.2893730. ISSN 1558-4046. S2CID 53114747.

Stoll, Christian; Klaaßen, Lena; Gallersdörfer, Ulrich (2019). "The Carbon Footprint of Bitcoin". Joule. 3 (7): 1647-1661. doi:10.1016/j.joule.2019.05.012.

Tapscott, Don; Tapscott, Alex (2016). Blockchain Revolution: How the Technology Behind Bitcoin Is Changing Money, Business and the World. London: Portfolio Penguin. ISBN 978-0-241-23785-4. OCLC 971395169.

Tapscott, Don; Tapscott, Alex (May 2016). The Blockchain Revolution: How the Technology Behind Bitcoin is Changing Money, Business, and the World. ISBN 978-0-670-06997-2.

U.S. Pat. No. 10,438,290

Wegner, Peter (March 1996). "Interoperability". ACM Computing Surveys. 28: 285-287. doi:10.1145/234313.234424. Retrieved 24 Oct. 2020.

Smart Contracts

So-called "Smart Contracts" are legal obligations tied to a computer protocol intended to digitally facilitate, verify, or enforce the negotiation or performance of the contracts. Smart contracts allow the performance of credible transactions without third parties. These transactions are trackable and may be irreversible. See, en.wikipedia.org/wiki/Smart_contract. The phrase "smart contracts" was coined by computer scientist Nick Szabo in 1996.

A smart contract is a set of promises, specified in digital form, including protocols within which the parties perform on these promises. Recent implementations of smart contracts are based on blockchains, though this is not an intrinsic requirement. Building on this base, some recent interpretations of "smart contract" are mostly used more specifically in the sense of general purpose computation that takes place on a blockchain or distributed ledger. In this interpretation, used for example by the Ethereum Foundation or IBM, a smart contract is not necessarily related to the classical concept of a contract, but can be any kind of computer program.

Byzantine fault tolerant algorithms allowed digital security through decentralization to form smart contracts. Additionally, the programming languages with various degrees of Turing-completeness as a built-in feature of some blockchains make the creation of custom sophisticated logic possible.

Notable examples of implementation of smart contracts are Decentralized cryptocurrency protocols are smart contracts with decentralized security, encryption, and limited trusted parties that fit Szabo's definition of a digital agreement with observability, verifiability, privity, and enforceability.

Bitcoin also provides a Turing-incomplete Script language that allows the creation of custom smart contracts on top of Bitcoin like multisignature accounts, payment channels, escrows, time locks, atomic cross-chain trading, oracles, or multi-party lottery with no operator.

Ethereum implements a nearly Turing-complete language on its blockchain, a prominent smart contract framework.

Smart contracts have advantages over equivalent conventional financial instruments, including minimizing counterparty risk, reducing settlement times, and increased transparency. UBS proposed "smart bonds" that use the bitcoin blockchain in which payment streams could hypothetically be fully automated, creating a self-paying instrument.

"Blockchain: Forget Bitcoin, here comes the real thing". Idealog. idealog.co.nz/tech/2016/03/blockchain-forget-bitcoin-here-comes-real-thing 2016-03-29;

"Contract—Bitcoin Wiki". en.bitcoin.it;

"Dumb Contracts and Smart Scripts—We Use Cash". weuse.cash.

"How Do Ethereum Smart Contracts Work?—CoinDesk". CoinDesk. www.coindesk.com/learn/how-do-ethereum-smart-contracts-work/Retrieved 2017-10-27;

"Namecoin". Cointelegraph. 23 May 2015. Automated Transactions;

"Qora and Burst Now Able to Make Cross-Chain Transactions". www.ccn.com/qora-burst-now-able-make-cross-chain-transactions/May 22, 2015.

"Ripple discontinues smart contract platform Codius". Bitcoin Magazine. bitcoinmagazine.com/business/ripple-discontinues-smart-contract-platform-codius-citing-small-market-1435182153 Jun. 24, 2015;

"RSK—Rootstock Open-Source Smart Contract Bitcoin Technology?" bitcoinexchangeguide.com/rsk/;

"Smart contracts and bitcoin", medium.com/@maraoz/smart-contracts-and-bitcoin-a5d61011d9b1;

"Smart contracts: Turing completeness & reality", hackernoon.com/smart-contracts-turing-completeness-reality-3eb897996621 (6/21/2016);

"What is a Bitcoin Merklized Abstract Syntax Tree (MAST)?". Bitcoin Tech Talk. 2017-10-12;

Accenture, "Blockchain Technology: Preparing for Change", financedocbox.com/Tax_Planning/77008616-Blockchain-technology-preparing-for-change.html (2015);

Al Khalil, Firas, Tom Butler, Leona O'Brien, and Marcello Ceci. "Trust in smart contracts is a process, as well." In International Conference on Financial Cryptography and Data Security, pp. 510-519. Springer, Cham, 2017.

Al-Bassam, Mustafa. "SCPKI: a smart contract-based PKI and identity system." In *Proceedings of the ACM Workshop on Blockchain, Cryptocurrencies and Contracts*, pp. 35-40. ACM, 2017.

Ammous, Saifedean Hisham. "Blockchain Technology: What is it good for?." *Browser Download This Paper* (2016).

Andrychowicz, Marcin; Dziembowski, Stefan; Malinowski, Daniel;

Atzei, Nicola, Massimo Bartoletti, and Tiziana Cimoli. "A survey of attacks on Ethereum smart contracts (SoK)." In *International Conference on Principles of Security and Trust*, pp. 164-186. Springer, Berlin, Heidelberg, 2017.

Atzei, Nicola; Bartoletti, Massimo; Cimoli, Tiziana; Lande, Stefano; Zunino, Roberto (2018), "SoK: unraveling Bitcoin smart contracts", 7th International Conference on Principles of Security and Trust (POST), European Joint Conferences on Theory and Practice of Software.

Bahga, Arshdeep, and Vijay K. Madisetti. "Blockchain platform for industrial Internet of Things." *Journal of Software Engineering and Applications* 9, no. 10 (2016): 533.

Bartoletti, Massimo, and Livio Pompianu. "An empirical analysis of smart contracts: platforms, applications, and design patterns." In *International Conference on Financial Cryptography and Data Security*, pp. 494-509. Springer, Cham, 2017.

Beck, Roman, Jacob Stenum Czepluch, Nikolaj Lollike, and Simon Malone. "Blockchain—the Gateway to Trust-Free Cryptographic Transactions." In *ECIS*, p. ResearchPaper 153. 2016.

Bhargavan, Karthikeyan, Antoine Delignat-Lavaud, Cédric Fournet, Anitha Gollamudi, Georges Gonthier, Nadim Kobeissi, Natalia Kulatova et al. "Formal verification of smart contracts: Short paper." In *Proceedings of the* 2016 *ACM Workshop on Programming Languages and Analysis for Security*, pp. 91-96. ACM, 2016.

Bitcoinbook: Mastering Bitcoin 2nd Edition—Programming the Open Blockchain—Chapter 7, Mastering Bitcoin, 2017-05-30;

BitFury Group, "Smart Contracts on Bitcoin Blockchain" (PDF). Sep. 4, 2015, bitfury.com/content/downloads/contracts-1.1.1.pdf;

Bocek, Thomas, "Digrate Express rating report on Project Rootstock", Digital Marketplaces Unleashed. Springer-Verlag GmbH. p. 169-184 (15 Sep. 2017);

Bogner, Andreas, Mathieu Chanson, and Arne Meeuw. "A decentralised sharing app running a smart contract on the ethereum blockchain." In *Proceedings of the* 6*th International Conference on the Internet of Things*, pp. 177-178. ACM, 2016.

Brown, Richard Gendal, "Bitcoin as a Smart Contract Platform" gendal.me/2015/03/30/bitcoin-as-a-smart-contract-platform/2015-03-30;

Brown, Richard Gendal, James Carlyle, Ian Grigg, and Mike Hearn. "Corda: An Introduction." *R*3 *CEV*, August (2016).

Buterin, Vitalik. "A next-generation smart contract and decentralized application platform." *white paper* (2014).

Buterin, Vitalik. "Ethereum Whitepaper", Github;

Butler, T., "A Solution for the Problems of Translation and Transparency in Smart Contracts" www.semanticscholar.org/paper/A-Solution-for-the-Problems-of-Translation-and-in-Butler/08c9c7c019aad37ef64eedcbcal4168f472182dc (2017);

Cachin, Christian. "Architecture of the Hyperledger Blockchain Fabric", ibm.com.

Chainfrog, "What are Smart Contracts" (PDF). www.chainfrog.com/wp-content/uploads/2017/08/smart-contracts.pdf Aug. 3, 2017.

Chesebro, Russell. *A contract that manages itself: the time has arrived*. Defense Acquisition Univ Ft Belvoir VA, 2015.

Christidis, Konstantinos, and Michael Devetsikiotis. "Blockchains and smart contracts for the internet of things." *IEEE Access* 4 (2016): 2292-2303.

CIYAM, "Automated Transactions Specification", ciyam.org/at/at.html;

Clack, Christopher D., Vikram A. Bakshi, and Lee Braine. "Smart contract templates: foundations, design landscape and research directions." *arXiv preprint arXiv*:1608.00771 (2016).

Clack, Christopher D., Vikram A. Bakshi, and Lee Braine. "Smart Contract Templates: essential requirements and design options." *arXiv preprint arXiv*:1612.04496 (2016).

Dai, Patrick, Neil Mahi, Jordan Earls, and Alex Norta. "Smart-contract value-transfer protocols on a distributed mobile application platform" tum.org/uploads/files/cf6d69348ca50dd985b60425ccf282f3. (2017).

Delmolino, Kevin, Mitchell Arnett, Ahmed Kosba, Andrew Miller, and Elaine Shi. "Step by step towards creating a safe smart contract: Lessons and insights from a cryptocurrency lab." In *International Conference on Financial Cryptography and Data Security*, pp. 79-94. Springer, Berlin, Heidelberg, 2016.

English, Matthew, Soren Auer, and John Domingue. "Block chain technologies & the semantic web: A framework for symbiotic development." In *Computer Science Conference for University of Bonn Students*, J. Lehmann, H. Thakkar, L. Halilaj, and R. Asmat, Eds, pp. 47-61. 2016.

Foroglou, George, and Anna-Lali Tsilidou. "Further applications of the blockchain." In 12*th Student Conference on Managerial Science and Technology*. 2015.

Frantz, Christopher K., and Mariusz Nowostawski. "From institutions to code: Towards automated generation of smart contracts." In *Foundations and Applications of Self*Systems, IEEE International Workshops on*, pp. 210-215. IEEE, 2016.

Glaser, Florian. "Pervasive decentralisation of digital infrastructures: a framework for blockchain enabled system and use case analysis." (2017).

Hal Hodson (20 Nov. 2013). "Bitcoin moves beyond mere money". New Scientist.

Hirai, Yoichi. "Defining the ethereum virtual machine for interactive theorem provers." In *International Conference on Financial Cryptography and Data Security*, pp. 520-535. Springer, Cham, 2017.

Huckle, Steve, Rituparna Bhattacharya, Martin White, and Natalia Beloff. "Internet of things, blockchain and shared economy applications." *Procedia Computer Science* 98 (2016): 461-466.

Hull, Richard, Vishal S. Batra, Yi-Min Chen, Alin Deutsch, Fenno F. Terry Heath III, and Victor Vianu. "Towards a shared ledger business collaboration language based on data-aware processes." In *International Conference on Service-Oriented Computing*, pp. 18-36. Springer, Cham, 2016.

Idelberger, Florian, Guido Governatori, Régis Riveret, and Giovanni Sartor. "Evaluation of logic-based smart contracts for blockchain systems." In *International Symposium on Rules and Rule Markup Languagesfor the Semantic Web*, pp. 167-183. Springer, Cham, 2016.

Kolvart, Merit, Margus Poola, and Addi Rull. "Smart contracts." In The Future of Law and etechnologies, pp. 133-147. Springer, Cham, 2016.

Korpela, Kari, Jukka Hallikas, and Tomi Dahlberg. "Digital supply chain transformation toward blockchain integration." In *proceedings of the* 50*th Hawaii international conference on system sciences*. 2017.

Kosba, Ahmed, Andrew Miller, Elaine Shi, Zikai Wen, and Charalampos Papamanthou. "Hawk: The blockchain model of cryptography and privacy-preserving smart contracts." In *Security and Privacy* (*SP*), 2016 *IEEE Symposium on*, pp. 839-858. IEEE, 2016.

Levy, Karen E C. "Book-smart, not street-smart: blockchain-based smart contracts and the social workings of law." *Engaging Science, Technology, and Society* 3 (2017): 1-15.

Luu, Loi, Duc-Hiep Chu, Hrishi Olickel, Prateek Saxena, and Aquinas Hobor. "Making smart contracts smarter." In *Proceedings of the* 2016 *ACM SIGSAC Conference on Computer and Communications Security*, pp. 254-269. ACM, 2016.

Marino, Bill, and Ari Juels. "Setting standards for altering and undoing smart contracts." In *International Symposium on Rules and Rule Markup Languages for the Semantic Web*, pp. 151-166. Springer, Cham, 2016.

Maskell, Brian. "Just-in-time manufacturing." *Industrial Management & Data Systems* 87, no. 9/10 (1987): 17-20.

Mazurek, Lukasz (2013). "Secure Multiparty Computations on Bitcoin";

Miller, Mark S., Chip Morningstar, and Bill Frantz. "Capability-based financial instruments." In *International Conference on Financial Cryptography*, pp. 349-378. Springer, Berlin, Heidelberg, 2000.

Möbius, Martin (2009). "Erstellung eines Archivierungskonzepts für die Speicherung rückverfolgbarer Datenbestände im Askemos-System";

Morrison, Alan, and Subhankar Sinha. "Blockchain and smart contract automation: Blockchains defined." (2016).

Norta, Alex. "Creation of smart-contracting collaborations for decentralized autonomous organizations." In *International Conference on Business Informatics Research*, pp. 3-17. Springer, Cham, 2015.

Omohundro, Steve. "Cryptocurrencies, smart contracts, and artificial intelligence." *AI matters* 1, no. 2 (2014): 19-21.

Peters, Gareth W., and Efstathios Panayi. "Understanding modern banking ledgers through blockchain technologies: Future of transaction processing and smart contracts on the internet of money." In *Banking Beyond Banks and Money*, pp. 239-278. Springer, Cham, 2016.

Porru, Simone, Andrea Pinna, Michele Marchesi, and Roberto Tonelli. "Blockchain-oriented software engineering: challenges and new directions." In *Proceedings of the* 39*th International Conference on Software Engineering Companion*, pp. 169-171. IEEE Press, 2017.

R A Markus Heinker (2007). "Beweiswürdigung elektronischer Dokumente im Zivilprozess unter vergleichender Betrachtung von qualifizierten elektronischen Signaturen nach dem Signaturgesetz und dem Askemos-Verfahren";

RootStock (RSK) is a smart contract platform that is connected to the Bitcoin blockchain through sidechain technology. RSK is compatible with smart contracts created for Ethereum. See:

Rosa, Davide De. "The Bitcoin Script language (pt. 1)". davidederosa.com;

Ross, Rory (2015-09-12). "Smart Money: Blockchains Are the Future of the Internet", Newsweek;

Savelyev, Alexander. "Contract law 2.0:'Smart'contracts as the beginning of the end of classic contract law." *Information & Communications Technology Law* 26, no. 2 (2017): 116-134.

Seijas, Pablo Lamela, Simon Thompson, and Darryl McAdams. "Scripting smart contracts for distributed ledger technology." Cryptology ePrint Archive (2016).

Smart contract infrastructure can be implemented by replicated asset registries and contract execution using cryptographic hash chains and Byzantine fault tolerant replication. See:

Swan, Melanie. "Blockchain temporality: smart contract time specifiability with blocktime." In *International symposium on rules and rule markup languages for the semantic web*, pp. 184-196. Springer, Cham, 2016.

Szabo, Nick (1997-09-01). "Formalizing and Securing Relationships on Public Networks". First Monday. 2 (9);

Szabo, Nick (2005). "Secure Property Titles with Owner Authority";

Szabo, Nick, "Smart Contracts: Building Blocks for Digital Markets". www.fon.hum.uva.nl, Extropy #16 (1996).

Szabo, Nick. "Formalizing and securing relationships on public networks." *First Monday* 2, no. 9 (1997).

Tapscott, Don; Tapscott, Alex (May 2016). The Blockchain Revolution: How the Technology Behind Bitcoin is Changing Money, Business, and the World. pp. 72, 83, 101, 127. ISBN 978-0670069972.

Thomas Bocek (15 Sep. 2017). Digital Marketplaces Unleashed. Springer-Verlag GmbH. p. 169-184. ISBN 978-3-662-49274-1.

Vukolić, Marko. "Rethinking permissioned blockchains." In *Proceedings of the ACM Workshop on Blockchain, Cryptocurrencies and Contracts*, pp. 3-7. ACM, 2017.

Vukolić, Marko. "The quest for scalable blockchain fabric: Proof-of-work vs. BFT replication." In *International Workshop on Open Problems in Network Security*, pp. 112-125. Springer, Cham, 2015.

Watzke, Tom-Steve (2010). "Entwicklung einer Datenbankschnittstelle als Grundlage für Shop-Systeme unter dem Betriebssystem Askemos".

Weber, Ingo, Xiwei Xu, Régis Riveret, Guido Governatori, Alexander Ponomarev, and Jan Mendling. "Untrusted business process monitoring and execution using blockchain." In *International Conference on Business Process Management*, pp. 329-347. Springer, Cham, 2016.

Wigan, David (2015-06-11). "Bitcoin technology will disrupt derivatives, says banker", IFR Asia.

Wittenberger, Jörg F. (2002). "Askemos a distributed settlement".

Xu, Xiwei, Cesare Pautasso, Liming Zhu, Vincent Gramoli, Alexander Ponomarev, An Binh Tran, and Shiping Chen. "The blockchain as a software connector." In Software Architecture (WICSA), 2016 13*th Working IEEE/IFIP Conference on*, pp. 182-191. IEEE, 2016.

Xu, Xiwei, Ingo Weber, Mark Staples, Liming Zhu, Jan Bosch, Len Bass, Cesare Pautasso, and Paul Rimba. "A taxonomy of blockchain-based systems for architecture design." In *Software Architecture* (*ICSA*), 2017 *IEEE International Conference on*, pp. 243-252. IEEE, 2017.

Yasin, Affan, and Lin Liu. "An online identity and smart contract management system." In *Computer Software and Applications Conference* (*COMPSAC*), 2016 IEEE 40th Annual, vol. 2, pp. 192-198. IEEE, 2016.

Zhang, Fan, Ethan Cecchetti, Kyle Croman, Ari Juels, and Elaine Shi. "Town crier: An authenticated data feed for smart contracts." In *Proceedings of the* 2016 *aCM sIGSAC conference on computer and communications security*, pp. 270-282. ACM, 2016.

Zheng, Zibin, Shaoan Xie, Hong-Ning Dai, and Huaimin Wang. "Blockchain challenges and opportunities: A survey." *Work Pap.*-2016 (2016).

See, US Patent and Patent Application Nos. U.S. Pat. Nos. 6,324,286; 6,938,039; 9,014,661; 9,135,787; 9,298,806; 9,300,467; 9,331,856; 9,338,148; 9,351,124; 9,397,985; 9,413,735; 9,436,923; 9,436,935; 9,480,188; 9,507,984; 9,509,690; 9,513,627; 9,558,524; 9,563,873; 9,569,771; 9,608,829; 9,635,000; 9,641,338; 9,641,342; 9,665,734; 9,667,427; 9,667,600; 9,679,276; 9,702,582; 9,703,986; 9,705,682; 9,705,851; 9,710,808; 9,716,595; 9,722,790; 9,743,272; 9,747,586; 9,749,140; 9,749,297; 9,749,766;

9,754,131; 9,760,574; 9,760,827; 9,767,520; 9,773,099; 9,774,578; 9,785,369; 9,792,101; 9,794,074; 9,805,381; 9,807,106; 9,818,092; 9,818,116; 9,820,120; 9,824,031; 9,824,408; 9,825,931; 9,832,026; 9,836,908; 9,847,997; 9,848,271; 9,849,364; 9,852,427; 9,853,819; 9,853,977; 9,855,785; 9,858,781; 9,862,222; 9,866,545; 9,870,508; 9,870,562; 9,870,591; 9,875,510; 9,875,592; 9,876,646; 9,876,775; 9,881,176; 9,882,918; 9,888,007; 9,892,141; 9,892,460; 9,894,485; 9,898,782; 9,904,544; 9,906,513; 9,910,969; 9,912,659; 10,022,613; 10,046,228; 10,195,513; 10,476,847; 10,532,268; 10,789,590; 10,861,015; 10,936,871; 10,997,251; 11,057,353; 11,068,978; 11,130,042; 20050203815; 20140344015; 20140368601; 20150067143; 20150081566; 20150127940; 20150170112; 20150206106; 20150244690; 20150262137; 20150262138; 20150262139; 20150262140; 20150262141; 20150262168; 20150262171; 20150262172; 20150262176; 20150269624; 20150278820; 20150278887; 20150294425; 20150310476; 20150324764; 20150332256; 20150332283; 20150348169; 20150356524; 20150356555; 20150379510; 20160005032; 20160012424; 20160012465; 20160027229; 20160028552; 20160055236; 20160071108; 20160072800; 20160092988; 20160098723; 20160098730; 20160117471; 20160123620; 20160134593; 20160140653; 20160170996; 20160170998; 20160171514; 20160180338; 20160191243; 20160192166; 20160203448; 20160203522; 20160203572; 20160203575; 20160210626; 20160210710; 20160212109; 20160212146; 20160217436; 20160217532; 20160218879; 20160224803; 20160224949; 20160234026; 20160253663; 20160254910; 20160259923; 20160260091; 20160260169; 20160261411; 20160267472; 20160267474; 20160267558; 20160267566; 20160267601; 20160267605; 20160269182; 20160269402; 20160275461; 20160283920; 20160283939; 20160283941; 20160284033; 20160292396; 20160292672; 20160292680; 20160294783; 20160300200; 20160300223; 20160300234; 20160300252; 20160306982; 20160307197; 20160321316; 20160321434; 20160321435; 20160321629; 20160321654; 20160321675; 20160321676; 20160321751; 20160321752; 20160321769; 20160323109; 20160327294; 20160328713; 20160330027; 20160330034; 20160335533; 20160335609; 20160342958; 20160342959; 20160342976; 20160342977; 20160342978; 20160342980; 20160342981; 20160342982; 20160342983; 20160342984; 20160342985; 20160342986; 20160342987; 20160342988; 20160342989; 20160342994; 20160350728; 20160350749; 20160357550; 20160358158; 20160358165; 20160358169; 20160358184; 20160358186; 20160358187; 20160358253; 20160358267; 20160359637; 20160364700; 20160364787; 20160365978; 20160371771; 20160379212; 20160379213; 20160379256; 20160379298; 20160379312; 20160379330; 20170004563; 20170004578; 20170004588; 20170005804; 20170011053; 20170011392; 20170011460; 20170012780; 20170012943; 20170013047; 20170017936; 20170017954; 20170017955; 20170017958; 20170019496; 20170024817; 20170024818; 20170028622; 20170031676; 20170031874; 20170033932; 20170034197; 20170039330; 20170041148; 20170042068; 20170046526; 20170046638; 20170046651; 20170046652; 20170046664; 20170046670; 20170046680; 20170046689; 20170046693; 20170046694; 20170046698; 20170046709; 20170046799; 20170046806; 20170048209; 20170048216; 20170048234; 20170048235; 20170052676; 20170053036; 20170053131; 20170054611; 20170061396; 20170070778; 20170075877; 20170075938; 20170075941; 20170076109; 20170076306; 20170078097; 20170078493; 20170083907; 20170083911; 20170083989; 20170084118; 20170085545; 20170085555; 20170088397; 20170091397; 20170091467; 20170091750; 20170091756; 20170098291; 20170103167; 20170103385; 20170103390; 20170103391; 20170103468; 20170103472; 20170104831; 20170109475; 20170109636; 20170109637; 20170109638; 20170109639; 20170109640; 20170109657; 20170109667; 20170109668; 20170109670; 20170109676; 20170109735; 20170109744; 20170109748; 20170109814; 20170109955; 20170111175; 20170111385; 20170115976; 20170116693; 20170118301; 20170124535; 20170124556; 20170124647; 20170126702; 20170131988; 20170132393; 20170132615; 20170132619; 20170132620; 20170132621; 20170132625; 20170132626; 20170132630; 20170132635; 20170132636; 20170134161; 20170134162; 20170134280; 20170134326; 20170134375; 20170134937; 20170140145; 20170140371; 20170140375; 20170140394; 20170140408; 20170147808; 20170147975; 20170148016; 20170148021; 20170149560; 20170149795; 20170149796; 20170149819; 20170150939; 20170154331; 20170155515; 20170161439; 20170161517; 20170161652; 20170161697; 20170161733; 20170161734; 20170161762; 20170161829; 20170161833; 20170163733; 20170169125; 20170169363; 20170169473; 20170169800; 20170173262; 20170177855; 20170177898; 20170178127; 20170178128; 20170178236; 20170178237; 20170178263; 20170178417; 20170180128; 20170180134; 20170180211; 20170185692; 20170185981; 20170185998; 20170186057; 20170187535; 20170188168; 20170191688; 20170192994; 20170193464; 20170193619; 20170195299; 20170195336; 20170195397; 20170195747; 20170198931; 20170199671; 20170200137; 20170200147; 20170201385; 20170205102; 20170206382; 20170206522; 20170206523; 20170206532; 20170206603; 20170206604; 20170207917; 20170212781; 20170213198; 20170213209; 20170213210; 20170213221; 20170213287; 20170213289; 20170214522; 20170214675; 20170214699; 20170214701; 20170220781; 20170220815; 20170220998; 20170221021; 20170221029; 20170221032; 20170221052; 20170222814; 20170228371; 20170228557; 20170228705; 20170228706; 20170228731; 20170228734; 20170228822; 20170228841; 20170230189; 20170230285; 20170230345; 20170230349;

20170230353; 20170230375; 20170230791; 20170232300; 20170232300; 20170234709; 20170235970; 20170236094; 20170236102; 20170236103; 20170236104; 20170236120; 20170236121; 20170236123; 20170236143; 20170236177; 20170236196; 20170237553; 20170237554; 20170237569; 20170237570; 20170237700; 20170238072; 20170242475; 20170243025; 20170243177; 20170243179; 20170243193; 20170243208; 20170243209; 20170243212; 20170243213; 20170243214; 20170243215; 20170243216; 20170243217; 20170243222; 20170243239; 20170243241; 20170243284; 20170243286; 20170243287; 20170244707; 20170244720; 20170244721; 20170244757; 20170244909; 20170249482; 20170249623; 20170250796; 20170250815; 20170250972; 20170251025; 20170255912; 20170256000; 20170256001; 20170256003; 20170256951; 20170257358; 20170262778; 20170262862; 20170262902; 20170264428; 20170265789; 20170270492; 20170270493; 20170270527; 20170277909; 20170278080; 20170278186; 20170279620; 20170279774; 20170279783; 20170279818; 20170285720; 20170286717; 20170286880; 20170286951; 20170287068; 20170287090; 20170289111; 20170289124; 20170289134; 20170291295; 20170293503; 20170293669; 20170293898; 20170293912; 20170295021; 20170295023; 20170295157; 20170295180; 20170295232; 20170300627; 20170300872; 20170300875; 20170300876; 20170300877; 20170300898; 20170300905; 20170300910; 20170300928; 20170300946; 20170300978; 20170301031; 20170301033; 20170301047; 20170302450; 20170302460; 20170307387; 20170308070; 20170308893; 20170308920; 20170308928; 20170309117; 20170310484; 20170310653; 20170310747; 20170316162; 20170316390; 20170316391; 20170316409; 20170316410; 20170316487; 20170316497; 20170317833; 20170317834; 20170317997; 20170318008; 20170323294; 20170323392; 20170324738; 20170329922; 20170329980; 20170329996; 20170330143; 20170330159; 20170330174; 20170330179; 20170330180; 20170330181; 20170330250; 20170331624; 20170331635; 20170331810; 20170331828; 20170331896; 20170337534; 20170338947; 20170338957; 20170338963; 20170338967; 20170339503; 20170344435; 20170344580; 20170344983; 20170344987; 20170344988; 20170345011; 20170345019; 20170345105; 20170346637; 20170346639; 20170346693; 20170346752; 20170346804; 20170346830; 20170346833; 20170346907; 20170347253; 20170351693; 20170352012; 20170352027; 20170352031; 20170352033; 20170352116; 20170352185; 20170352219; 20170353309; 20170353311; 20170353320; 20170357966; 20170357970; 20170358041; 20170359288; 20170359316; 20170359374; 20170359408; 20170364450; 20170364552; 20170364637; 20170364655; 20170364698; 20170364699; 20170364700; 20170364701; 20170364702; 20170364825; 20170364860; 20170364871; 20170364900; 20170364908; 20170364934; 20170364936; 20170366348; 20170366353; 20170366395; 20170366416; 20170366516; 20170366547; 20170372278; 20170372300; 20170372308; 20170372391; 20170372392; 20170372431; 20170373849; 20170374049; 20180000367; 20180001184; 20180005186; 20180005318; 20180005326; 20180005489; 20180005492; 20180006826; 20180006829; 20180006831; 20180006990; 20180007131; 20180012195; 20180012262; 20180012311; 20180013567; 20180013815; 20180015838; 20180017791; 20180018590; 20180018655; 20180018695; 20180018723; 20180018738; 20180019867; 20180019872; 20180019873; 20180019879; 20180019921; 20180019984; 20180019993; 20180020324; 20180025135; 20180025140; 20180025166; 20180025181; 20180025272; 20180025365; 20180025368; 20180025388; 20180025401; 20180025435; 20180025442; 20180026979; 20180032273; 20180032383; 20180032696; 20180032759; 20180034634; 20180034636; 20180034642; 20180034804; 20180039397; 20180039512; 20180039667; 20180039785; 20180039786; 20180039942; 20180039982; 20180039993; 20180040007; 20180040040; 20180040041; 20180040062; 20180041072; 20180041338; 20180041345; 20180041445; 20180041446; 20180041486; 20180041487; 20180041571; 20180043386; 20180046766; 20180046956; 20180046992; 20180047111; 20180048461; 20180048463; 20180048469; 20180048485; 20180048738; 20180052462; 20180052813; 20180052926; 20180052927; 20180052970; 20180053158; 20180053160; 20180053161; 20180053182; 20180054436; 20180054491; 20180060496; 20180060596; 20180060600; 20180060771; 20180060835; 20180060836; 20180060860; 20180060927; 20180061237; 20180062831; 20180062835; 20180062848; 20180063099; 20180063139; 20180063189; 20180063238; 20180068091; 20180068097; 20180068130; 20180068271; 20180068282; 20180068359; 20180069798; 20180069899; 20180078843; 20180117446; 20180117447; 20180264347; 20180285971; 20180308072; 20180326291; 20190012660; 20190043043; 20190080392; 20190147553; 20190279240; 20190279241; 20190303926; 20190347605; 20190358515; 20190361917; 20200042989; 20200051188; 20200101367; 20200112545; 20200117690; 20200162254; 20200184556; 20200202427; 20200202429; 20200219188; 20200273099; 20200273100; 20200273101; 20200286196; 20200294128; 20200294129; 20200294131; 20200294132; 20200294133; 20200294134; 20200294135; 20200294136; 20200294137; 20200294138; 20200294139; 20200302523; 20200302525; 20200327609; 20200357024; 20200359550; 20200359582; 20200364456; 20200387896; 20200387965; 20200387966; 20200387967; 20200387968; 20200394652; 20200394708; 20200394709; 20210042823; 20210065293; 20210073540; 20210097198; 20210110469; 20210158440; 20210158441; 20210166233; 20210166309; 20210166310;

20210166311; 20210182915; 20210182961; 20210201315; 20210248514; 20210256070; 20210264000; 20210264426; 20210271877; 20210279797; 20210304089; 20210304119; 20210312545; 20210342836; 20210354295; 20210356941; 20210357029; 20210358032; 20210365574; AU2018230763A1; AU2018309748A1; AU2019245423A1; AU2019369396A1; AU2019370273A1; AU2020271014A1; CA3055829A1; CA3098150A1; CA3118308A1; CA3118313A1; CA3136435A1; EP3593305A1; EP3649601A1; EP3776438A1; EP3809291A1; EP3861517A1; EP3874442A2; EP3874443A2; EP3903269A1; JP2019159935A; JP2021177422A; JP2021515296A; JP2021520010A; JP6922097B2; KR20210024993A; WO2018165472A1; WO2019028068A1; WO2019191687A1; WO2019217379A1; WO2020092426A2; WO2020092446A2; WO2020097115A1; WO2020106882A1; WO2020106882A9; WO2020139980A1; WO2020205642A1; WO2020210076A1; WO2021158702A1

Non-fungible Tokens

A non-fungible token (NFT) is a unique and non-interchangeable unit of data stored on a digital ledger (blockchain). NFTs can be associated with published digital works, and used to distinguish between possession of a copy of the work and rights with respect to the work. The NFT may be used analogously to a certificate of authenticity, and use blockchain technology to give the NFT a public proof of ownership. The lack of interchangeability (fungibility) distinguishes NFTs from blockchain cryptocurrencies, such as Bitcoin.

An NFT is a unit of data stored on a digital ledger, transfers of which can be transferred on the digital ledger. The ledger may be distributed, and be implemented as a blockchain. The NFT can be associated with a particular digital or physical asset (such as a file or a physical object).

NFTs function like cryptographic tokens, but, unlike cryptocurrencies like Bitcoin, NFTs are not mutually interchangeable, hence not fungible. As a result, tokens have a value associated with the rights linked to the token, and not represented by the token itself. NFTs may be created by recording a record on a blockchain, which is then verifiable dependent on the blockchain. Changes of ownership may be recorded on the blockchain. Ownership of an NFT does not inherently grant copyright or intellectual property rights to whatever digital asset the token represents. While someone may sell an NFT representing their work, the buyer will not necessarily receive any exclusive rights to the underlying work, and so the original owner may be allowed to create more NFTs of the same work. On the other hand, if the original work is itself a creature of the blockchain, then a "rule" may be imposed limiting the number of NFTs that may be issued, or other exclusive rights of the recipient. In that sense, an NFT is merely a proof of ownership that is separate from a copyright. The unique identity and ownership of an NFT is verifiable via the blockchain ledger. Ownership of the NFT is often associated with a license to use the underlying digital asset, but generally does not confer copyright to the buyer, some agreements only grant a license for personal, non-commercial use, while other licenses also allow commercial use of the underlying digital asset.

Specific token standards have been created to support various blockchain use-cases. Ethereum was the first blockchain to support NFTs with its ERC-721 standard and is currently the most widely used. Many other blockchains have added or plan to add support for NFTs with their growing popularity. ERC-721 is an inheritable Solidity smart contract standard, meaning that developers can create new ERC-721-compliant contracts by importing them from the OpenZeppelin library. ERC-721 provides core methods that allow tracking the owner of a unique identifier, as well as a permissioned way for the owner to transfer the asset to others.

The ERC-1155 standard offers "semi-fungibility", as well as providing a superset of ERC-721 functionality (meaning that an ERC-721 asset could be built using ERC-1155). Unlike ERC-721 where a unique ID represents a single asset, the unique ID of an ERC-1155 token represent a class of assets, and there is an additional quantity field to represent the amount of the class that a particular wallet has. The assets under the same class are interchangeable, and the user can transfer any amount of assets to others.

Because Ethereum currently has high transaction fees (known as gas fees), layer 2 solutions for Ethereum have emerged which also supports NFTs: Immutable X—Immutable X is a layer 2 protocol for Ethereum designed specifically for NFTs, utilizing ZK rollups to eliminate gas fees for transactions; and Polygon—Formerly known as the Matic Network, Polygon is a proof-of-stake blockchain which is supported by major NFT marketplaces such as OpenSea.

Bitcoin Cash supports NFTs and powers the Juungle NFT marketplace. Cardano introduced native tokens that would enable the creation of NFTs without smart contracts with its March 2021 update. Cardano NFT marketplaces include CNFT and Theos. The FLOW blockchain which uses proof of stake consensus model supports NFTs. Cryptokitties plans to switch from Ethereum to FLOW in the future. GoChain, a blockchain which bills itself as being 'eco-friendly', also supports NFTs, powering the Zeromint NFT marketplace and the VeVe app. Solana—The Solana blockchain also supports non-fungible tokens. Tezos is a blockchain network that operates on proof of stake and supports the sale of NFT art. In 2019, Nike patented a system called CryptoKicks that would use NFTs to verify the authenticity of physical sneakers and give a virtual version of the shoe to the customer. Dapper Labs released the beta version of NBA TopShot, a project to sell tokenized collectibles of NBA highlights. The project was built on top of Flow, a newer and more efficient blockchain compared to Ethereum.

Some more recent NFT technologies use validation protocols distinct from proof of work, such as proof of stake, that have much less energy usage for a given validation cycle. Other approaches to reducing electricity include the use of off-chain transactions as part of minting an NFT.

The distinctive feature of ERC1155 is that it uses a single smart contract to represent multiple tokens at once. This is why its balanceOf function differs from ERC20's and ERC777's: it has an additional id argument for the identifier of the token that you want to query the balance of. This is similar to how ERC721 does things, but in that standard a token id has no concept of balance: each token is non-fungible and exists or doesn't. The ERC721 balanceOf function refers to how many different tokens an account has, not how many of each. On the other hand, in ERC1155 accounts have a distinct balance for each token id, and non-fungible tokens are implemented by simply minting a single one of them. This approach leads to massive gas savings for projects that require multiple tokens. Instead of deploying a new contract for each token type, a single ERC1155 token contract can hold the entire system state, reducing deployment costs and complexity. Because all state is held in a single contract, it is possible to operate over multiple tokens in a single transaction very efficiently. The standard provides two functions, balanceOfBatch and safeBatchTransferFrom, that make querying multiple balances and transferring multiple tokens simpler and less gas-intensive.

Smart contracts deployed on blockchains enable the creation of new types of digital assets, called tokens, that can interact with each other. In general, all kinds of digital information or assets can be customized in the form of tokens, whose process refers to tokenization. After digital assets are tokenized, they can be recorded on the blockchain. Different blockchains may have different tokenization processes. Currently, the most well-known guideline to create a token is a series of Ethereum Request for Comments (ERCs), which describe the fundamental functionalities and provide guidelines that a token should comply with working correctly on the Ethereum network. Within ERCs, various types of tokens are defined regarding the features of assets, e.g., ERC-20 for divisible assets and ERC-721 for indivisible assets. Once a token representation of a digital asset is created on a blockchain, it can be traded via a process known as an Initial Coin Offering (ICO), the online sale of created tokens.

Tokens can represent assets on the blockchain to facilitate transactions, whose representations, tokens, are roughly categorized into fungible tokens (FT) and non-fungible tokens (NFT), based on the fungibility of assets. Fungible tokens are exchangeable and identical in all aspects and generally divisible, while non-fungible tokens cannot be substituted for other tokens even with the same type and (at least to the extent compliant with prior standards) are indivisible. One classic example of fungible tokens is crypto-currencies, in which all the coins generated for crypto-currencies are equivalent and indistinguishable. On the other hand, non-fungible tokens are typically unique and specially identified, which cannot be exchanged in a fungible way, making them suitable for identifying unique assets. Furthermore, with the help of smart contracts on the blockchain, one can easily prove the existence and ownership of digital assets, and the full-history tradability and interoperability of blockchain assets make NFTs become a promising intellectual property protection solution.

Digital assets vary in terms of fungibility, which is a characteristic of a token that indicates whether assets can be entirely interchangeable during an exchange process. Fungible tokens of the same type are identical (like coins are identical), being divisible into smaller units (like coins of different values). Non-fungible tokens have been employed to represent unique assets (e.g., collectables, certificates of any kind, any type of access rights, objects, etc.). Thus, an NFT is unique, indivisible, and different from other tokens even with the same type. There exist several well-known crypto-tokens: crypto-coins, asset-tokens, and utility-tokens. From the perspective of fungibility, crypto coins typically belong to fungible tokens, and both asset-tokens and utility-tokens are non-fungible tokens. Crypto coins are commonly referred to as crypto-currencies, with the help of blockchain, which can be used as a medium of exchange of currencies without resorting to any centralized banks. Asset-tokens typically can be used to represent a wide range of assets beyond crypto-currencies, e.g., assets with physical existence (i.e., real properties) or without physical existence (i.e., stock shares). Utility-tokens are typically used to represent a unit of product or service, or tokens that enable future access to a product of service.

In general, a token is affected by four operations in its lifecycle. The issuer (often as a seller) first creates the token (e.g., via smart contracts). If traded on a trading market, the buyer then bids upon the token, at which point agreement, the seller transfers the token's value to the buyer. Finally, the new owner (e.g., the buyer) of a token can redeem the value of the token. This description describes a general model of a token life-cycle. When a token is created on a blockchain, e.g., public blockchain, everyone can see how it was developed and linked to the underlying right or asset. Due to the anonymity or pseudonymity of blockchain, when legal disputes arise from the creation and use of digital assets, it is often not enough to match these assets with the real-life owner or creator of the token, which makes the verification process of assets difficult. (anonymity or pseudonymity are optional, and therefore this may not be a significant problem). Most existing tokens are required to operate with smart contracts to verify their ownership and manage their transferability.

Blockchain is a publicly known distributed ledger technology underlying many digital crypto-currencies, such as Bitcoin. In a broad sense, blockchain can be roughly explained as an immutable, decentralized, trusted, and distributed ledger based on decentralized (e.g., peer-to-peer (P2P)) networks. Essentially, blockchain is a distributed data structure and is labelled as a "distributed ledger" in its applications, functioning to record transactions generated within a network. As a distributed and decentralized ledger, the essential component of blockchain is data, alternatively called transaction. The transaction information can be considered a token transferring process occurring in a network or any data exchange. Atomicity Consistency Isolation Durability (ACID) provides general principles for transaction processing systems, e.g., blockchain. A transaction in an ACID system should have the following features for a blockchain system: (a) a transaction (or a transaction block consisting of multiple transactions) is executed as a whole or not at all (e.g., enabling the feature of "all or nothing"); (b) each transaction transforms the system from one consistent and valid state to another, without compromising any validation rules and data integrity constraints; (c) concurrent transactions are executed securely and independently, preventing them from being affected by other transactions; and (d) once a transaction has been successfully executed, all changes generated by it become permanent even in the case of subsequent failures. Some indivisible assets require strong atomicity on the contained information, e.g., as one piece, while others (e.g., most crypto-currencies) can be dividable.

The Ethereum platform can be used to create arbitrary smart contracts, whose tokens (aka. Ethereum tokens) can be used to represent various digital assets. These tokens can represent anything from both physical objects and virtual objects. They can use them for a variety of purposes, e.g., recording transactional data information or paying to access a network. The mapping process between a token and its representative asset is initially purely fictitious. The token contains the asset model that is certified by a smart contract to guarantee the uniqueness of data. In general, tokens will not depend on operating systems and do not include physical content within, and via the smart contract, it is easy to verify the validity of a token.

Tokenization is the transformation process of data/assets into a random digitized sequence of characters (aka. a token). It simplifies the process of representing physical/virtual assets and provides some protection on sensitive data, e.g., by substituting non-sensitive data into a token.

The token serves merely as a reference to the original data or assets for blockchain applications but cannot be utilized to determine those values. A token itself does not include economic value information in it, and the "monetary" value of a token typically is assigned by the market. Thus, we can consider a token as a symbol that is validated by smart contracts of the target blockchain system. As long as validated by the smart contract, the token can be used in numerous applications or be traded in the market. Tokenization of real-world assets is a trend that generates much interest in blockchain research. Tokenization on the blockchain provides many advantages. For instance, tokenization eliminates most financial, legal, and regulatory intermediaries, resulting in significantly lower transaction costs.

A fungible asset can be interchangeable with other assets of the same category or type. Fungibility refers to an asset's capacity to be interchanged with other assets of the same or similar types. In other words, fungibility is one kind of property of a token that specifies whether objects or quantities of a similar type can be freely interchangeable during a trade or utilization. In general, in the finance domain, fungible assets simplify the exchange and trade processes, as fungibility implies equal value among the involved assets. In the token domain, some of them are purely equal (aka. perfectly fungible tokens), while others possess distinct characteristics which ensure their uniqueness (aka. non-fungible tokens).

The fungibility of a token refers to the fact that the token has the same or similar content compared to other fungible tokens. Thus, fungible tokens are interchangeable/replaceable with, or equal to, another asset of the same category. For example, A fungible token can be readily substituted by other assets of the same or equivalent value that may be divided or exchanged. They are identical to one another and can be divided into smaller units, which does not affect their values. Furthermore, fungible tokens typically are not unique. For example, a payment token is always fungible, which is exchangeable, divisible, and not unique in nature. From a technical perspective, a fungible token is implemented as a list of blockchain addresses (user accounts) that have a number (quantity) associated with them, together with (1) a set of methods used to manipulate that list, such as 'transfer n tokens from address a to address b', and (2) rules to determine who can manipulate that list in which way. Under applications of the Ethereum blockchain, ERC-20 (or Ethereum Request for Comments #20) is an example of fungible tokens. It is a specification established upon by the Ethereum community (a community that endorses ERCs) that specifies certain fundamental functionalities and provides criteria for a token to comply with performing correctly on Ethereum blockchains. An ERC-20 token is a token that follows ERC-20 guidelines. They have some inherent feature that makes one token identical to another token in terms of type and value. For example, an ERC-20 token functions similarly to ETH on the Ethereum blockchain, in that one token always have an equal value to all other tokens. Besides, the ERC-20 standard specifies a common interface for fungible tokens that are divisible and not distinguishable, which further ensures interoperability among the Ethereum blockchain community.

A non-fungible token (NFT) is a cryptographically unique token, which can be used to keep track of the ownership of individual assets. Non-fungible tokens differ from fungible tokens in terms of interchangeability, uniformity, and divisibility. A non-fungible token cannot be divided in nature, in which each one contains some distinctive information and attributes to identify itself from others uniquely. This feature makes NFTs impossible to interchange with each other. In general, each non-fungible token is unique and differs from others. The ERC-20 standard provides the technological framework and best practices for fungible token creation under Ethereum blockchains. Similarly, the ERC-721 standard did the same for non-fungible tokens, which allows the developers to create a digital asset representation that can be exchanged and tracked on the blockchain. The establishment of this new standard was prompted by the fact that there exists a significant difference between fungible and non-fungible tokens in nature. For example, the notion of fungible commonly describes the capacity of each piece of a commodity to be interchanged with other pieces of the same or similar commodity. ERC-721 defines that each NFT token must have a universally unique identifier, whose ownership can be identified and transferred with the help of metadata. In general, the ERC-721 standard specifies an interface that each smart contract on Ethereum that wants to create ERC-721 tokens has to implement.

The key characteristic of NFTs is that they symbolize ownership of digital or physical assets, which can encompass a wide range of assets. This distinguishes NFTs and allows for individual tracking of their ownership. Furthermore, with the help of blockchain, the NFT, as a token, provides the essential verifiable immutability and authenticity, as well as other characteristics like delegation, transfer of ownership, and revocation.

Tokens standards on fungible and non-fungible assets typically facilitate distinct contracts for each token type, which may place some redundant bytecodes on blockchain and limit certain functionality by the nature of separating each token contract. Semi-fungible tokens have the features of both fungible tokens and non-fungible tokens. SFTs provide more flexible interfaces to represent some complex assets or processes. ERC-721 is not the only token standard that exists for NFTs. The Ethereum ERC-1155 standard (Multi Token Standard) is another notable Ethereum variant that offers "semi-fungible" options and the potential to represent both fungible and non-fungible assets. This offers an interface to denote an NFT in a fungible way. For instance, an ERC-1155 token extends the functionality of token identification (aka. tokenId), which can offer configurable token types. This type of token may contain customized information, e.g., metadata, timestamp information, supply, and other attributes In general, the ERC-1155 token is a new token proposal standard to create fungible and non-fungible tokens in the same contract.

In general, semi-fungible tokens can hold and represent the features of both fungible and non-fungible assets. Thus, semi-fungible tokens may be more efficient to create and bundle token transactions (without requiring a mandate unique token contract for each token created). For example, the ERC-1155 token offers some level of flexibility over the ERC-721 token, e.g., creating flexible, re-configurable, or exchangeable tokens with non-fungible features. Accordingly, the token structures and interfaces of SFTs will also be more complex.

Crypto coins are commonly referred to as crypto-currencies; with the help of blockchain, they can be used as a medium of exchange of currencies without resorting to any centralized banks. They are typically used as payment currency or trading currency where payments or trades can be made for goods, services, and fiat currencies. Crypto-coins highly rely on their underlying blockchain systems and protocols. For example, Bitcoin and Ethereum, as crypto-coins, are based on different blockchain systems, and each system runs its own independent ledger. Therefore, they are not directly exchangeable between other systems, but they can be traded via some trading platforms. In general, crypto coins are modelled to represent some intangible and divisible assets. However, they also can be designed for some special purpose, e.g., assigning a unique number or value for each coin.

Asset-tokens typically can be used to represent a wide range of assets beyond crypto-currencies, e.g., assets with physical existence (i.e., real properties) or without physical existence (i.e., stock shares). These kinds of tokens are commonly implemented and verified via smart contracts. Typically, asset tokens are implemented as non-fungible tokens that are digitally unique. While asset-tokens can also be in the form of fungible tokens, they require that each unit of the asset be uniquely identified and hold the same characteristics within their representative systems. For example, Colored Coin, as a fungible token, describes a class of methods on how to represent and manage some specific types of real-world and physical assets, which enable them to be exchanged on top of a Bitcoin network. These kinds of asset-tokens would require some verification schemes (e.g., in the form of smart contracts) to verify the validity of fungibility.

Utility-tokens are typically used to represent a unit of product or service or tokens that enable future access to a product of service. Utility-tokens are not like crypto-currencies that are designed for investment or made for exchange purposes, and they are designed as a service that can be purchased. However, in practice, some situations may exist in which the same product or service can be distributed to multiple users and allow them to exchange utility information with each other. Typically, utility tokens belong to fungible tokens. For example, ERC-20 compatible tokens on the Ethereum platform are considered utility tokens. The utility tokens are generally valid between users within a network or community.

Authenticity. The standardization of NFT, with the help of blockchain and smart contracts, makes each token uniquely identifiable and authentic, and the token information can be recorded in a blockchain which makes them immutable and trustworthy. Theoretically, there is no efficient way to copy or duplicate a unique token once the token is recorded in the blockchain, which helps prevent fraudulent items and protect intellectual property. Also, the transparency of blockchain makes it possible to verify and prove the authenticity of each NFT. Therefore, when NFT is equipping with blockchain, it can effectively prevent the counterfeiting and fraud problems in many industrial use cases, such as art and collectables.

Ownership. At the heart of NFT is uniqueness and ownership, and a token is required to prove its ownership of an asset. Ownership means that an NFT can only be transacted and transferred by the owner of the asset (not the owner of the issuer) due to the smart contracts and associated rights. Even the issuer of an NFT cannot replicate or transfer the NFT without permission from its owner. An NFT token on a blockchain can track ownership and, therefore, authenticity, undeniably proving ownership. For example, the ERC-721 standard defines the minimum interfaces, including ownership details, security, and metadata, and the ownership is assigned to the owner of the asset.

Transferability. NFTs recorded on a blockchain are decentralized, and no centralized authority can regulate the movements of these tokens over the blockchain systems. In general, an NFT only belongs to one owner at any time, whose unique data structure offers a simple way to verify its ownership and to transfer the token among owners. The owner of the creator can also store specific information inside them to clarify the ownership, making NFTs transferable. NFTs also have other features, such as scarcity and indestructibility.

docs.openzeppelin.com/contracts/3.x/erc1155 en.wikipedia.org/wiki/Non-fungible_token

"EIP-1155: ERC-1155 Multi Token Standard". Ethereum Improvement Proposals. Retrieved 2021-04-05.

"EIP-721: ERC-721 Non-Fungible Token Standard". Ethereum Improvement Proposals. Retrieved 2021-04-05.

"Memes for Sale? Making sense of NFTs". Harvard Law Today. Retrieved 26 Jun. 2021.

"NFTS Nifty Copyright Issues—Intellectual Property—Canada".

"The Cult of CryptoPunks". TechCrunch. Retrieved 2021-05-05.

"Uniswap UNI Token was "Shining Star" of DeFi this Past Week, while Ethereum based NFTs Rising in Popularity, OKEx Reports". Crowdfund Insider. 2021-03-07. Retrieved 2021-04-09.

"WTF Is an NFT, Anyway? And Should I Care?". Wired. ISSN 1059-1028. Retrieved 2021-03-13.

Abbruzzese, Jason (16 Jun. 2017). "This ethereum-based project could change how we think about digital art". Mashable. Retrieved 2021-04-06.

Ahmad Sghaier Omar and Otman Basir. Capability-based non-fungible tokens approach for a decentralized aaa framework in iot., 2020.

Ahmad Sghaier Omar. Decentralized identity and access management framework for internet of things devices. 2020.

Alexei Zamyatin, Mustafa Al-Bassam, Dionysis Zindros, Eleftherios Kokoris-Kogias, Pedro Moreno-Sanchez, Aggelos Kiayias, and William J Knottenbelt. Sok: communication across distributed ledgers. 2019.

Apptunix. The rise of non fungible tokens—benefits, features, risks and scope. www.apptunix.com/blog/the-rise-of-non-fungible-tokens-benefits-features-risks-and-scope/, 2021.

Ariel J Feldman, William P Zeller, Michael J Freedman, and Edward W Felten. Sporc: Group collaboration using untrusted cloud resources. In *OSDI*, volume 10, pages 337-350, 2010.

Babu Pillai, Kamanashis Biswas, and Vallipuram Muthukkumarasamy. Blockchain interoperable digital objects. In *International Conference on Blockchain*, pages 80-94. Springer, 2019.

Boscovic, Dragan. "How nonfungible tokens work and where they get their value—a cryptocurrency expert explains NFTs". The Conversation. Retrieved 2021-04-08.

Chevet, Sylve (2018-05-10). "Blockchain Technology and Non-Fungible Tokens: Reshaping Value Chains in Creative Industries". Rochester, NY. SSRN 3212662.

Chris Dannen. *Introducing Ethereum and solidity*, volume 318. Springer, 2017.

Chris Dannen. Smart contracts and tokens. In *Introducing Ethereum and Solidity*, pages 89-110. Springer, 2017.

Corinne Bernstein. 5 business use cases for nfts. whatis.techtarget.com/feature/5-business-use-cases-for-NFTs, 2021.

Daniel Uribe and Gisele Waters. Privacy laws, genomic data and non-fungible tokens. *The Journal of The British Blockchain Association*, page 13164, 2020.

Daniele Mazzei, Giacomo Baldi, Gualtiero Fantoni, Gabriele Montelisciani, Antonio Pitasi, Laura Ricci, and Lorenzo Rizzello. A blockchain tokenizer for industrial iot trustless applications. *Future Generation Computer Systems,* 105:432-445, 2020.

Hyland-Wood, David, and Shahan Khatchadourian. A future history of international blockchain standards. *The Journal of the British Blockchain Association,* 1(1):3724, 2018.

Lee, David, Kuo Chuen, Li Guo, and Yu Wang. Cryptocurrency: A new investment opportunity? *The Journal of Alternative Investments,* 20(3):16-40, 2017.

Uzsoki, David, Patrick Guerdat, et al. *Impact tokens: a blockchain-based solution for impact investing. Impact tokens: a blockchain-based solution for impact investing.,* 2019.

Uzsoki, David. *Tokenization of infrastructure: a blockchain-based solution to financing sustainable infrastructure.* International Institute for Sustainable Development, 2019.

deVries, Alex (2018-05-16). "Bitcoin's Growing Energy Problem". Joule.

Entriken, William (Jun. 22, 2018). "Move EIP 721 to Final (#1170) ethereum/EIPs @b015a86". GitHub. Retrieved Nov. 7, 2021.

Entriken, William; Shirley, Dieter; Evans, Jacob; Natassia, Sachs (Jan. 24, 2018). "EIP-721: Non-Fungible Token Standard". Ethereum Improvement Proposals. Retrieved Oct. 28, 2021.

Ethereum. Eip-1155: Erc-1155 multi token standard. Accessed: July, 2021. eips.ethereum.org/EIPS/eip-1155, 2018.

Ethereum. Erc-20 token standard. Accessed: July, 2021. ethereum.org/tr/developers/docs/standards/tokens/erc-20/, 2018.

Ethereum. Ethereum improvement proposals. Accessed: July, 2021. eips. ethereum.org/erc, 2021.

Feige, Uriel, Amos Fiat, and Adi Shamir. "Zero-knowledge proofs of identity." Journal of cryptology 1, no. 2 (1988): 77-94.

Ferdinand Regner, Nils Urbach, and André Schweizer. Nfts in practice-nonfungible tokens as core component of a blockchain-based event ticketing application. 2019.

Florian Glatz. A blockchain token taxonomy. heckerhut.medium.com/a-blockchain-token-taxonomy-fadf5c56139a, 2016.

Florian Tschorsch and Bjorn Scheuermann. Bitcoin and beyond: A technical survey on decentralized digital currencies. *IEEE Communications Surveys & Tutorials,* 18(3):2084-2123, 2016.

Gallersdorfer, Ulrich; Klassen, Lena; Stoll, Christian (2020). "Energy Consumption of Cryptocurrencies Beyond Bitcoin". Joule. 4 (9): 1843-1846. doi:10.1016/j.joule.2020.07.013. PMC 7402366. PMID 32838201.

Gang Wang and Mark Nixon. Intertrust: Towards an efficient blockchain interoperability architecture with trusted services. In 2021 *IEEE International Conference on Blockchain* (*Blockchain*). IEEE, 2021.

Gang Wang. Sok: Exploring blockchains interoperability. *IACR Cryptol. ePrintArch.,* 2021:537, 2021.

Genç, Ekin (2021-10-05). "Investors Spent Millions on 'Evolved Apes' NFTs. Then They Got Scammed". Vice Media. Retrieved 2021-11-09.

Jake Frankenfield. Fungibility. www.investopedia.com/terms/f/fungibility.asp, 2021.

Javier Arcenegui, Rosario Arjona, and Iluminada Baturone. Secure management of iot devices based on blockchain non-fungible tokens and physical unclonable functions. In *International Conference on Applied Cryptography and Network Security*, pages 24-40. Springer, 2020.

Coleman, Jeff, Liam Horne, and Li Xuanji. Counterfactual: Generalized state channels. Acessed: 14.ventures/papers/statechannels.pdf, 4:2019, 2018.

Li, Jiasun, and William Mann. Initial coin offering and platform building. *SSRN Electronic Journal*, pages 1-56, 2018.

Benet, Juan. Ipfs-content addressed, versioned, p2p file system. *arXiv preprint arXiv:*1407.3561, 2014.

Katalyse.io. Security tokens vs. utility tokens—how different are they?hackernoon.com/security-tokens-vs-utility-tokens-how-different-are-they-22d6be8901c2, 2018.

Krause, Max; Tolaymat, Thabet (2018). "Quantification of energy and carbon costs for mining cryptocurrencies". *Nature Sustainability.* 1: 814. doi:10.1038/s41893-018-0188-8.

Oliveira, Luis, Liudmila Zavolokina, Ingrid Bauer, and Gerhard Schwabe. To token or not to token: Tools for understanding blockchain tokens. 2018.

Miraz, Mahdi H, and David C Donald. Atomic cross-chain swaps: development, trajectory and potential of non-monetary digital token swap facilities. *Annals of Emerging Technologies in Computing* (*AETiC*) Vol, 3, 2019.

Matney, Lucas (2021-03-30). "ConsenSys launches a more energy-efficient NFT ecosystem with a project from artist Damien Hirst as its first drop". Techcrunch. Retrieved 2021-04-21.

Herlihy, Maurice. Atomic cross-chain swaps. In *Proceedings of ACM symposium on principles of distributed computing*, pages 245-254, 2018.

Rosenfeld, Meni. Overview of colored coins. *White paper, bitcoil. co. il,* 41:94, 2012.

Borkowski, Michael, Christoph Ritzer, Daniel McDonald, and Stefan Schulte. Caught in chains: claim-first transactions for cross-blockchain asset transfers. *Technische Universität Wien, Whitepaper,* 2018.

Morrow, Monique J., and Mehran Zarrebini. Blockchain and the tokenization of the individual: Societal implications. *Future Internet,* 11(10):220, 2019.

Salek Ali, Muhammad, Massimo Vecchio, Miguel Pincheira, Koustabh Dolui, Fabio Antonelli, and Mubashir Husain Rehmani. Applications of blockchains in the internet of things: A comprehensive survey. *IEEE Communications Surveys & Tutorials,* 21(2):1676-1717, 2018.

Bal, Mustafa, and Caitlin Ner. Nftracer: a non-fungible token tracking proof-ofconcept using hyperledger fabric. *arXiv preprint arXiv:*1905.04795, 2019.

Karandikar, Nikita, Antorweep Chakravorty, and Chunming Rong. Blockchain based transaction system with fungible and non-fungible tokens for a communitybased energy infrastructure. *Sensors,* 21(11):3822, 2021.

Ross, Omri, and Johannes Jensen. Assets under tokenization: Can blockchain technology improve post-trade processing? 2019.

Katsiampa, Paraskevi. Volatility co-movement between bitcoin and ether. *Finance Research Letters,* 30:221-227, 2019.

Aksoy, Pinar Qaglayan, and Zehra Ozkan Oner. Nfts and copyright: challenges and opportunities. *Journal of Intellectual Property Law & Practice,* 2021.

*Proceedings of the 7th International Conference on Cloud Computing and Services Science*, pages 755-764. Scitepress-Science and Technology Publications, Lda, 2017.

Wang, Qin, Rujia Li, Qi Wang, and Shiping Chen. Non-fungible token (nft): Overview, evaluation, opportunities and challenges. *arXiv preprint arXiv:*2105.07447, 2021.

Raman, Ravi Kiran, Roman Vaculin, Michael Hind, Sekou L Remy, Eleftheria K Pissadaki, Nelson Kibichii Bore, Roozbeh Daneshvar, Biplav Srivastava, and Kush R Varshney. Trusted multi-party computation and verifiable simulations: A scalable blockchain approach. *arXiv preprint arXiv:*1809.08438, 2018.

Conti, Robyn, and John Schmidt. What you need to know about non-fungible tokens (nfts). www.forbes.com/advisor/investing/nft-non-fungible-token/, 2021.

Merre, Ruben. Why 2021 will be the year of non-fungible tokens (nfts). www.linkedin.com/pulse/why-2021-year-non-fungible-tokens-nfts-ruben/, 2021.

Nakamoto, Satoshi. Bitcoin: A peer-to-peer electronic cash system. 2008.

Wilkinson, Shawn, Tome Boshevski, Josh Brandoff, and Vitalik Buterin. Storj a peer-to-peer cloud storage network. 2014.

Schulte, Stefan, Marten Sigwart, Philipp Frauenthaler, and Michael Borkowski. Towards blockchain interoperability. In *International Conference on Business Process Management*, pages 3-10. Springer, 2019.

Tai, Stefan, Jacob Eberhardt, and Markus Klems. Not acid, not base, but salt. In Tönnissen, Stefan, Jan Heinrich Beinke, and Frank Teuteberg. Understanding token-based ecosystems—a taxonomy of blockchain-based business models of start-ups. *Electronic Markets,* 30(2):307-323, 2020.

Sun, Zhiyuan (2021-10-07). “Is There Any Hope Left for Cardano?”. The Motley Fool. Retrieved 2021-11-22.

Chevet, Sylve. Blockchain technology and non-fungible tokens: Reshaping value chains in creative industries. Available at SSRN 3212662, 2018.

Evans, Tonya M. Cryptokitties, cryptography, and copyright. *AIPLA QJ,* 47:219, 2019.

Urbach, Nils (Dec. 13, 2019). “NFTs in Practice—Non-Fungible Tokens as Core Component of a Blockchain-based Event Ticketing Application” (PDF). Fraunhofer Research Center, Finance and Information Management. Retrieved Oct. 28, 2021.

Chohan, Usman W. Non-fungible tokens: Blockchains, scarcity, and value. *Critical Blockchain Research Initiative (CBRI) Working Papers,* 2021.

Azevedo, Victor H M, Margareth SP Meirelles, Rodrigo P D Ferraz, and Anténio Ramalho-Filho. Interoperability among heterogeneous geographic objects. In *Advances in Geoinformatics*, pages 193-202. Springer, 2007.

Volpicelli, Gian (24 Feb. 2021). “The bitcoin elite are spending millions on collectable memes”. Wired UK.

Wang, Gang, and Mark Nixon. “SoK: Tokenization on Blockchain.” Cryptology ePrint Archive (2021).

Wang, Qin, Rujia Li, Qi Wang, and Shiping Chen. “Non-fungible token (NFT): Overview, evaluation, opportunities and challenges.” arXiv preprint arXiv:2105.07447 (2021).

Entriken, William, Dieter Shirley, Jacob Evans, and Nastassia Sachs. Erc-721 non-fungible token standard. *Ethereum Foundation,* 2018.

Wilson, Kathleen Bridget; Karg, Adam; Ghaderi, Hadi (October 2021). “Prospecting non-fungible tokens in the digital economy: Stakeholders and ecosystem, risk and opportunity”. Business Horizons: S0007681321002019. doi:10.1016/j.bushor.2021.10.007.

Li, Xuefeng, Xiaochuan Wu, Xin Pei, and Zhuojun Yao. Tokenization: Open asset protocol on blockchain. In 2019 *IEEE 2nd International Conference on Information and Computer Technologies (ICICT)*, pages 204-209. IEEE, 2019.

Shen, Xuemin, Heather Yu, John Buford, and Mursalin Akon. *Handbook of peerto-peer networking*, volume 34. Springer Science & Business Media, 2010.

Hui, Yuk. What is a digital object? *Metaphilosophy,* 43(4): 380-395, 2012.

Liu, Zhuotao, Yangxi Xiang, Jian Shi, Peng Gao, Haoyu Wang, Xusheng Xiao, Bihan Wen, and Yih-Chun Hu. Hyperservice: Interoperability and programmability across heterogeneous blockchains. In *Proceedings of the* 2019 *ACM SIGSAC Conference on Computer and Communications Security*, pages 549-566, 2019.

Asset Tokenization

Liquidity, the ability to efficiently convert asset value to cash on demand, is a key characteristic of optimal markets. Likewise, high transaction costs, inability to liquidate an asset on demand, and discounting of an asset in order to facilitate a transaction represent market inefficiencies. Many investment opportunities, such as emerging technologies or real estate projects in the developing markets, offer significant earning potential but suffer from a lack of liquidity. Despite the potential for return, earning potential for these asset classes may remain dormant. Asset liquidity may be limited to due to lack of information, individual asset risk, uncertain market conditions, large transaction sizes, and irregular or infrequent payouts.

A particular class of assets involve resources capable of generating or producing commodities at a predictable cost (i.e., assets for which there exists a robust market with high efficiency), but which themselves have limited liquidity because of the cost, time, and risk of bringing the asset to commodity status. These assets are thus ultimately valuable, but suffer significant discounts beyond the predicted cost of commoditization. For example, mineral deposits which produce commodity minerals fluctuate based on the value of the mineral, but suffer discounts far in excess of the cost of extraction. Further, because the value is intrinsic to the deposit, the use of the asset for securitization depends on the extractability of the resource, and not its actual extraction, permitting leverage of the capital investment independent of the mineral business. Indeed, because the market for commodity minerals may fluctuate or suffer cyclic pricing, it may be inefficient to extract mineral deposits under all circumstances, yet liquidity of the underlying real estate or leases is a significant risk on owning or lending based on these deposits.

Currently, a company which owns a source or means for production of a commodity may borrow at interest from a lender secured by the assets, or sells equity which intrinsically shares in the profits of production, or offers some hybrid security. While an equity holder may have liquidity in selling the shares, the value of the shares is heavily weighted toward the profits made from operations, and negatively impacted by the size of the capital investment involved.

Meanwhile, a debt lender (e.g., bondholder) typically has more limited liquidity, and even if the security interest is sufficient to ensure eventual payment, the default risk for the borrower remains a critical factor in liquidity.

The Ethereum Virtual Machine (EVM)

The Ethereum White Paper, Vitalik Buterin, “Ethereum White Paper A Next Generation Smart Contract & Decentralized Application Platform” describes the Ethereum platform.

Because currency is a first-to-file application, where the order of transactions is often of critical importance, decentralized currencies require a solution to decentralized consensus. The main roadblock that all pre-Bitcoin currency protocols faced is the fact that, while there had been plenty of research on creating secure Byzantine-fault-tolerant multiparty consensus systems for many years, all of the protocols described were solving only half of the problem. The protocols assumed that all participants in the system were known, and produced security margins of the form "if N parties participate, then the system can tolerate up to N/4 malicious actors". The problem is, however, that in an anonymous setting such security margins are vulnerable to sybil attacks, where a single attacker creates thousands of simulated nodes on a server or botnet and uses these nodes to unilaterally secure a majority share.

The innovation provided by Satoshi Nakamoto is the idea of combining a very simple decentralized consensus protocol, based on nodes combining transactions into a "block" every ten minutes creating an ever-growing blockchain, with proof of work as a mechanism through which nodes gain the right to participate in the system. While nodes with a large amount of computational power do have proportionately greater influence, coming up with more computational power than the entire network combined is much harder than simulating a million nodes. Despite the Bitcoin blockchain model's crudeness and simplicity, it has proven to be good enough, and would over the next five years become the bedrock of over two hundred currencies and protocols around the world.

Bitcoin As A State Transition System

From a technical standpoint, the Bitcoin ledger can be thought of as a state transition system, where there is a "state" consisting of the ownership status of all existing bitcoins and a "state transition function" that takes a state and a transaction and outputs a new state which is the result. In a standard banking system, for example, the state is a balance sheet, a transaction is a request to move $X from A to B, and the state transition function reduces the value in A's account by $X and increases the value in B's account by $X. If A's account has less than $X in the first place, the state transition function returns an error. Hence, one can formally define: APPLY(S,TX)→S' or ERROR In the banking system defined above: APPLY({Alice: $50, Bob: $50}, "send $20 from Alice to Bob")={Alice: $30, Bob: $70}

But: APPLY({Alice: $50, Bob: $50}, "send $70 from Alice to Bob")=ERROR

The "state" in Bitcoin is the collection of all coins (technically, "unspent transaction outputs" or UTXO) that have been minted and not yet spent, with each UTXO having a denomination and an owner (defined by a 20-byte address which is essentially a cryptographic public key). A transaction contains one or more inputs, with each input containing a reference to an existing UTXO and a cryptographic signature produced by the private key associated with the owner's address, and one or more outputs, with each output containing a new UTXO to be added to the state.

The state transition function APPLY(S,TX)→S' can be defined roughly as follows: For each input in TX:

If the referenced UTXO is not in S, return an error.

If the provided signature does not match the owner of the UTXO, return an error.

If the sum of the denominations of all input UTXO is less than the sum of the denominations of all output UTXO, return an error.

Return S with all input UTXO removed and all output UTXO added.

The first half of the first step prevents transaction senders from spending coins that do not exist, the second half of the first step prevents transaction senders from spending other people's coins, and the second step enforces conservation of value. In order to use this for payment, the protocol is as follows. Suppose Alice wants to send 11.7 BTC to Bob. First, Alice will look for a set of available UTXO that she owns that totals up to at least 11.7 BTC. Realistically, Alice will not be able to get exactly 11.7 BTC; say that the smallest she can get is 6+4+2=12. She then creates a transaction with those three inputs and two outputs. The first output will be 11.7 BTC with Bob's address as its owner, and the second output will be the remaining 0.3 BTC "change", with the owner being Alice herself.

Mining

If we had access to a trustworthy centralized service, this system would be trivial to implement; it could simply be coded exactly as described. However, with Bitcoin we are trying to build a decentralized currency system, so we will need to combine the state transition system with a consensus system in order to ensure that everyone agrees on the order of transactions. Bitcoin's decentralized consensus process requires nodes in the network to continuously attempt to produce packages of transactions called "blocks". The network is intended to produce roughly one block every ten minutes, with each block containing a timestamp, a nonce, a reference to (i.e., hash of) the previous block and a list of all of the transactions that have taken place since the previous block. Over time, this creates a persistent, ever-growing, "blockchain" that constantly updates to represent the latest state of the Bitcoin ledger.

The algorithm for checking if a block is valid, expressed in this paradigm, is as follows:

1. Check if the previous block referenced by the block exists and is valid
2. Check that the timestamp of the block is greater than that of the previous block and less than 2 hours into the future.
3. Check that the proof of work on the block is valid.
4. Let S[0] be the state at the end of the previous block.
5. Suppose TX is the block's transaction list with n transactions. For all i in 0 . . . n−1, setS[i+1]=APPLY (S[i],TX[i]) If any application returns an error, exit and return false.
6. Return true, and register S[n] as the state at the end of this block Essentially, each transaction in the block must provide a state transition that is valid. Note that the state is not encoded in the block in any way; it is purely an abstraction to be remembered by the validating node and can only be (securely) computed for any block by starting from the genesis state and sequentially applying every transaction in every block. Additionally, note that the order in which the miner includes transactions into the block matters; if there are two transactions A and B in a block such that B spends a UTXO created by A, then the block will be valid if A comes before B but not otherwise.

The interesting part of the block validation algorithm is the concept of "proof of work": the condition is that the SHA256 hash of every block, treated as a 256-bit number, must be less than a dynamically adjusted target, which as of the time of this writing is approximately 2190. The purpose of this is to make block creation computationally "hard", thereby preventing sybil attackers from remaking the entire blockchain in their favor.

Because SHA256 is designed to be a completely unpredictable pseudorandom function, the only way to create a valid block is simply trial and error, repeatedly incrementing the nonce and seeing if the new hash matches. At the current target of 2192, this means an average of 264 tries; in general, the target is recalibrated by the network every 2016 blocks so that on average a new block is produced by some node in the network every ten minutes. In order to compensate miners for this computational work, the miner of every block is entitled to include a transaction giving themselves 25 BTC out of nowhere. Additionally, if any transaction has a higher total denomination in its inputs than in its outputs, the difference also goes to the miner as a "transaction fee". Incidentally, this is also the only mechanism by which BTC are issued; the genesis state contained no coins at all.

In order to better understand the purpose of mining, let us examine what happens in the event of a malicious attacker. Since Bitcoin's underlying cryptography is known to be secure, the attacker will target the one part of the Bitcoin system that is not protected by cryptography directly: the order of transactions. The attacker's strategy is simple:

1. Send 100 BTC to a merchant in exchange for some product (preferably a rapid-delivery digital good)
2. Wait for the delivery of the product
3. Produce another transaction sending the same 100 BTC to himself
4. Try to convince the network that his transaction to himself was the one that came first.

Once step (1) has taken place, after a few minutes some miner will include the transaction in a block, say block number 270000. After about one hour, five more blocks will have been added to the chain after that block, with each of those blocks indirectly pointing to the transaction and thus "confirming" it. At this point, the merchant will accept the payment as finalized and deliver the product; since we are assuming this is a digital good, delivery is instant. Now, the attacker creates another transaction sending the 100 BTC to himself. If the attacker simply releases it into the wild, the transaction will not be processed; miners will attempt to run APPLY(S,TX) and notice that TX consumes a UTXO which is no longer in the state. So instead, the attacker creates a "fork" of the blockchain, starting by mining another version of block 270000 pointing to the same block 269999 as a parent but with the new transaction in place of the old one. Because the block data is different, this requires redoing the proof of work. Furthermore, the attacker's new version of block 270000 has a different hash, so the original blocks 270001 to 270005 do not "point" to it; thus, the original chain and the attacker's new chain are completely separate. The rule is that in a fork the longest blockchain (i.e., the one backed by the largest quantity of proof of work) is taken to be the truth, and so legitimate miners will work on the 270005 chain while the attacker alone is working on the 270000 chain. In order for the attacker to make his blockchain the longest, he would need to have more computational power than the rest of the network combined in order to catch up (hence, "51% attack").

Merkle Trees

Left: it suffices to present only a small number of nodes in a Merkle tree to give a proof of the validity of a branch.

Right: any attempt to change any part of the Merkle tree will eventually lead to an inconsistency somewhere up the chain.

An important scalability feature of Bitcoin is that the block is stored in a multi-level data structure. The "hash" of a block is actually only the hash of the block header, a roughly 200-byte piece of data that contains the timestamp, nonce, previous block hash and the root hash of a data structure called the Merkle tree storing all transactions in the block.

A Merkle tree is a type of binary tree, composed of a set of nodes with a large number of leaf nodes at the bottom of the tree containing the underlying data, a set of intermediate nodes where each node is the hash of its two children, and finally a single root node, also formed from the hash of its two children, representing the "top" of the tree. The purpose of the Merkle tree is to allow the data in a block to be delivered piecemeal: a node can download only the header of a block from one source, the small part of the tree relevant to them from another source, and still be assured that all of the data is correct. The reason why this works is that hashes propagate upward: if a malicious user attempts to swap in a fake transaction into the bottom of a Merkle tree, this change will cause a change in the node above, and then a change in the node above that, finally changing the root of the tree and therefore the hash of the block, causing the protocol to register it as a completely different block (almost certainly with an invalid proof of work).

The Merkle tree protocol is arguably essential to long-term sustainability. A "full node" in the Bitcoin network, one that stores and processes the entirety of every block, takes up about 15 GB of disk space in the Bitcoin network as of April 2014, and is growing by over a gigabyte per month. Currently, this is viable for some desktop computers and not phones, and later on in the future only businesses and hobbyists will be able to participate. A protocol known as "simplified payment verification" (SPV) allows for another class of nodes to exist, called "light nodes", which download the block headers, verify the proof of work on the block headers, and then download only the "branches" associated with transactions that are relevant to them. This allows light nodes to determine with a strong guarantee of security what the status of any Bitcoin transaction, and their current balance, is while downloading only a very small portion of the entire blockchain.

Alternative Blockchain Applications

The idea of taking the underlying blockchain idea and applying it to other concepts also has a long history. In 2005, Nick Szabo came out with the concept of "secure property titles with owner authority", a document describing how "new advances in replicated database technology" will allow for a blockchain-based system for storing a registry of who owns what land, creating an elaborate framework including concepts such as homesteading, adverse possession and Georgian land tax. However, there was unfortunately no effective replicated database system available at the time, and so the protocol was never implemented in practice. After 2009, however, once Bitcoin's decentralized consensus was developed a number of alternative applications rapidly began to emerge:

Namecoin—created in 2010, Namecoin is best described as a decentralized name registration database. In decentralized protocols like Tor, Bitcoin and BitMessage, there needs to be some way of identifying accounts so that other people can interact with them, but in all existing solutions the only kind of identifier available is a pseudorandom hash like1LW79wp5ZBqaHW1jL5TCiBCrhQYtHagUWy. Ideally, one would like to be able to have an account with a name like "george". However, the problem is that if one person can create an account named "george" then someone else can use the same process to register "george" for themselves as well and impersonate them. The only solution is a first-to-file paradigm, where the first registrant succeeds and the second fails—a problem perfectly suited for the Bitcoin consensus protocol. Namecoin is the oldest, and most successful, implementation of a name registration system using such an idea.

Colored coins—the purpose of colored coins is to serve as a protocol to allow people to create their own digital currencies—or, in the important trivial case of a currency with one unit, digital tokens, on the Bitcoin blockchain. In the colored coins protocol, one "issues" a new currency by publicly assigning a color to a specific Bitcoin UTXO, and the protocol recursively defines the color of other UTXO to be the same as the color of the inputs that the transaction creating them spent (some special rules apply in the case of mixed-color inputs). This allows users to maintain wallets containing only UTXO of a specific color and send them around much like regular bitcoins, backtracking through the blockchain to determine the color of any UTXO that they receive.

Metacoins—the idea behind a metacoin is to have a protocol that lives on top of Bitcoin, using Bitcoin transactions to store metacoin transactions but having a different state transition function, APPLY'. Because the metacoin protocol cannot prevent invalid metacoin transactions from appearing in the Bitcoin blockchain, a rule is added that if APPLY'(S,TX) returns an error, the protocol defaults to APPLY'(S,TX)=S. This provides an easy mechanism for creating an arbitrary cryptocurrency protocol, potentially with advanced features that cannot be implemented inside of Bitcoin itself, but with a very low development cost since the complexities of mining and networking are already handled by the Bitcoin protocol.

Thus, in general, there are two approaches toward building a consensus protocol: building an independent network, and building a protocol on top of Bitcoin. The former approach, while reasonably successful in the case of applications like Namecoin, is difficult to implement; each individual implementation needs to bootstrap an independent blockchain, as well as building and testing all of the necessary state transition and networking code. Additionally, we predict that the set of applications for decentralized consensus technology will follow a power law distribution where the vast majority of applications would be too small to warrant their own blockchain, and we note that there exist large classes of decentralized applications, particularly decentralized autonomous organizations, that need to interact with each other.

The Bitcoin-based approach, on the other hand, has the flaw that it does not inherit the simplified payment verification features of Bitcoin. SPV works for Bitcoin because it can use blockchain depth as a proxy for validity; at some point, once the ancestors of a transaction go far enough back, it is safe to say that they were legitimately part of the state. Blockchain-based meta-protocols, on the other hand, cannot force the blockchain not to include transactions that are not valid within the context of their own protocols. Hence, a fully secure SPV meta-protocol implementation would need to backward scan all the way to the beginning of the Bitcoin blockchain to determine whether or not certain transactions are valid. Currently, all "light" implementations of Bitcoin-based meta-protocols rely on a trusted server to provide the data, arguably a highly suboptimal result especially when one of the primary purposes of a cryptocurrency is to eliminate the need for trust.

Scripting

Even without any extensions, the Bitcoin protocol actually does facilitate a weak version of a concept of "smart contracts". UTXO in Bitcoin can be owned not just by a public key, but also by a more complicated script expressed in a simple stack-based programming language. In this paradigm, a transaction spending that UTXO must provide data that satisfies the script. Indeed, even the basic public key ownership mechanism is implemented via a script: the script takes an elliptic curve signature as input, verifies it against the transaction and the address that owns the UTXO, and returns 1 if the verification is successful and 0 otherwise. Other, more complicated, scripts exist for various additional use cases. For example, one can construct a script that requires signatures from two out of a given three private keys to validate ("multisig"), a setup useful for corporate accounts, secure savings accounts and some merchant escrow situations. Scripts can also be used to pay bounties for solutions to computational problems, and one can even construct a script that says something like "this Bitcoin UTXO is yours if you can provide an SPV proof that you sent a Dogecoin transaction of this denomination to me", essentially allowing decentralized cross-cryptocurrency exchange.

However, the scripting language as implemented in Bitcoin has several important limitations:

Lack of Turing-completeness—that is to say, while there is a large subset of computation that the Bitcoin scripting language supports, it does not nearly support everything. The main category that is missing is loops. This is done to avoid infinite loops during transaction verification; theoretically it is a surmountable obstacle for script programmers, since any loop can be simulated by simply repeating the underlying code many times with an if statement, but it does lead to scripts that are very space-inefficient. For example, implementing an alternative elliptic curve signature algorithm would likely require 256 repeated multiplication rounds all individually included in the code.

Value-blindness—there is no way for a UTXO script to provide fine-grained control over the amount that can be withdrawn. For example, one powerful use case of an oracle contract would be a hedging contract, where A and B put in $1000 worth of BTC and after 30 days the script sends $1000 worth of BTC to A and the rest to B. This would require an oracle to determine the value of 1 BTC in USD, but even then it is a massive improvement in terms of trust and infrastructure requirement over the fully centralized solutions that are available now. However, because UTXO are all-or-nothing, the only way to achieve this is through the very inefficient hack of having many UTXO of varying denominations (e.g., one UTXO of 2k for every k up to 30) and having the oracle pick which UTXO to send to A and which to B.

Lack of state—UTXO can either be spent or unspent; there is no opportunity for multi-stage contracts or scripts which keep any other internal state beyond that. This makes it hard to make multi-stage options contracts, decentralized exchange offers or two-stage cryptographic commitment protocols (necessary for secure computational bounties). It also means that UTXO can only be used to build simple, one-off contracts and not more complex "stateful" contracts such as decentralized organizations, and makes meta-protocols difficult to implement. Binary state combined with value-blindness also mean that another important application, withdrawal limits, is impossible.

Blockchain-blindness—UTXO are blind to blockchain data such as the nonce and previous hash. This severely limits applications in gambling, and several other categories, by depriving the scripting language of a potentially valuable source of randomness.

Thus, we see three approaches to building advanced applications on top of cryptocurrency: building a new blockchain, using scripting on top of Bitcoin, and building a meta-protocol on top of Bitcoin. Building a new blockchain allows for unlimited freedom in building a feature set, but at the cost of development time and bootstrapping effort. Using scripting is easy to implement and standardize, but is very limited in its capabilities, and meta-protocols, while easy, suffer from faults in scalability. With Ethereum, we intend to build a generalized framework that can provide the advantages of all three paradigms at the same time.

Advance of Ethereum

The intent of Ethereum is to merge together and improve upon the concepts of scripting, altcoins and on-chain meta-protocols, and allow developers to create arbitrary consensus-based applications that have the scalability, standardization, feature-completeness, ease of development and interoperability offered by these different paradigms all at the same time. Ethereum does this by building what is essentially the ultimate abstract foundational layer: a blockchain with a built-in Turing-complete programming language, allowing anyone to write smart contracts and decentralized applications where they can create their own arbitrary rules for ownership, transaction formats and state transition functions. A bare-bones version of Namecoin can be written in two lines of code, and other protocols like currencies and reputation systems can be built in under twenty. Smart contracts, cryptographic "boxes" that contain value and only unlock it if certain conditions are met, can also be built on top of our platform, with vastly more power than that offered by Bitcoin scripting because of the added powers of Turing-completeness, value-awareness, blockchain-awareness and state.

Ethereum Accounts

In Ethereum, the state is made up of objects called "accounts", with each account having a 20-byte address and state transitions being direct transfers of value and information between accounts. An Ethereum account contains four fields: The nonce, a counter used to make sure each transaction can only be processed once; The account's current ether balance; The account's contract code, if present; and The account's storage (empty by default).

"Ether" is the main internal crypto-fuel of Ethereum, and is used to pay transaction fees. In general, there are two types of accounts: externally owned accounts, controlled by private keys, and contract accounts, controlled by their contract code. An externally owned account has no code, and one can send messages from an externally owned account by creating and signing a transaction; in a contract account, every time the contract account receives a message its code activates, allowing it to read and write to internal storage and send other messages or create contracts in turn.

Messages and Transactions

"Messages" in Ethereum are somewhat similar to "transactions" in Bitcoin, but with three important differences. First, an Ethereum message can be created either by an external entity or a contract, whereas a Bitcoin transaction can only be created externally. Second, there is an explicit option for Ethereum messages to contain data. Finally, the recipient of an Ethereum message, if it is a contract account, has the option to return a response; this means that Ethereum messages also encompass the concept of functions.

The term "transaction" is used in Ethereum to refer to the signed data package that stores a message to be sent from an externally owned account. Transactions contain the recipient of the message, a signature identifying the sender, the amount of ether and the data to send, as well as two values called STARTGAS and GASPRICE. In order to prevent exponential blowup and infinite loops in code, each transaction is required to set a limit to how many computational steps of code execution it can spawn, including both the initial message and any additional messages that get spawned during execution. STARTGAS is this limit, and GASPRICE is the fee to pay to the miner per computational step. If transaction execution "runs out of gas", all state changes revert—except for the payment of the fees, and if transaction execution halts with some gas remaining then the remaining portion of the fees is refunded to the sender. There is also a separate transaction type, and corresponding message type, for creating a contract; the address of a contract is calculated based on the hash of the account nonce and transaction data.

An important consequence of the message mechanism is the "first class citizen" property of Ethereum—the idea that contracts have equivalent powers to external accounts, including the ability to send message and create other contracts. This allows contracts to simultaneously serve many different roles: for example, one might have a member of a decentralized organization (a contract) be an escrow account (another contract) between an paranoid individual employing custom quantum-proof Lamport signatures (a third contract) and a co-signing entity which itself uses an account with five keys for security (a fourth contract). The strength of the Ethereum platform is that the decentralized organization and the escrow contract do not need to care about what kind of account each party to the contract is.

Ethereum State Transition Function

The Ethereum state transition function, APPLY(S,TX) →S' can be defined as follows:

1. Check if the transaction is well-formed (i.e., has the right number of values), the signature is valid, and the nonce matches the nonce in the sender's account. If not, return an error.
2. Calculate the transaction fee as STARTGAS*GASPRICE, and determine the sending address from the signature. Subtract the fee from the sender's account balance and increment the sender's nonce. If there is not enough balance to spend, return an error.
3. Initialize GAS=STARTGAS, and take off a certain quantity of gas per byte to pay for the bytes in the transaction.
4. Transfer the transaction value from the sender's account to the receiving account. If the receiving account does not yet exist, create it. If the receiving account is a contract, run the contract's code either to completion or until the execution runs out of gas.
5. If the value transfer failed because the sender did not have enough money, or the code execution ran out of gas, revert all state changes except the payment of the fees, and add the fees to the miner's account.
6. Otherwise, refund the fees for all remaining gas to the sender, and send the fees paid for gas consumed to the miner.

For example, suppose that the contract's code is:

```
if !contract.storage [msg.data[0]]:
contract.storage [msg.data [0]]=msg.data[1]
```

Note that in reality the contract code is written in the low-level EVM code; this example is written in Serpent, our high-level language, for clarity, and can be compiled down to EVM code. Suppose that the contract's storage starts off empty, and a transaction is sent with 10 ether value, 2000 gas, 0.001 ether gasprice, and two data fields: [2, 'CHARLIE']. The process for the state transition function in this case is as follows:

1. Check that the transaction is valid and well formed.
2. Check that the transaction sender has at least 2000*0.001=2 ether. If it is, then subtract 2 ether from the sender's account.

3. Initialize gas=2000; assuming the transaction is 170 bytes long and the byte-fee is 5, subtract 850 so that there is 1150 gas left.
4. Subtract 10 more ether from the sender's account, and add it to the contract's account.
5. Run the code. In this case, this is simple: it checks if the contract's storage at index 2 is used, notices that it is not, and so it sets the storage at index 2 to the value CHARLI.E., Suppose this takes 187 gas, so the remaining amount of gas is 1150-187=963
6. Add 963*0.001=0.963 ether back to the sender's account, and return the resulting state.

If there was no contract at the receiving end of the transaction, then the total transaction fee would simply be equal to the provided GASPRICE multiplied by the length of the transaction in bytes, and the data sent alongside the transaction would be irrelevant. Additionally, note that contract-initiated messages can assign a gas limit to the computation that they spawn, and if the sub-computation runs out of gas it gets reverted only to the point of the message call. Hence, just like transactions, contracts can secure their limited computational resources by setting strict limits on the sub-computations that they spawn.

Code Execution

The code in Ethereum contracts is written in a low-level, stack-based bytecode language, referred to as "Ethereum virtual machine code" or "EVM code". The code consists of a series of bytes, where each byte represents an operation. In general, code execution is an infinite loop that consists of repeatedly carrying out the operation at the current program counter (which begins at zero) and then incrementing the program counter by one, until the end of the code is reached or an error or STOP or RETURN instruction is detected. The operations have access to three types of space in which to store data:

The stack, a last-in-first-out container to which 32-byte values can be pushed and popped Memory, an infinitely expandable byte array The contract's long-term storage, a key/value store where keys and values are both 32 bytes. Unlike stack and memory, which reset after computation ends, storage persists for the long term.

The code can also access the value, sender and data of the incoming message, as well as block header data, and the code can also return a byte array of data as an output.

The formal execution model of EVM code is surprisingly simple. While the Ethereum virtual machine is running, its full computational state can be defined by the tuple (block_state, transaction, message, code, memory, stack, pc, gas), where block_state is the global state containing all accounts and includes balances and storage. Every round of execution, the current instruction is found by taking the pc-th byte of code, and each instruction has its own definition in terms of how it affects the tuple. For example, ADD pops two items off the stack and pushes their sum, reduces gas by 1 and increments pc by 1, and SSTO RE pushes the top two items off the stack and inserts the second item into the contract's storage at the index specified by the first item, as well as reducing gas by up to 200 and incrementing pc by 1. Although there are many ways to optimize Ethereum via just-in-time compilation, a basic implementation of Ethereum can be done in a few hundred lines of code.

Blockchain and Mining

The Ethereum blockchain is in many ways similar to the Bitcoin blockchain, although it does have some differences. The main difference between Ethereum and Bitcoin with regard to the blockchain architecture is that, unlike Bitcoin, Ethereum blocks contain a copy of both the transaction list and the most recent state. Aside from that, two other values, the block number and the difficulty, are also stored in the block. The block validation algorithm in Ethereum is as follows:

1. Check if the previous block referenced exists and is valid.
2. Check that the timestamp of the block is greater than that of the referenced previous block and less than 15 minutes into the future
3. Check that the block number, difficulty, transaction root, uncle root and gas limit (various low-level Ethereum-specific concepts) are valid.
4. Check that the proof of work on the block is valid.
5. Let S[0] be the STATE_ROOT of the previous block.
6. Let TX be the block's transaction list, with n transactions. For all in in 0 . . . n−1, setS[i+1]=APPLY(S[i], TX[i]). If any applications returns an error, or if the total gas consumed in the block up until this point exceeds the GASLIMIT, return an error.
7. Let S_FINAL be S[n], but adding the block reward paid to the miner.
8. Check if S_FINAL is the same as the STATE_ROOT. If it is, the block is valid; otherwise, it is not valid.

The approach may seem highly inefficient at first glance, because it needs to store the entire state with each block, but in reality efficiency should be comparable to that of Bitcoin. The reason is that the state is stored in the tree structure, and after every block only a small part of the tree needs to be changed. Thus, in general, between two adjacent blocks the vast majority of the tree should be the same, and therefore the data can be stored once and referenced twice using pointers (i.e., hashes of subtrees). A special kind of tree known as a "Patricia tree" is used to accomplish this, including a modification to the Merkle tree concept that allows for nodes to be inserted and deleted, and not just changed, efficiently. Additionally, because all of the state information is part of the last block, there is no need to store the entire blockchain history—a strategy which, if it could be applied to Bitcoin, can be calculated to provide 5-20× savings in space.

Applications

In general, there are three types of applications on top of Ethereum. The first category is financial applications, providing users with more powerful ways of managing and entering into contracts using their money. This includes sub-currencies, financial derivatives, hedging contracts, savings wallets, wills, and ultimately even some classes of full-scale employment contracts. The second category is semi-financial applications, where money is involved but there is also a heavy non-monetary side to what is being done; a perfect example is self-enforcing bounties for solutions to computational problems. Finally, there are applications such as online voting and decentralized governance that are not financial at all.

Token Systems

On-blockchain token systems have many applications ranging from sub-currencies representing assets such as USD or gold to company stocks, individual tokens representing smart property, secure unforgeable coupons, and even token systems with no ties to conventional value at all, used as point systems for incentivization. Token systems are surprisingly easy to implement in Ethereum. The key point to understand is that all a currency, or token system, fundamentally is a database with one operation: subtract X units from A and give X units to B, with the proviso that (i) X had at least X units before the transaction and (2) the transaction is approved by A. All that it takes to implement a token system is to implement this logic into a contract.

The basic code for implementing a token system in Serpent looks as follows:

```
from =msg.sender to =msg.data[0] value=msg.data[1]
if contract.storage [from]>=value:
    contract.storage[from]=contract.storage [from]−value
    contract.storage [to]=contract.storage [to]+value
```

This is essentially a literal implementation of the "banking system" state transition function described further above in this document. A few extra lines of code need to be added to provide for the initial step of distributing the currency units in the first place and a few other edge cases, and ideally a function would be added to let other contracts query for the balance of an address. But that's all there is to it. Theoretically, Ethereum-based token systems acting as sub-currencies can potentially include another important feature that on-chain Bitcoin-based meta-currencies lack: the ability to pay transaction fees directly in that currency. The way this would be implemented is that the contract would maintain an ether balance with which it would refund ether used to pay fees to the sender, and it would refill this balance by collecting the internal currency units that it takes in fees and reselling them in a constant running auction. Users would thus need to "activate" their accounts with ether, but once the ether is there it would be reusable because the contract would refund it each time.

Financial derivatives and Stable-Value Currencies

Financial derivatives are the most common application of a "smart contract", and one of the simplest to implement in code. The main challenge in implementing financial contracts is that the majority of them require reference to an external price ticker; for example, a very desirable application is a smart contract that hedges against the volatility of ether (or another cryptocurrency) with respect to the US dollar, but doing this requires the contract to know what the value of ETH/USD is. The simplest way to do this is through a "data feed" contract maintained by a specific party (e.g., NASDAQ) designed so that that party has the ability to update the contract as needed, and providing an interface that allows other contracts to send a message to that contract and get back a response that provides the price.

Given that critical ingredient, the hedging contract would look as follows:

1. Wait for party A to input 1000 ether.
2. Wait for party B to input 1000 ether.
3. Record the USD value of 1000 ether, calculated by querying the data feed contract, in storage, say this is $x.
4. After 30 days, allow A or B to "ping" the contract in order to send $x worth of ether (calculated by querying the data feed contract again to get the new price) to A and the rest to B.

Such a contract would have significant potential in crypto-commerce. One of the main problems cited about cryptocurrency is the fact that it's volatile; although many users and merchants may want the security and convenience of dealing with cryptographic assets, they many not wish to face that prospect of losing 23% of the value of their funds in a single day. Up until now, the most commonly proposed solution has been issuer-backed assets; the idea is that an issuer creates a sub-currency in which they have the right to issue and revoke units, and provide one unit of the currency to anyone who provides them (offline) with one unit of a specified underlying asset (e.g., gold, USD). The issuer then promises to provide one unit of the underlying asset to anyone who sends back one unit of the crypto-asset. This mechanism allows any non-cryptographic asset to be "uplifted" into a cryptographic asset, provided that the issuer can be trusted.

In practice, however, issuers are not always trustworthy, and in some cases the banking infrastructure is too weak, or too hostile, for such services to exist. Financial derivatives provide an alternative. Here, instead of a single issuer providing the funds to back up an asset, a decentralized market of speculators, betting that the price of a cryptographic reference asset will go up, plays that role. Unlike issuers, speculators have no option to default on their side of the bargain because the hedging contract holds their funds in escrow. Note that this approach is not fully decentralized, because a trusted source is still needed to provide the price ticker, although arguably even still this is a massive improvement in terms of reducing infrastructure requirements (unlike being an issuer, issuing a price feed requires no licenses and can likely be categorized as free speech) and reducing the potential for fraud.

Identity and Reputation Systems

The earliest alternative cryptocurrency of all, Namecoin, attempted to use a Bitcoin-like blockchain to provide a name registration system, where users can register their names in a public database alongside other data. The major cited use case is for a DNS system, mapping domain names like "bitcoin.org" (or, in Namecoin's case, "bitcoin.bit") to an IP address. Other use cases include email authentication and potentially more advanced reputation systems. Here is the basic contract to provide a Namecoin-like name registration system on Ethereum:

```
if !contract.storage[tx.data[0]]:
    contract.storage [tx.data[0]]=tx.data[1]
```

The contract is very simple; all it is a database inside the Ethereum network that can be added to, but not modified or removed from. Anyone can register a name with some value, and that registration then sticks forever. A more sophisticated name registration contract will also have a "function clause" allowing other contracts to query it, as well as a mechanism for the "owner" (i.e., the first registerer) of a name to change the data or transfer ownership. One can even add reputation and web-of-trust functionality on top.

Decentralized File Storage

Over the past few years, there have emerged a number of popular online file storage startups, the most prominent being Dropbox, seeking to allow users to upload a backup of their hard drive and have the service store the backup and allow the user to access it in exchange for a monthly fee. However, at this point the file storage market is at times relatively inefficient; a cursory look at various existing solutions shows that, particularly at the "uncanny valley" 20-200 GB level at which neither free quotas nor enterprise-level discounts kick in, monthly prices for mainstream file storage costs are such that you are paying for more than the cost of the entire hard drive in a single month. Ethereum contracts can allow for the development of a decentralized file storage ecosystem, where individual users can earn small quantities of money by renting out their own hard drives and unused space can be used to further drive down the costs of file storage.

The key underpinning piece of such a device would be what we have termed the "decentralized Dropbox contract". This contract works as follows. First, one splits the desired data up into blocks, encrypting each block for privacy, and builds a Merkle tree out of it. One then makes a contract with the rule that, every N blocks, the contract would pick a random index in the Merkle tree (using the previous block hash, accessible from contract code, as a source of randomness), and give X ether to the first entity to supply a transaction with a simplified payment verification-like proof of ownership of the block at that particular index in the tree. When a user wants to re-download their file, they can use a micropayment channel protocol (e.g., pay 1 szabo per 32 kilobytes) to recover the file; the most fee-efficient approach is for the payer not to publish the transaction until the end, instead replacing the transaction with a slightly more lucrative one with the same nonce after every 32 kilobytes.

An important feature of the protocol is that, although it may seem like one is trusting many random nodes not to decide to forget the file, one can reduce that risk down to near-zero by splitting the file into many pieces via secret sharing, and watching the contracts to see each piece is still in some node's possession. If a contract is still paying out money, that provides a cryptographic proof that someone out there is still storing the file.

Decentralized Autonomous Organizations

The general concept of a "decentralized organization" is that of a virtual entity that has a certain set of members or shareholders which, perhaps with a 67% majority, have the right to spend the entity's funds and modify its code. The members would collectively decide on how the organization should allocate its funds. Methods for allocating a DAO's funds could range from bounties, salaries to even more exotic mechanisms such as an internal currency to reward work. This essentially replicates the legal trappings of a traditional company or nonprofit but using only cryptographic blockchain technology for enforcement. So far much of the talk around DAOs has been around the "capitalist" model of a "decentralized autonomous corporation" (DAC) with dividend-receiving shareholders and tradable shares; an alternative, perhaps described as a "decentralized autonomous community", would have all members have an equal share in the decision making and require 67% of existing members to agree to add or remove a member. The requirement that one person can only have one membership would then need to be enforced collectively by the group.

A general outline for how to code a DO is as follows. The simplest design is simply a piece of self-modifying code that changes if two thirds of members agree on a change. Although code is theoretically immutable, one can easily get around this and have de-facto mutability by having chunks of the code in separate contracts, and having the address of which contracts to call stored in the modifiable storage. In a simple implementation of such a DAO contract, there would be three transaction types, distinguished by the data provided in the transaction:

[0,i,K,V] to register a proposal with index i to change the address at storage index K to value V

[0,i] to register a vote in favor of proposal i

[2,i] to finalize proposal i if enough votes have been made

The contract would then have clauses for each of these. It would maintain a record of all open storage changes, along with a list of who voted for them. It would also have a list of all members. When any storage change gets to two thirds of members voting for it, a finalizing transaction could execute the change. A more sophisticated skeleton would also have built-in voting ability for features like sending a transaction, adding members and removing members, and may even provide for Liquid Democracy-style vote delegation (i.e., anyone can assign someone to vote for them, and assignment is transitive so if A assigns B and B assigns C then C determines A's vote). This design would allow the DO to grow organically as a decentralized community, allowing people to eventually delegate the task of filtering out who is a member to specialists, although unlike in the "current system" specialists can easily pop in and out of existence over time as individual community members change their alignments.

An alternative model is for a decentralized corporation, where any account can have zero or more shares, and two thirds of the shares are required to make a decision. A complete skeleton would involve asset management functionality, the ability to make an offer to buy or sell shares, and the ability to accept offers (preferably with an order-matching mechanism inside the contract). Delegation would also exist Liquid Democracy-style, generalizing the concept of a "board of directors".

In the future, more advanced mechanisms for organizational governance may be implemented; it is at this point that a decentralized organization (DO) can start to be described as a decentralized autonomous organization (DAO). The difference between a DO and a DAO is fuzzy, but the general dividing line is whether the governance is generally carried out via a political-like process or an "automatic" process; a good intuitive test is the "no common language" criterion: can the organization still function if no two members spoke the same language? Clearly, a simple traditional shareholder-style corporation would fail, whereas something like the Bitcoin protocol would be much more likely to succeed. Robin Hanson's futarchy, a mechanism for organizational governance via prediction markets, is a good example of what truly "autonomous" governance might look like. Note that one should not necessarily assume that all DAOs are superior to all DOs; automation is simply a paradigm that is likely to have very large benefits in certain particular places and may not be practical in others, and many semi-DAOs are also likely to exist.

Further Applications

Savings wallets. Suppose that Alice wants to keep her funds safe, but is worried that she will lose or someone will hack her private key. She puts ether into a contract with Bob, a bank, as follows:

Alice alone can withdraw a maximum of 1% of the funds per day.

Bob alone can withdraw a maximum of 1% of the funds per day, but Alice has the ability to make a transaction with her key shutting off this ability.

Alice and Bob together can withdraw anything.

1. Normally, 1% per day is enough for Alice, and if Alice wants to withdraw more she can contact Bob for help. If Alice's key gets hacked, she runs to Bob to move the funds to a new contract. If she loses her key, Bob will get the funds out eventually. If Bob turns out to be malicious, then she can turn off his ability to withdraw.
2. Crop insurance. One can easily make a financial derivatives contract but using a data feed of the weather instead of any price index. If a farmer in Iowa purchases a derivative that pays out inversely based on the precipitation in Iowa, then if there is a drought, the farmer will automatically receive money and if there is enough rain the farmer will be happy because their crops would do well.
3. A decentralized data feed. For financial contracts for difference, it may actually be possible to decentralize the data feed via a protocol called "SchellingCoin". SchellingCoin basically works as follows: N parties all put into the system the value of a given datum (e.g., the ETH/USD price), the values are sorted, and everyone between the 25th and 75th percentile gets one token as a reward. Everyone has the incentive to provide the answer that everyone else will provide, and the only value that a large number of players can realistically agree on is the obvious default: the truth. This creates a decentralized protocol that can theoretically provide any number of values, including the ETH/USD price, the temperature in Berlin or even the result of a particular hard computation.

4. Smart multi-signature escrow. Bitcoin allows multisignature transaction contracts where, for example, three out of a given five keys can spend the funds. Ethereum allows for more granularity; for example, four out of five can spend everything, three out of five can spend up to 10% per day, and two out of five can spend up to 0.5% per day. Additionally, Ethereum multisig is asynchronous—two parties can register their signatures on the blockchain at different times and the last signature will automatically send the transaction.
5. Cloud computing. The EVM technology can also be used to create a verifiable computing environment, allowing users to ask others to carry out computations and then optionally ask for proofs that computations at certain randomly selected checkpoints were done correctly. This allows for the creation of a cloud computing market where any user can participate with their desktop, laptop or specialized server, and spot-checking together with security deposits can be used to ensure that the system is trustworthy (i.e., nodes cannot profitably cheat). Although such a system may not be suitable for all tasks; tasks that require a high level of inter-process communication, for example, cannot easily be done on a large cloud of nodes. Other tasks, however, are much easier to parallelize; projects like SETI@home, folding@home and genetic algorithms can easily be implemented on top of such a platform.
6. Peer-to-peer gambling. Any number of peer-to-peer gambling protocols, such as Frank Stajano and Richard Clayton's Cyberdice, can be implemented on the Ethereum blockchain. The simplest gambling protocol is actually simply a contract for difference on the next block hash, and more advanced protocols can be built up from there, creating gambling services with near-zero fees that have no ability to cheat.
7. Prediction markets. Provided an oracle or SchellingCoin, prediction markets are also easy to implement, and prediction markets together with SchellingCoin may prove to be the first mainstream application of futarchy as a governance protocol for decentralized organizations.
8. On-chain decentralized marketplaces, using the identity and reputation system as a base.

Modified GHOST Implementation

The "Greedy Heaviest Observed Subtree" (GHOST) protocol is an innovation first introduced by Yonatan Sompolinsky and Aviv Zohar in December 2013. Note however that a recent paper argues that, while uncle blocks do provide block rewards to miners, they do not contribute towards the difficulty of the main chain. Therefore, Ethereum does not actually apply the GHOST protocol. The motivation behind GHOST is that blockchains with fast confirmation times currently suffer from reduced security due to a high stale rate—because blocks take a certain time to propagate through the network, if miner A mines a block and then miner B happens to mine another block before miner A's block propagates to B, miner B's block will end up wasted and will not contribute to network security. Furthermore, there is a centralization issue: if miner A is a mining pool with 30% hashpower and B has 10% hashpower, A will have a risk of producing a stale block 70% of the time (since the other 30% of the time A produced the last block and so will get mining data immediately) whereas B will have a risk of producing a stale block 90% of the time. Thus, if the block interval is short enough for the stale rate to be high, A will be substantially more efficient simply by virtue of its size. With these two effects combined, blockchains which produce blocks quickly are very likely to lead to one mining pool having a large enough percentage of the network hashpower to have de facto control over the mining process.

As described by Sompolinsky and Zohar, GHOST solves the first issue of network security loss by including stale blocks in the calculation of which chain is the "longest"; that is to say, not just the parent and further ancestors of a block, but also the stale children of the block's ancestors (in Ethereum jargon, "uncles") are added to the calculation of which block has the largest total proof of work backing it. To solve the second issue of centralization bias, we go beyond the protocol described by Sompolinsky and Zohar, and also allow stales to be registered into the main chain to receive a block reward: a stale block receives 93.75% of its base reward, and the nephew that includes the stale block receives the remaining 6.25%. Transaction fees, however, are not awarded to uncles.

Ethereum implements a simplified version of GHOST which only goes down five levels. Specifically, a stale block can only be included as an uncle by the 2nd to 5th generation child of its parent, and not any block with a more distant relation (e.g., 6th generation child of a parent, or 3rd generation child of a grandparent). This was done for several reasons. First, unlimited GHOST would include too many complications into the calculation of which uncles for a given block are valid. Second, unlimited GHOST with compensation as used in Ethereum removes the incentive for a miner to mine on the main chain and not the chain of a public attacker. Finally, calculations show that five-level GHOST with incentivization is over 95% efficient even with a 15 s block time, and miners with 25% hashpower show centralization gains of less than 3%.

Fees

Because every transaction published into the blockchain imposes on the network the cost of needing to download and verify it, there is a need for some regulatory mechanism, typically involving transaction fees, to prevent abuse. The default approach, used in Bitcoin, is to have purely voluntary fees, relying on miners to act as the gatekeepers and set dynamic minimums. This approach has been received very favorably in the Bitcoin community particularly because it is "market-based", allowing supply and demand between miners and transaction senders determine the price. The problem with this line of reasoning is, however, that transaction processing is not a market; although it is intuitively attractive to construe transaction processing as a service that the miner is offering to the sender, in reality every transaction that a miner includes will need to be processed by every node in the network, so the vast majority of the cost of transaction processing is borne by third parties and not the miner that is making the decision of whether or not to include it. Hence, tragedy-of-the-commons problems are very likely to occur.

However, as it turns out this flaw in the market-based mechanism, when given a particular inaccurate simplifying assumption, magically cancels itself out. The argument is as follows. Suppose that:

1. A transaction leads to k operations, offering the reward kR to any miner that includes it where R is set by the sender and k and R are (roughly) visible to the miner beforehand.
2. An operation has a processing cost of C to any node (i.e., all nodes have equal efficiency)
3. There are N mining nodes, each with exactly equal processing power (i.e., 1/N of total)
4. No non-mining full nodes exist.

A miner would be willing to process a transaction if the expected reward is greater than the cost. Thus, the expected reward is kR/N since the miner has a 1/N chance of processing the next block, and the processing cost for the miner is simply kC. Hence, miners will include transactions where kR/N>kC, or R>NC. Note that R is the per-operation fee provided by the sender, and is thus a lower bound on the benefit that the sender derives from the transaction, and NC is the cost to the entire network together of processing an operation. Hence, miners have the incentive to include only those transactions for which the total utilitarian benefit exceeds the cost.

However, there are several important deviations from those assumptions in reality:

1. The miner does pay a higher cost to process the transaction than the other verifying nodes, since the extra verification time delays block propagation and thus increases the chance the block will become a stale.
2. There do exist non-mining full nodes.
3. The mining power distribution may end up radically inegalitarian in practice.
4. Speculators, political enemies and crazies whose utility function includes causing harm to the network do exist, and they can cleverly set up contracts whose cost is much lower than the cost paid by other verifying nodes.

Point 1 above provides a tendency for the miner to include fewer transactions, and point 2 increases NC; hence, these two effects at least partially cancel each other out. Points 3 and 4 are the major issue; to solve them we simply institute a floating cap: no block can have more operations than BLK_LIMIT_FACTOR times the long-term exponential moving average.

Specifically:

```
blk.oplimit=floor((blk.parent.oplimit*(EMAFAC-
    TOR−1)+floor
    (parent.opcount*BLK_LIMIT_FACTOR))/
    EMA_FACTOR)
```

BLK_LIMIT_FACTOR and EMA_FACTOR are constants that will be set to 65536 and 1.5 for the time being, but will likely be changed after further analysis.

Computation And Turing-Completeness

An important note is that the Ethereum virtual machine is Turing-complete; this means that EVM code can encode any computation that can be conceivably carried out, including infinite loops. EVM code allows looping in two ways. First, there is a JUMP instruction that allows the program to jump back to a previous spot in the code, and a JUMPI instruction to do conditional jumping, allowing for statements like while x<27: x=x*2. Second, contracts can call other contracts, potentially allowing for looping through recursion. This naturally leads to a problem: can malicious users essentially shut miners and full nodes down by forcing them to enter into an infinite loop? The issue arises because of a problem in computer science known as the halting problem: there is no way to tell, in the general case, whether or not a given program will ever halt.

As described in the state transition section, our solution works by requiring a transaction to set a maximum number of computational steps that it is allowed to take, and if execution takes longer computation is reverted but fees are still paid. Messages work in the same way. To show the motivation behind our solution, consider the following examples:

An attacker creates a contract which runs an infinite loop, and then sends a transaction activating that loop to the miner. The miner will process the transaction, running the infinite loop, and wait for it to run out of gas. Even though the execution runs out of gas and stops halfway through, the transaction is still valid and the miner still claims the fee from the attacker for each computational step.

An attacker creates a very long infinite loop with the intent of forcing the miner to keep computing for such a long time that by the time computation finishes a few more blocks will have come out and it will not be possible for the miner to include the transaction to claim the fee. However, the attacker will be required to submit a value for STARTGAS limiting the number of computational steps that execution can take, so the miner will know ahead of time that the computation will take an excessively large number of steps.

An attacker sees a contract with code of some form like send(A,contract.storage[A]); contract.storage [A]=0, and sends a transaction with just enough gas to run the first step but not the second (i.e., making a withdrawal but not letting the balance go down). The contract author does not need to worry about protecting against such attacks, because if execution stops halfway through the changes get reverted.

A financial contract works by taking the median of nine proprietary data feeds in order to minimize risk. An attacker takes over one of the data feeds, which is designed to be modifiable via the variable-address-call mechanism described in the section on DAOs, and converts it to run an infinite loop, thereby attempting to force any attempts to claim funds from the financial contract to run out of gas. However, the financial contract can set a gas limit on the message to prevent this problem.

The alternative to Turing-completeness is Turing-incompleteness, where JUMP and JUMPI do not exist and only one copy of each contract is allowed to exist in the call stack at any given time. With this system, the fee system described and the uncertainties around the effectiveness of our solution might not be necessary, as the cost of executing a contract would be bounded above by its size. Additionally, Turing-incompleteness is not even that big a limitation; out of all the contract examples we have conceived internally, so far only one required a loop, and even that loop could be removed by making 26 repetitions of a one-line piece of code. Given the serious implications of Turing-completeness, and the limited benefit, why not simply have a Turing-incomplete language? In reality, however, Turing-incompleteness is far from a neat solution to the problem. To see why, consider the following contracts:

C0: call(C1); call(C1);
C1: call(C2); call(C2);
C2: call(C3); call(C3);
. . .
C49: call(C50); call(C50);
C50: (run one step of a program and record the change in storage)

Now, send a transaction to A. Thus, in 51 transactions, we have a contract that takes up 250 computational steps. Miners could try to detect such logic bombs ahead of time by maintaining a value alongside each contract specifying the maximum number of computational steps that it can take, and calculating this for contracts calling other contracts recursively, but that would require miners to forbid contracts that create other contracts (since the creation and execution of all 50 contracts above could easily be rolled into a single contract). Another problematic point is that the address field of a message is a variable, so in general it may not even be possible to tell which other contracts a given contract will call ahead of time. Hence, all in all, we have a surprising conclusion: Turing-completeness is surprisingly easy to manage, and the lack of Turing-completeness is equally surprisingly difficult to manage unless the exact same controls are in place—but in that case why not just let the protocol be Turing-complete?

Currency And Issuance

The Ethereum network includes its own built-in currency, ether, which serves the dual purpose of providing a primary liquidity layer to allow for efficient exchange between various types of digital assets and, more importantly, of providing a mechanism for paying transaction fees. For convenience and to avoid future argument (see the current mBTC/uBTC/satoshi debate in Bitcoin), the denominations will be pre-labelled: 1: wei; 10ˆ12: Szabo; 10ˆ15: finney; and 10ˆ18: ether.

This should be taken as an expanded version of the concept of “dollars” and “cents” or “BTC” and “satoshi”. In the near future, we expect “ether” to be used for ordinary transactions, “finney” for microtransactions and “szabo” and “wei” for technical discussions around fees and protocol implementation.

The issuance model will be as follows:

- Ether will be released in a currency sale at the price of 1337-2000 ether per BTC, a mechanism intended to fund the Ethereum organization and pay for development that has been used with success by a number of other cryptographic platforms. Earlier buyers will benefit from larger discounts. The BTC received from the sale will be used entirely to pay salaries and bounties to developers, researchers and projects in the cryptocurrency ecosystem.
- 0.099× the total amount sold will be allocated to early contributors who participated in development before BTC funding or certainty of funding was available, and another 0.099× will be allocated to long-term research projects.
- 0.26× the total amount sold will be allocated to miners per year forever after that point.

Issuance Breakdown

The permanent linear supply growth model reduces the risk of what some see as excessive wealth concentration in Bitcoin, and gives individuals living in present and future eras a fair chance to acquire currency units, while at the same time discouraging depreciation of ether because the “supply growth rate” as a percentage still tends to zero over time. We also theorize that because coins are always lost over time due to carelessness, death, etc, and coin loss can be modeled as a percentage of the total supply per year, that the total currency supply in circulation will in fact eventually stabilize at a value equal to the annual issuance divided by the loss rate (e.g., at a loss rate of 1%, once the supply reaches 26X then 0.26X will be mined and 0.26X lost every year, creating an equilibrium).

| Group | At launch | After 1 year | After 5 years |
|---|---|---|---|
| Currency units | 1.198X | 1.458X | 2.498X |
| Purchasers | 83.5% | 68.6% | 40.0% |
| Early contributor distribution | 8.26% | 6.79% | 3.96% |
| Long-term endowment | 8.26% | 6.79% | 3.96% |
| Miners | 0% | 17.8% | 52.0% |

Despite the linear currency issuance, just like with Bitcoin over time the supply growth rate nevertheless tends to zero.

Mining Centralization

The Bitcoin mining algorithm basically works by having miners compute SHA256 on slightly modified versions of the block header millions of times over and over again, until eventually one node comes up with a version whose hash is less than the target (currently around 2190). However, this mining algorithm is vulnerable to two forms of centralization. First, the mining ecosystem has come to be dominated by ASICs (application-specific integrated circuits), computer chips designed for, and therefore thousands of times more efficient at, the specific task of Bitcoin mining. This means that Bitcoin mining is no longer a highly decentralized and egalitarian pursuit, requiring millions of dollars of capital to effectively participate in. Second, most Bitcoin miners do not actually perform block validation locally; instead, they rely on a centralized mining pool to provide the block headers. This problem is arguably worse: as of the time of this writing, the top two mining pools indirectly control roughly 50% of processing power in the Bitcoin network, although this is mitigated by the fact that miners can switch to other mining pools if a pool or coalition attempts a 51% attack.

The current intent at Ethereum is to use a mining algorithm based on randomly generating a unique hash function for every 1000 nonces, using a sufficiently broad range of computation to remove the benefit of specialized hardware. Such a strategy will certainly not reduce the gain of centralization to zero, but it does not need to. Note that each individual user, on their private laptop or desktop, can perform a certain quantity of mining activity almost for free, paying only electricity costs, but after the point of 100% CPU utilization of their computer additional mining will require them to pay for both electricity and hardware. ASIC mining companies need to pay for electricity and hardware starting from the first hash. Hence, if the centralization gain can be kept to below this ratio, (E+H)/E, then even if ASICs are made there will still be room for ordinary miners.

Additionally, we intend to design the mining algorithm so that mining requires access to the entire blockchain, forcing miners to store the entire blockchain and at least be capable of verifying every transaction. This removes the need for centralized mining pools; although mining pools can still serve the legitimate role of evening out the randomness of reward distribution, this function can be served equally well by peer-to-peer pools with no central control. It additionally helps fight centralization, by increasing the number of full nodes in the network so that the network remains reasonably decentralized even if most ordinary users prefer light clients.

Scalability

One common concern about Ethereum is the issue of scalability. Like Bitcoin, Ethereum suffers from the flaw that every transaction needs to be processed by every node in the network. With Bitcoin, the size of the current blockchain rests at about 20 GB, growing by about 1 MB per hour. If the Bitcoin network were to process Visa’s 2000 transactions per second, it would grow by 1 MB per three seconds (1 GB per hour, 8 TB per year). Ethereum is likely to suffer a similar growth pattern, worsened by the fact that there will be many applications on top of the Ethereum blockchain instead of just a currency as is the case with Bitcoin, but ameliorated by the fact that Ethereum full nodes need to store just the state instead of the entire blockchain history.

The problem with such a large blockchain size is centralization risk. If the blockchain size increases to, say, 100 TB, then the likely scenario would be that only a very small number of large businesses would run full nodes, with all regular users using light SPV nodes. In such a situation, there arises the potential concern that the full nodes could band together and all agree to cheat in some profitable fashion (e.g., change the block reward, give themselves BTC). Light nodes would have no way of detecting this immediately. Of course, at least one honest full node would likely exist, and after a few hours information about the fraud would trickle out through channels like Reddit, but at that point it would be too late: it would be up to the ordinary users to organize an effort to blacklist the given blocks, a massive and likely infeasible coordination problem on a similar scale as that of pulling off a successful 51% attack. In the case of Bitcoin, this is currently a problem, but there exists a blockchain modification suggested by Peter Todd which will alleviate this issue.

In the near term, Ethereum will use two additional strategies to cope with this problem. First, because of the blockchain-based mining algorithms, at least every miner will be forced to be a full node, creating a lower bound on the number of full nodes. Second and more importantly, however, we will include an intermediate state tree root in the blockchain after processing each transaction. Even if block validation is centralized, as long as one honest verifying node exists, the centralization problem can be circumvented via a verification protocol. If a miner publishes an invalid block, that block must either be badly formatted, or the state S[n] is incorrect. Since S[0] is known to be correct, there must be some first state S[i] that is incorrect where S[i−1] is correct. The verifying node would provide the index i, along with a "proof of invalidity" consisting of the subset of Patricia tree nodes needing to process APPLY(S[i−1],TX[i])→S[i]. Nodes would be able to use those nodes to run that part of the computation, and see that the S[i] generated does not match the S[i] provided.

Another, more sophisticated, attack would involve the malicious miners publishing incomplete blocks, so the full information does not even exist to determine whether or not blocks are valid. The solution to this is a challenge-response protocol: verification nodes issue "challenges" in the form of target transaction indices, and upon receiving a node a light node treats the block as untrusted until another node, whether the miner or another verifier, provides a subset of Patricia nodes as a proof of validity.

Decentralized Applications

The contract mechanism described above allows anyone to build what is essentially a command line application run on a virtual machine that is executed by consensus across the entire network, allowing it to modify a globally accessible state as its "hard drive". However, for most people, the command line interface that is the transaction sending mechanism is not sufficiently user-friendly to make decentralization an attractive mainstream alternative. To this end, a complete "decentralized application" should consist of both low-level business-logic components, whether implemented entirely on Ethereum, using a combination of Ethereum and other systems (e.g., a P2P messaging layer, one of which is currently planned to be put into the Ethereum clients) or other systems entirely, and high-level graphical user interface components. The Ethereum client's design is to serve as a web browser, but include support for a "eth" Javascript API object, which specialized web pages viewed in the client will be able to use to interact with the Ethereum blockchain. From the point of view of the "traditional" web, these web pages are entirely static content, since the blockchain and other decentralized protocols will serve as a complete replacement for the server for the purpose of handling user-initiated requests. Eventually, decentralized protocols, hopefully themselves in some fashion using Ethereum, may be used to store the web pages themselves.

Conclusion

The Ethereum protocol was originally conceived as an upgraded version of a cryptocurrency, providing advanced features such as on-blockchain escrow, withdrawal limits and financial contracts, gambling markets and the like via a highly generalized programming language. The Ethereum protocol would not "support" any of the applications directly, but the existence of a Turing-complete programming language means that arbitrary contracts can theoretically be created for any transaction type or application. What is more interesting about Ethereum, however, is that the Ethereum protocol moves far beyond just currency. Protocols and decentralized applications around decentralized file storage, decentralized computation and decentralized prediction markets, among dozens of other such concepts, have the potential to substantially increase the efficiency of the computational industry, and provide a massive boost to other peer-to-peer protocols by adding for the first time an economic layer. Finally, there is also a substantial array of applications that have nothing to do with money at all.

The concept of an arbitrary state transition function as implemented by the Ethereum protocol provides for a platform with unique potential; rather than being a closed-ended, single-purpose protocol intended for a specific array of applications in data storage, gambling or finance, Ethereum is open-ended by design, and we believe that it is extremely well-suited to serving as a foundational layer for a very large number of both financial and non-financial protocols in the years to come.

A review of Etherum and its vulnerabilities are discussed in Atzei, Nicola, Massimo Bartoletti, and Tiziana Cimoli. "A survey of attacks on ethereum smart contracts (sok)." In International conference on principles of security and trust, pp. 164-186. Springer, Berlin, Heidelberg, 2017.

Smart contracts are computer programs that can be correctly executed by a network of mutually distrusting nodes, without the need of an external trusted authority. Since smart contracts handle and transfer assets of considerable value, besides their correct execution it is also crucial that their implementation is secure against attacks which aim at stealing or tampering the assets. We study this problem in Ethereum, the most well-known and used framework for smart contracts so far. We analyze the security vulnerabilities of Ethereum smart contracts, providing a taxonomy of common programming pitfalls which may lead to vulnerabilities. We show a series of attacks which exploit these vulnerabilities, allowing an adversary to steal money or cause other damage.

Ethereum is a decentralized virtual machine, which runs programs—called contracts—upon request of users. Contracts are written in a Turing-complete bytecode language, called EVM bytecode. Roughly, a contract is a set of functions, each one defined by a sequence of bytecode instructions. A remarkable feature of contracts is that they can transfer ether (a cryptocurrency similar to Bitcoin) to/from users and to other contracts.

Users send transactions to the Ethereum network in order to: (i) create new contracts; (ii) invoke functions of a contract; (iii) transfer ether to contracts or to other users. All the transactions are recorded on a public, append-only data structure, called blockchain. The sequence of transactions on the blockchain determines the state of each contract, and the balance of each user.

Since contracts have an economic value, it is crucial to guarantee that their execution is performed correctly. To this purpose, Ethereum does not rely on a trusted central authority: rather, each transaction is processed by a large network of mutually untrusted peers called miners. Potential conflicts in the execution of contracts (due e.g., to failures or attacks) are resolved through a consensus protocol based on "proof-of-work" puzzles. Ideally, the execution of contracts is correct whenever the adversary does not control the majority of the computational power of the network.

The security of the consensus protocol relies on the assumption that honest miners are rational, i.e., that it is more convenient for a miner to follow the protocol than to try to attack it.

To make this assumption hold, miners receive some economic incentives for performing the (time-consuming) computations required by the protocol. Part of these incentives is given by the execution fees paid by users upon each transaction. These fees bound the execution steps of a transaction, so preventing from DoS attacks where users try to overwhelm the network with time-consuming computations.

Programming smart contracts. We illustrate contracts through a small example (AWallet, in FIG. 1), which implements a personal wallet associated to an owner. Rather than programming it directly as EVM bytecode, we use Solidity, a Javascript-like programming language which compiles into EVM bytecode1. Intuitively, the contract can receive ether from other users, and its owner can send (part of) that ether to other users via the function pay. The hashtable outflow records all the addresses2 to which it sends money, and associates to each of them the total transferred amount. All the ether received is held by the contract. Its amount is automatically recorded in balance: this is a special variable, which cannot be altered by the programmer.

Contracts are composed by fields and functions. A user can invoke a function by sending a suitable transaction to the Ethereum nodes. The transaction must include the execution fee (for the miners), and may include a transfer of ether from the caller to the contract. Solidity also features exceptions, but with a peculiar behavior. When an exception is thrown, it cannot be caught: the execution stops, the fee is lost, and all the side effects—including transfers of ether—are reverted. Were the gas returned to callers in case of exceptions, an adversary could mount a DoS attack by repeatedly invoking a function which just throws an exception.

Each function invocation is ideally executed by all miners in the Ethereum network. Miners are incentivized to do such work by the execution fees paid by the users which invoke functions. Besides being used as incentives, execution fees also protect against denial-of-service attacks, where an adversary tries to slow down the network by requesting time-consuming Execution fees are defined in terms of gas and gas price, and their product represents the cost paid by the user to execute code. More specifically, the transaction which triggers the invocation specifies the gas limit up to which the user is willing to pay, and the price per unit of gas. Roughly, the higher is the price per unit, the higher is the chance that miners will choose to execute the transaction. Each EVM operation consumes a certain amount of gas, and the overall fee depends on the whole sequence of operations executed by miners.

Miners execute a transaction until its normal termination, unless an exception is thrown. If the transaction terminates successfully, the remaining gas is returned to the caller, otherwise all the gas allocated for the transaction is lost. If a computation consumes all the allocated gas, it terminates with an "out-of-gas" exception—hence the caller loses all the gas3. An adversary wishing to attempt a denial-of-service attack (e.g., by invoking a time-consuming function) should allocate a large amount of gas, and pay the corresponding ether. If the adversary chooses a gas price consistently with the market, miners will execute the transaction, but the attack will be too expensive; otherwise, if the price is too low, miners will not execute the transaction.

The mining process. Miners group the transactions sent by users into blocks, and try to append them to the blockchain in order to collect the associated fees. Only those blocks which satisfy a given set of conditions, which altogether are called validity, can be appended to the blockchain. In particular, one of these conditions requires to solve a moderately hard "proof-of-work" puzzle, which depends on the previous block and on the transactions in the new block.

The difficulty of the puzzle is dynamically updated so that the average mining rate is 1 block every 12 s.

When a miner solves the puzzle and broadcasts a new valid block to the network, the other miners discard their attempts, update their local copy of the blockchain by appending the new block, and start "mining" on top of it. The miner who solves the puzzle is rewarded with the fees of the transactions in the new block (and also with some fresh ether).

It may happen that two (or more) miners solve the puzzle almost simultaneously. In this case, the blockchain forks in two (or more) branches, with the new blocks pointing to the same parent block. The consensus protocol prescribes miners to extend the longest branch. Hence, even though both branches can transiently continue to exist, eventually the fork will be resolved for the longest branch. Only the transactions therein will be part of the blockchain, while those in the shortest branch will be discarded. The reward mechanism, inspired to the GHOST protocol, assigns the full fees to the miners of the blocks in the longest branch, and a portion of the fees to those who mined the roots of the discarded branch4. E.g., assume that blocks A and B have the same parent, and that a miner appends a new block on top of A. The miner can donate part of its reward to the miner of the "uncle block" B, in order to increase the weight of its branch in the fork resolution process. Systems with low mining rate—like e.g., Bitcoin (1 block/10 min)—have a small probability of forks, hence typically they do not reward discarded blocks.

Compiling Solidity into EVM bytecode. Although contracts are rendered as sets of functions in Solidity, the EVM bytecode has no support for functions. Therefore, the Solidity compiler translates contracts so that their first part implements a function dispatching mechanism. More specifically, each function is uniquely identified by a signature, based on its name and type parameters. Upon function invocation, this signature is passed as input to the called contract: if it matches some function, the execution jumps to the corresponding code, otherwise it jumps to the fallback function. This is a special function with no name and no arguments, which can be arbitrarily programmed. The fallback function is executed also when the contract is passed an empty signature: this happens e.g., when sending ether to the contract.

Solidity features three different constructs to invoke a contract from another contract, which also allow to send ether. All these constructs are compiled using the same bytecode instruction. The result is that the same behavior can be implemented in several ways.

Ether lost in transfer. When sending ether, one has to specify the recipient address, which takes the form of a sequence of 160 bits. Addresses are sequences of 160 bits which uniquely identify contracts and users. However, many of these addresses are orphan, i.e., they are not associated to any user or contract. If some ether is sent to an orphan address, it is lost forever (note that there is no way to detect whether an address is orphan). Since lost ether cannot be recovered, programmers have to manually ensure the correctness of the recipient addresses.

Unpredictable state. The state of a contract is determined by the value of its fields and balance. In general, when a user sends a transaction to the network in order to invoke some contract, he cannot be sure that the transaction will be run in the same state the contract was at the time of sending that transaction. This may happen because, in the meanwhile, other transactions have changed the contract state. Even if the user was fast enough to be the first to send a transaction, it is not guaranteed that such transaction will be the first to be run. Indeed, when miners group transactions into blocks, they are not required to preserve any order; they could also choose not to include some transactions.

Generating randomness. The execution of EVM bytecode is deterministic: in the absence of misbehavior, all miners executing a transaction will have the same results. Hence, to simulate non-deterministic choices, many contracts (e.g., lotteries, games, etc.) generate pseudo-random numbers, where the initialization seed is chosen uniquely for all miners.

Time constraints. A wide range of applications use time constraints in order to determine which actions are permitted (or mandatory) in the current state. Typically, time constraints are implemented by using block timestamps, which are agreed upon by all the miners. Contracts can retrieve the timestamp in which the block was mined; all the transactions within a block share the same timestamp.

Announcement of imminent hard fork for EIP150 gas cost changes. blog.ethereum.org/2016/10/13/announcement-imminent-hard-fork-eip150-gas-cost-changes/

Bitcointalk: Hi!My name is Rubixi. bitcointalk.org/index.php?topic=1400536.60

Ethereum Classic. ethereumclassic.github.io/

The ethereum network is currently undergoing a dos attack. blog.ethereum.org/2016/09/22/ethereum-network-currently-undergoing-dos-attack/

Ethereum reddit page. www.reddit.com/r/ethereum

Ethereum Wiki: Contract security techniques and tips. github.com/ethereum/wiki/wiki/Safety Explaining eip 150. www.reddit.com/r/ethereum/comments/56f6we/explaining_eip_150/

GovernMental main page. governmental.github.io/GovernMental/

Hacking, Distribute: Scanning live Ethereum contracts for the "unchecked-send" bug. hackingdistributed.com/2016/06/16/scanning-live-ethereum-contracts-for-bugs/

King of the Ether Throne: Post mortem investigation. www.kingoftheether.com/postmortem.html MAker DART: a random number generating game for Ethereum. github.com/makerdao/maker-darts RANDAO: a DAO working as RNG of Ethereum. github.com/randao/randao Solidity: security considerations. solidity.readthedocs.io/en/develop/index.html Understanding the DAO attack. www.coindesk.com/understanding-dao-hack-joumalists/

Anderson, L., Holz, R., Ponomarev, A., Rimba, P., Weber, I.: New kids on the block: an analysis of modem blockchains. CoRR, abs/1606.06530 (2016)

Andrychowicz, M., Dziembowski, S., Malinowski, D., Mazurek, L.: Secure multiparty computations on Bitcoin. In: IEEE S&P, pp. 443-458 (2014)

Bhargavan, K., Delignat-Lavaud, A., Fournet, C., Gollamudi, A., Gonthier, G., Kobeissi, N., Rastogi, A., Sibut-Pinote, T., Swamy, N., Zanella-Beguelin, S.: Formal verification of smart contracts. In: PLAS (2016)

Bishop, M.: A taxonomy of Unix system and network vulnerabilities. Technical Report, CSE-95-10, Department of Computer Science, University of California at Davis (1995)

Bishop, M.: Vulnerabilities analysis. In: Proceedings of the Recent Advances in Intrusion Detection, pp. 125-136 (1999)

Boneh, D., Naor, M.: Timed commitments. In: Bellare, M. (ed.) CRYPTO 2000. LNCS, vol. 1880, pp. 236-254. Springer, Heidelberg (2000). doi: 10.1007/3-540-44598-6_15CrossRef Bonneau, J., Clark, J., Goldfeder, S.: On Bitcoin as a public randomness source. IACR Cryptology ePrint Archive 2015, 1015 (2015)

Brown, R. G., Carlyle, J., Grigg, I., Hearn, M.: Corda: an introduction (2016). r3cev.com/s/corda-introductory-whitepaper-final.pdf Buterin, V.: Ethereum: a next generation smart contract and decentralized application platform (2013). github.com/ethereum/wiki/wiki/White-Paper Churyumov, A.: Byteball: a decentralized system for transfer of value (2016). byteball.org/Byteball.pdf Clack, C. D., Bakshi, V. A., Braine, L.: Smart contract templates: foundations, design landscape and research directions. CoRR abs/1608.00771 (2016)

Delmolino, K., Arnett, M., Kosba, A. M. A., Shi, E.: Step by step towards creating a safe smart contract: lessons and insights from a crypto currency lab (2016)

Etherscripter. etherscripter.com

Eyal, I., Sirer, E.: Majority is not enough: bitcoin mining is vulnerable. In: Financial Cryptography and Data Security, pp. 436-454 (2014)

Frantz, C. K., Nowostawski, M.: From institutions to code: towards automated generation of smart contracts. In: Workshop on Engineering Collective Adaptive Systems (eCAS) (2016)

Garay, J., Kiayias, A., Leonardos, N.: The bitcoin backbone protocol: analysis and applications. In: Oswald, E., Fischlin, M. (eds.) EUROCRYPT 2015. LNCS, vol. 9057, pp. 281-310. Springer, Heidelberg (2015). doi: 10.1007/978-3-662-46803-6_10

Gervais, A., Karame, G. O., Wüst, K., Glykantzis, V., Ritzdorf, H., Capkun, S.: On the security and performance of proof of work blockchains. In: ACM CCS, pp. 3-16 (2016)

Hirai, Y.: Formal verification of Deed contract in Ethereum name service. yoichihirai.com/deed.pdf Landwehr, C. E., Bull, A. R., McDermott, J. P., Choi, W. S.: A taxonomy of computer program security flaws. ACM Comput. Surv. 26(3), 211-254 (1994)CrossRef Luu, L., Chu, D. H., Olickel, H., Saxena, P., Hobor, A.: Making smart contracts smarter. In: ACM CCS (2016). eprint.iacr.org/2016/633

Luu, L., Teutsch, J., Kulkarni, R., Saxena, P.: Demystifying incentives in the consensus computer. In: ACM CCS, pp. 706-719 (2015)

Marino, B., Juels, A.: Setting standards for altering and undoing smart contracts. In: RuleML, pp. 151-166 (2016)

Nakamoto, S.: Bitcoin: a peer-to-peer electronic cash system (2008). bitcoin.org/bitcoin.pdf Nipkow, T., Wenzel, M., Paulson, L. C. (eds.): Isabelle/HOL: A Proof Assistant for Higherorder. LNCS, vol. 2283. Springer, Heidelberg (2002)zbMATH Nomura Research Institute: Survey on blockchain technologies and related services. www.meti.go.jp/english/press/2016/pdf/0531_01f.pdf Pierrot, C., Wesolowski, B.: Malleability of the blockchain's entropy. IACR Cryptology ePrint Archive 2016, 370 (2016)

Piessens, F.: A taxonomy of causes of software vulnerabilities in internet software. In: International Symposium on Software Reliability Engineering, pp. 47-52 (2002)

Popejoy, S.: The Pact smart contract language (2016). kadena.io/pact

Sompolinsky, Y., Zohar, A.: Secure high-rate transaction processing in bitcoin. In: Böhme, R., Okamoto, T. (eds.) FC 2015. LNCS, vol. 8975, pp. 507-527. Springer, Heidelberg (2015). doi: 10.1007/978-3-662-47854-7_32CrossRef Swamy, N., Hritcu, C., Keller, C., Rastogi, A., Delignat-Lavaud, A., Forest, S., Bhargavan, K., Fournet, C., Strub, P., Kohlweiss, M., Zinzindohoue, J. K., Béguelin, S. Z.: Dependent types and multi-monadic effects in F*. In: POPL (2016)

Szabo, N.: Formalizing and securing relationships on public networks. First Monday 2(9) (1997). firstmonday.org/htbin/cgiwrap/bin/ojs/index.php/fm/article/view/548

UK Government Chief Scientific Adviser: Distributed ledger technology: beyond block chain. www.gov.uk/government/uploads/system/uploads/attachment_data/file/492972/gs-16-1-distributed-ledger-technology.pdf Wood, G.: Ethereum: a secure decentralised generalised transaction ledger (2014). gavwood.com/paper.pdf Wüst, K., Gervais, A.: Ethereum Eclipse Attacks. Technical report, ETH-Zlirich (2016)

SUMMARY OF THE INVENTION

The present technology provides a technology for permitting secured financing in the context of a smart contract with automated execution of exercise of a security interest in real property. (A similar process may be used for intangible property).

The structure of the transaction which is processed by the automated system is as follows:

The asset is appraised according to reliable methods, to determine its potential value in terms of a future productivity or return on investment.

The asset is then tokenized by an originator, i.e., an irrevocable interest in the real property including a security interest is represented in the form of tokens, which may be fungible tokens, non-fungible tokens or semi-fungible tokens.

The tokens are then marketed by the originator, typically for cash or liquid assets, subject to a smart contract which automatically executes on a blockchain or distributed ledger.

The smart contract typically requires a tender by the originator of the original tokens (to "burn" the tokens, e.g., transfer them to a digital wallet from which they cannot be retrieved, within a predetermined period of time.

If the predetermined period of time expires, the originator has a right to place collateral in reserve to forestall execution of the security interest. The smart contract may impose an interest rate or other penalty on the originator for the delay. Typically, the tolling of the execution of the security interest is possible only for a limited time.

The originator has the option at any time to substitute collateral against the outstanding token, such that the hold-out value of refusing to relinquish the token by a holder is limited to that reserve value.

In the case of a successful transaction, the originator will reacquire all of the tokens by the end of the predetermined period or an extended period, and the security interest in the real asset will be lifted.

If the holders of the tokens fail or refuse to tender their tokens for repurchase, then their maximum payment is the right to receive the substitute collateral in an amount specified by the smart contract. In a fully self-executing smart contract, the substitute collateral is a cryptoasset, though preferably, the substitute collateral is a real asset in a defined amount. In the case of real assets linked to smart contracts, a trustee or other trusted individual or entity is responsible for handling the off-blockchain activity.

If the originator fails to repurchase the tokens and/or tender substitute collateral, then the security interest is exercised. In one case, any excess in the security over the claim reverts to the originator or its successors, though in another case, the full amount of the underlying tokenized asset is transferred to the outstanding tokenholders as a group.

The technology therefore provides a way to increase liquidity for an originator that holds an illiquid or slowly liquid asset.

A prototype for the technology is the tokenization of a precious metal, mineral or petroleum reserve. The originator is the owner or lease-holder of the reserve, with proven assets "in the ground", or at an early stage of extraction. The originator may then borrow liquid funds from investors to fund the extraction.

The proven reserve underlying the tokenization is typically a multiple of the substitution collateral amount. For example, in a tokenized gold mine, the proven reserves may be five times greater than the amount of substitute collateral. Thus, if a token has a substitute collateral value of one ounce of gold, the proven reserves underlying the token will be five ounces of gold.

This scheme also allows the token purchasers to speculate on the future value of the reserved asset. For example, if the predetermined time to payment is five years, the token purchaser can then speculate over the future price of gold over that timeframe. If he believes that the price will increase, then he will buy the token initially at a discount, and hold the token to maturity and hold out for a payment in the substitute collateral, i.e., gold. If he believes that the price of gold will decrease, then he will sell the token at any time that the market price for the token is greater that the discounted present value of the substitute collateral gold represented by the token.

In a fungible token environment, the smart contract permits redemption with any token that represents the same asset and the same (or earlier) maturity. However, in event of a default, the secured collateral must also be fungible. This is often not the case with real property, meaning that fungibility is only possible for tokens secured by the same pool of collateral.

Therefore, these will be semi-fungible tokens, as discussed above.

This semi-fungible token implementation means that the originator can reacquire any token within the class to reduce its ultimate liability for substitute collateral. However, it can only formally redeem tokens from tokenholders that have tendered their tokens. The difference is that the originator then stands as any subsequent holder of the token and may remarket it, without immediately retirement. In the case of a non-fungible token, the smart contract may expire when the token is reacquired and reported on the blockchain as a redemption.

The token may be completely fungible if the smart contract is specified with a common set of rules for redemption, substitute collateral, and pooled security interest across the entire set of issues. For example, if a large mining company tokenizes multiple mines, in different issues, the tokens may nevertheless be fungible if the redemption period is the same, the substitute collateral at the time of redemption is the same, and the security is in the multiple mines. Note that as more mines are added to the pool, the security for the initial token-holders will be increased, but the tokenholder's interest in the entirety diluted. Therefore, the fungible token has attributes of an equity holding in the mining company, and the execution of the security interest has attributes of a bankruptcy proceeding. Therefore, the speculative nature of the fungible token has a different basis than the semifungible or non-fungible variants. Indeed, for the same asset, tokens of the different types may all be issued, with the smart contracts distinguishing between the respective rights of different token-holders in the event of a failure of redemption.

A fungible token would generally have greater liquidity, and an originator may have different incentives in redeeming the different tokens at different times. For example, since the fungible token has a risk profile on the financial health of the originator, if the fungible token price becomes depressed due to reporting of an adverse event, the originator may choose that opportunity to reacquire tokens from the market. On the other hand, when the market value of the substitute collateral drives a change in the value of the non-fungible or semi-fungible tokens, there may be corresponding opportunity to buy or sell treasury tokens or issue new tokens, taking advantage of arbitrage opportunities.

The present technology converts an illiquid asset which represents demonstrable and recognized wealth, into a liquid resource, typically without requiring the illiquid asset itself to be monetized. A contingent interest in real property rights (e.g., a security interest) permits, upon conclusion of a smart contract, a counterparty to the asset owner, to force either compliance with the terms of the smart contract, e.g., repayment of the tokens, or have available legal remedies available under the contingent interest, or have automatically executing blockchain "remedies" implemented outside the direct purview of courts of law.

In a preferred embodiment, the smart contract requires return of the same (fungible) tokens or number of (non-fungible) tokens or class of (semi-fungible) tokens as were issued to the asset owner, in order to release the contingent interest.

The smart contract may be liked to an insurance contract to mitigate risks of issuer and/or tokenholder, or to equalize or normalize differences between tokens in order to assure fungibility. Therefore, another aspect of the technology is to link a smart contract which is linked to a nominally non-fungible or semi-fungible token, to another instrument which artificially achieves fungibility. The token alone may be an NFT, but the token in conjunction with the ancillary smart contract or insurance contract is fungible, at least according to the rules imposed.

This technology may be applied beyond real property and security interests and liens.

The technology permits a distributed ledger to be a complete an accurate accounting means for the tokens, from creation to extinction, by completion of the cycle. Of course, more complex terms are possible, such as a fractional or surplus return ratio.

In a preferred embodiment, a substitution is possible, which serves to secure release of the contingent interest, absent return of all tokens, for example in case of unavailability or pricing disparity.

In general, a borrower (e.g., originator) seeks to monetize a capital investment in a productive resource that has a predictable cost of production of a commodity, and other predictable (and/or insurable) risks. A buyer, lender, or issuer seeks to securitize the investment by creating a salable and tradable token, guaranteed by the value of the security (security interest), and subject to a "smart contract" which limits unpredictable human-factor risks, so that the value of the loan can be immediately off-loaded into public markets. Finally, public markets acquire the tokens, which have advantages over cash, in terms of transferability, security, and in some cases (i.e., unstable political regimes), asset backing.

The tokens are ultimately backed by a security interest in the productive means, and may have a discount in excess of the cost of extraction or production, at least at issuance. The discount itself is a market issue, and typically not intrinsic to the technology. However, an understanding of the market dynamics helps drive the game theoretic incentives of the respective parties. The token investor seeks an assured minimum rate of return, with a limited downside risk, and a defined upside risk, and possibility of liquidity before maturity. The minimum rate of return is established by the discount from the nominal value of the substitute collateral, bearing in mind that the substitute collateral may change in value over time. The downside risk for the tokenholder is, for example, fraud, that the security interest is insufficient, that collection on the security will take too long, that the token will become embroiled in litigation or unwanted regulatory oversight, that the token value will drop such that the investment becomes illiquid before maturity, etc. The upside risk is that the originator may seek to redeem the tokens early at a premium. For example, a fee simple sale of the interest may be frustrated by outstanding security interests, compelling the originator to redeem the tokens before maturity, at a premium. The tokenholder also stands to benefit if the underlying substitute collateral asset increases in value. If the original discount is dependent on a poor financial condition of the originator, and that condition improves, the tokens may also increase in value as a result of reduced originator risk.

Note that terms of the smart contract may modify any of these risks, and for example, oracles may be used to link terms of the smart contract to market conditions.

The tokens, once issued, generally have a fundamental value, tied to the security interest and smart contract that governs it. Therefore, in contrast to a fiat currency, the tokens are less correlated in value with political instability, inflation, devaluation, foreign trade balance, and the like, except to the extent that the subjective value of the substitute collateral, originator risk, etc., also vary based on these factors. On the other hand, the token would typically have a value positively correlated with the value of the underlying security asset, and the commodity to which it pertains.

The tokens may be tied to a single smart contract, or issued backed by a portfolio of secured assets. In this case, for example, a token may represent a diversified risk of a portfolio, in the manner of a mutual fund or index fund, managed according to strict criteria.

A typical smart contract will have a predefined term, such as 10 years. At the end of the term, the borrower must acquire the tokens at market price, or provide a permitted alternate. In a preferred embodiment, the smart contract authorizes a right of substitution, wherein the borrower may release the security interest by depositing with a reliable repository, a predetermined amount of the commodity, and at termination, the holder(s) of tokens can offer their tokens to the original source, presumably at or near the underlying commodity value, as of the expiration of the contract. In another scenario, the token holders receive the commodity itself, and not its value, though in most cases, the commodity is represented by a liquid right in a defined currency. The fixed expiration date permits deposit of commodities futures contracts as the substituted assets, rather than the commodities themselves, which further reduces the economic inefficiency of the securitization.

The preferred implementation permits a renewal of the smart contract, such that an actual transfer of the commodity at the initial term of the smart contract is not required. Thus, the smart contract can be renewed, with underwriting performed in anticipation of renewal to verify that the secured assets have appropriate value, etc.

Users of the tokens may therefore anticipate variations in demand over time. However, while the security for the particular tokens may differ, the smart contract is designed and intended to provide sufficient margin between the security interest and likely range of values such that they are fungible, and various tokens for the same commodity would assume the same market value.

Therefore, one way to achieve fungibility is to ensure that the market perceives that the risk of requiring execution on the collateral is vanishingly small, such that the originator will almost always repurchase the tokens at market rate or tender substitute collateral. Further, maturities for classes of tokens may be aligned, for example end of year, so that at any time, there are a limited number of issues of "fungible" tokens.

Assuming that the proven reserves remain attractive, a mechanism may be provided for acquisition of the underlying security for a defaulting or prospective defaulting originator by another interest, who may then make a profit by rehabilitating the assets underlying the tokens, and reinstating them at market price. The defaulting originator is then forced to take a loss or lose its assets. For example, the smart contract may have an oracle or a consensus of oracles predicting, according to predetermined criteria, imminence of default. The right to mine the claim may then be passed to a new operating entity that tenders a guaranty or other security to the smart contract. In this way, the value of the tokens is stabilized, fungibility assured, and the original token sale occurs at a lower discount.

In some cases, the tokens will rise to a value above a right of substitution value or security interest value. In this case, there may be differences between tokens, but in that case, there would be an incentive for bowers to substitute the security as the commodity or a contract right for the commodity, and thus achieve fungibility in that manner. When the value of the token rises above the securitization, the result is somewhat similar to the pricing of non-securitized cryptocurrencies, i.e., the pricing is dependent on scarcity of the tokens and a demand established by usefulness or speculation. However, in contrast to current unsecuritized cryptocurrencies, the securitized tokens have a right, at smart contract termination, to liquidation at the exchange price for the commodity. Further, if the tokens are fully substituted (a likely occurrence if the token value exceeds the commodity exchange value), the smart contract may go into automatic renewal (with a right of token redemption), and thus expiration risk for token-holders abated. Therefore, the tokens may have a minimum market value expressed in a commodity exchange rate at or after smart contract expiration.

The fungibility of tokens may also be linked to commodities futures contracts. That is, before a token is backed by substitute collateral, it may be non-fungible, but after the substitute collateral is assured, the token may become fungible. Thus, the token may become fungible after being non-fungible. Depending on the smart contract, a fungible token may become non-fungible, for example by withdrawal of the presecuring collateral. This would typically command a premium, in order to provide a stable market. For example, a cryptocurrency drop. or direct payment in cash or substitute collateral, or change to more favorable smart contract terms of the token holder, provided for this typically disadvantageous transaction.

The scarcity of the tokens is guaranteed by the limited nature of commodity production or creation facilities, and the securitization discount.

To the extent that commodities market risks are deemed unacceptable or undesired, the tokens may be backed by various types of portfolios that mitigate desired risks. Likewise, risks may be concentrated if desired. For example, instead of securitizing tokens based on a mineral mine or the like, the borrower may simply deposit futures contracts in exchange for tokens, which are then sold to raise cash. If the borrower owns a productive resource for the subject commodity, the future contract may be written based on production and fulfillment by the borrower. However, this is not required, and the borrower may engage in side-transactions to fulfill its eventual obligations, so long as the security interest meets the smart contract and underwriting criteria.

Blockchain technology provides various known advantages. For example, entries made on the blockchain are permanent, immutable, and independently verifiable. Therefore, the use of blockchains is particularly valuable for verifying ownership of a token, recording transfers of tokens, and auditing transactions. The present technology does not require, and a preferred embodiment does not include, anonymity, and therefore parties to a transaction may be authenticated using biometrics, multifactor authentication, or various means. This avoids the need to rely on passwords or cryptographic credentials alone, as with some cryptocurrencies. Thus, a human service may be employed to verify participants in transactions. On the other hand, anonymous transaction capability is also possible.

The use of tokens provides advantages with respect to currencies, commodity trades, barter, contract obligations, and other payment methods. Currencies can require conversions, which incur costly and risk. Commodity trades may require delivery of significant quantities of material, storage (with required physical security), transactional costs, pricing fluctuations, etc. Barter has similar issues with commodities, but also incurs liquidity risk. (If an exchange is with respect to a liquid asset, it is either a security or a commodity, if it is neither, it would be considered a barter). Contract rights, such as futures, incur the risks of the underlying security or commodity, but also a greater pricing fluctuation risk to contract termination, and likely higher transactional costs.

The token according to the present technology has some characteristics of a derivative of a forward contract, with the advantage that, while the value of the token is secured by the value of the resource capable of delivering the commodity (with certain investment in delivering the commodity less than a differential between the value borrowed and the present value of the resource), and there is no actual requirement to develop the resource to deliver the commodity, maintaining efficient options for the borrower (Originator). The derivative, however, has characteristics of a virtual cryptocurrency, with asset backing, which can reduce volatility, and provide an expected return on investment due to reduction in market discount as the token approaches maturity.

While there is technically no limit on demand-based increases in the value of the tokens, and thus opportunity for speculation, according to a preferred embodiment, the borrower has a right of substitution, and therefore the risk of specific demand by a borrower seeking to recover the tokens and retire the debt, and therefore an opportunity for a hold-out, is limited. Further, the technology does not particularly seek to limit the amount of asset-backed tokens generated, and therefore scarcity of the class of tokens is not a driving principle for valuation. Therefore, the motivations for pricing volatility are limited, resulting in a cryptocurrency or cryptoasset token whose basis for valuation is the asset backing and usefulness in or in conjunction with commerce.

As discussed above, while the underlying underwriting of the productive asset and security interest begin as a non-fungible or semi-fungible tokenization, when marketed, the tokens are preferably fully fungible, and are issued in undistinguished form and as part of an indistinguishable pool. Any underlying distinctions between tokens are addressed by the smart contract or ancillary mitigation.

Note that the fungibility is with respect to an originator/borrower until the substitute collateral is tendered (and therefore redemption risk is resolved), and a further process is in order to normalized between issuers before that occurs. A guarantor or other single entity may be present to convert the multiple issuers into a single issuer. An insurer or indemnitor may be present to serve a similar role. In either case, differences in the risks of the borrower are absorbed outside of the smart contract, so that from the perspective of a tokenholder, the originator risks of all of the tokens are similar or compensated.

Tokens may be serialized, with redemption in sequential order, e.g., oldest first. Therefore, the tokens may be fungible, except order of priority in redemption. Marketwise, a buyer may seek the oldest token available, tokens of a defined vintage, or the lowest cost token available, or otherwise. The originator may redeem (i.e., provide substitute collateral) only the oldest tokens, but may engage in market transactions for other tokens. In another implementation, the originator may selectively redeem any tokens, and therefore arbitrage differences in vintage pricing.

With respect to particular issuances (i.e., semi-fungible tokens), it is possible that a certain resource will turn out to be over-valued or fraudulent, for example, and as a result, the tokens issued based on that resource lack asset backing. Since we presume that there are other tokens available in the same class that are properly asset backed, this would tend to negatively impact the valuation of those particular tokens. Of course, steps are taken during underwriting to avoid this possibility, but it is also possible to acquire insurance on the assets to assure the value of their securitization. When tokens are separately tracked, as compared to a fungible token, a token under which the borrower has defaulted, and a surety is invoked may be worth more than other tokens, leading to higher "special" demand for riskier tokens. On the other hand, if the token value is above redemption value, the special tokens will be worth less. Therefore, a speculation opportunity is provided in this case. Therefore, side transactions with insurers, indemnitors, and guarantors may be possible to reverse the normalization that makes tokens fungible. Since this forces a conclusion that the proposed fungible tokens are not, this is a different embodiment than a true fungible token, but has the advantage that sophisticated investors can target specific risks, and achieve higher return on investment. The insurers, indemnitors, and guarantors may of course arbitrage these risks behind the scenes, and for example trade with each other to modify their own risk profile.

If, upon termination of a smart contract, there is a default, and the security interest must be liquidated, it is possible that an investment is required to extract the resource to fulfill the contract. In that case, an administrator, trustee, receiver, or the like (as specified by the smart contract and underlying agreements) assumes control over the resource. Because of the margin between the debt amount and the value of the commodity that may be extracted from or produced by the resource, it is likely that the estate can be managed to fulfill its responsibility. Indeed, there may be cases where the token-holders are advantaged (at least theoretically) as compared to those holding tokens from non-defaulting debtors.

Thus, a perverse incentive may occur where demand is high for the lowest "quality" tokens, due to an arbitrage opportunity at contract termination. For example, in a non-defaulting case, the debtor must acquire the previously issued tokens or deliver the substituted assets. Therefore, the market price for the tokens will be driven by the substitution paradigm, since holdouts and "lost" tokens will no doubt exist (unless the blockchain is not anonymous). The substitute collateral is generally the same commodity as produced by the resource (though this is not a theoretical constraint), allowing speculation on the value of that resource. On the other hand, in the defaulting case, the debtor presumably lacks the liquid assets to re-acquire the tokens at market price, and lacks the commodity to fulfill the substitution, leading to a possibility that the rational market price is above the substitution value, especially if the terms of default provide an advantage to the token-holder, such as an above-market interest rate for delayed payment. Further, because these defaulting tokens become "special", and the smart contract under which they are issued will not be renewed, the expiring tokens may be subject to increased demand, and thus higher prices.

This is not to say that the system is design to include perverse incentives which drive objectively antisocial behavior and seeming irrational results. Rather, the terms of the smart contract may be designed to correct for aberrant conditions, and to ensure that token holders are assured of the asset backing under all of the various conditions, leading to a lower risk discount and reduced correlation of risks between the tokens themselves and external market-specific conditions. Thus, the tokens become available for cross-border transactions, use in unstable economies, during fiat currency contractions, and especially in transactions loosely linked to the commodity which secures the tokens. While the tokens may be initially issued in a private transaction, such as a financing of an acquisition of a mine, or expansion of a mine, they would become available for general transactions as an alternate to cryptocurrencies, and due to their characteristics designed to limit speculation-driven volatility, and artificial scarcity (i.e., scarcity due only to the fact that the tokens have limited liquidity and availability), the tokens become a good fit for use in consumer and business-to-business transactions.

The key advantage of the tokens over cash derives from their origination in an asset securitization transaction, which is designed to be more efficient, and yield lower discounts of net asset value to liquidity achieved, than traditional bank lending, and perhaps equity issuance. Thus, the generation of the tokens according to the present technology alleviates an artificial scarcity of fiat currencies, under traditional loan paradigms, thus unlocking vast amounts of wealth. Once unlocked, the tokens continue to represent an advantage over fiat currency in that they are readily exchangeable for fiat currency on an exchange or in a transaction, and are also backed by hard assets, a feature missing from fiat currencies.

Typically, the present technology may be implemented in compliance with banking, financial, and securities laws, and the use or advantages of the technology are not predicated on US tax avoidance, US currency transfer restriction evasion, etc. However, the exchange network is independent of the financial services oligopolies, such as The Clearing House (New York), credit card networks (Mastercard, Visa, Discover, American Express, etc.), etc., and therefore is free to compete by providing lower cost, better service(s), advantages, etc.

A particular advantage of the tokens according to the present technology over typical cryptocurrencies such as Bitcoin, is that because the investment is productive, According to another embodiment, the token system is tied to commodity-specific investment or speculation. For example, if a user seeks to invest in diamonds, gold, platinum, etc., he or she may acquire tokens having such characteristics. Typically, these would be tokens that have a high proportion of substituted assets in the form of the respective commodity, whose pricing is highly correlated with the commodity, and whose smart contract assures that significant deviation between the token price and the redemption price with respect to the underlying commodity are well aligned. Indeed, in such a scenario, short or staggered terms of the smart contract may be desired, so that speculation on commodity pricing over time can be effectively managed. Further, in some cases, the token owner may be provided with a right of demand, for example, to acquire an amount of the underlying commodity in exchange for the token. This would have the effect of converging the token price with the demand value as the contract nears expiration, and also permits use of the tokens as a market hedge, while maintaining liquidity.

Another issue involves international currency and financing issues. For example, a non-US commodity miner seeks to finance production of gold outside the US. Typically, a security interest in real estate or a business is recorded in the jurisdiction in which the business is location, and is denominated in the currency of that jurisdiction. This imposes difficulties where a lender does not wish to incur currency risk for the particular jurisdiction, but is quite willing to incur the business risk inherent in the loan, if denominated in commodity value. Therefore, the present technology provides a means to secure the loan, which in theory does not violate currency export restrictions of the jurisdiction, since at contract termination, the commodity itself may be delivered. The loan, in the form of the tokens, then represents a derivative of the value of the commodity, at least when issued, and near expiration, especially in a non-renewable smart contract. For a renewable smart contract, the value of the tokens is largely limited unilaterally, in that if the tokens exceed the market value of the underlying commodity, there will be a large incentive for the borrower to substitute commodity for tokens, thus tying their values together. However, if the commodity value is less than the token value, the token will remain floating in value.

Because of the discount between the value of the secured assets and the amount of the security, the tokens have a fair market value over equity in the resource. Therefore, the tokens have another basis for valuation, and another possible value correlation. In the event that the company that manages the resource becomes illiquid and its business prospects dim, the tokens assume properties similar to that of a secured lender. The redemption at contract expiration, in this case, appears as a zero coupon bond. The option of renewal of the contract, if provided, may provide the token-holder with an ability to cash out, but in any case typically requires a new underwriting process that assures that the value of the security interest is discounted well below the amount outstanding.

Therefore, the particular rules and features of the smart contract will define future risks and rewards of the participants, and can vary over a broad range of parameters. For example, instead of emulating a zero coupon bond, the tokens may yield dividends or pay interest. If this is a direct payment, this incurs tracking and tax reporting that might result in difficulties. However, as built into a smart contract, the result may be a programmed increase in value of the tokens over time with respect to redemption value, right of substitution amount, or other time-dependent features which are predicted to drive the value of the tokens up over time toward the expiration.

The present technology therefore features an asset which is subject to a legally-enforceable security interest, to secure a debt, which may be denominated in currency or a value of a commodity. In exchange for a sum, a series of tokens are generated and issued. The tokens are subject to a contract which provides for a future redemption, at a value secured by the security interest. The contract itself may be a smart contract, which includes automatically implemented rules and features, which in some cases may be independent of sovereigns, and has aspects which are enforced independent of the parties and their agents. The tokens may be traded on an exchange which relies on a blockchain. The future redemption may provide different options, such as currency, commodities, renewal upon terms, or otherwise.

In a preferred embodiment, the security interest is in a gold mine, with a debt of less than 20% of the proven reserves of the claim, after a due diligence investigation of the value of the claim and its productive capability, such that extraction of gold sufficient to redeem the tokens is commercially feasible without exceeding the value of the secured assets. The term may be 10 years, with a right of substitution at par value at any time over the term. At expiration, the borrower must reclaim all of the tokens, or substitute security in the form of a pre-specified amount of gold. However, upon redemption of any token, the borrower may reissue the debt as a new token, subject to a new smart contract. A term of the smart contract permits a token-holder with an outstanding token to automatically exchange tokens for replacement tokens, thus leaving pending transactions and markets uninterrupted.

The issued tokens are available for various transactions, similar to other known cryptocurrencies, and are traded on exchanges with respect to different currencies, tokens, or commodities, or between individuals on a secure digital ledger, which may be a blockchain.

The right of redemption may permit substitution of other tokens, having distinct security, which meet system-wide criteria, and therefore the tokens become fungible. However, each debtor remains responsible at contract termination to fulfill its obligations, or the security interest may be foreclosed. When the process is aggregated for a number of borrowers, the management of redemption, substitution, and foreclosures becomes a normal business activity, and therefore can be managed accordingly. Further, the aggregation leads to greater liquidity, reduced search cost and individual risk speculation, and more orderly markets. Further, from the perspective of a token-holder, default risks are also aggregated, and therefore have lower volatility.

In some cases, the value of resource subject to the security interest is far in excess of the value of the debt, and respective tokens. One option is, rather than issuing all tokens having the same value, a set of tranches of tokens, which represent priority of liquidation in event of default. This has the effect of creating tokens with greater and lesser degrees of correlation with the underlying business involved in the secured resource. The tranches may also have other differences. Thus, it is possible to create derivatives which largely isolate different risks, and thus satisfy different investment objectives.

In some cases, the security is not in real estate, mines or leases per se, but may be with respect to in-process inventory. For example, mined, unrefined ore may be subject to the monetization transaction, with the redemption based on a fraction of the metal or mineral contained in the ore. Therefore, the technology may be used for short term business financing. As the ore is processed, if the tokens are not redeemed, the miner may replace the ore to maintain the pool or secured assets.

As discussed above, the smart contract may be insured. This permits an insurer, such as an insurance company, to assume various risks independent of the token values, and may therefore arbitrage the market value of the tokens with respect to the implied insurance risk. This therefore incentivizes the insurer to act as a market-maker with respect to the tokens under various circumstances, assuring liquidity and orderly markets for the tokens. Even if the smart contract does not require a captive sinking fund, an insurer may require this as a term of the contract. The use of insurance is one way to make different tokens fungible; if tokens having various underlying distinctions are insured to have the same risks (e.g., a common guaranty by the same insurance company), then the markets may treat these as being of the same type. This can be reinforced if the right of substitution includes alternate tokens (though this will generally sink the market value to the lowest valued token, which may be undesirable from an efficiency standpoint).

The blockchain employed is preferably the Symbiont system, which is a permission-based blockchain. See, symbiont.io/technology/.

By applying the power of a distributed ledger and smart contracts, the present invention can offer commodity asset owners a method to attain liquidity from their pre-commodity assets by digitizing those assets, and providing a new liquid asset representing a liquid derivative of the pre-commodity assets. These new liquid assets are derived from a fractional representation of the commodity assets. Commodity asset owners who desire liquidity can use this fractional representation (the new liquid asset) for alternative financing. This method will considerably speed up the process of gaining liquidity while allowing the asset owner to avoid ongoing financing charges.

The digitization of commodity assets allows for the entry of previously excluded asset classes inti the existing securitization marketplace. The problem was previously addressed through a traditional and less efficient securitization market. In the current marketplace, a pre-commodity asset owner can go to a lender and securitize the pre-commodity assets thereby gaining liquidity. The problem with the current model is that it is painfully long and expensive due to the deep discounting of the value of the pre-commodity assets as well as ongoing interest charges due to the business model to the lender.

The previously available solution was not fully satisfactory because it required ongoing finance charges as well as steeper discounting of the underlying assets. The known solutions require that there be a one-to-one relationship between the commodity asset holder and the lender. Because of this, the commodity asset holder is typically restricted in how to use the borrowed funds. The funds received were simply cash in the bank and not further available for securitization or other advanced financing techniques including the ability to sell to and/or repurchase from third parties.

These, and other objects and advantages of the present invention are achieved in accordance with the preset invention by the method according to the invention. In one preferred embodiment, the method is for creating precious metal backed token assets, secured by unrefined precious metal reserves, utilizing blockchain and/or distributed ledger technology. It is of course understood that other unrefined or pre-commodity reserves can be digitized in accordance with the present invention. Typically, if the assets achieve commodity status, there are existing markets that can be employed; however, such assets are not excluded by the present technology.

Similarly, non-commodity assets may also be securitized, with a slightly different security predicate. For example, an income-producing real estate investment trust can be monetized according to the present technology. In terms of substitution or replacement, the options include, for example, real estate interest substitution, heterogeneous asset or commodity type substitution, cash substitution, or other security.

In accordance with one preferred embodiment of the present invention, the digitization of illiquid pre-commodity assets creates a liquid asset, utilizing smart contracts and distributed ledger technology. The commodity asset holder is required to pledge the assets into a collateral pool for digitization and representation on the distributed ledger. Once recorded on the distributed ledger as inventory, the collateral will be used to digitize a fractional representation of the commodity assets.

Digitization occurs on the ledger via a smart contract. The smart contract contains all the necessary parameters needed to digitize including (but not limited to) the commodity asset description, the owner, the quantity, the location and the appropriate risk adjusted discount for the commodity asset and the title for the duration of the smart contract. The terms of digitization embedded in the smart contract allow for the allocation of the fractional representation of the commodity asset to the commodity asset owner. Also, embedded in the terms of the smart contract, is a maturity date which triggers the release of any pledged collateral back to the commodity asset owner while simultaneously requiring the return of the original fractional representation to the collateral pool. The commodity asset owner has control of the now liquid fractional representation created from the collateral. Of course, other encumbrances or side-deals may take place, represented in smart contracts or otherwise.

It is therefore an object to provide a token, representing an interest in a smart contract, the smart contract representing an agreement, secured by a security interest in the real property or a right in real property, to return the token within a predetermined period.

It is a further object to provide a method of defining a token, comprising: defining a smart contract, representing an agreement, secured by a security interest real property or a right in real property, to return the token within a predetermined period; pledging the real property or a right in real property to secure the security interest in the smart contract; and issuing the token. The method may further comprise returning the token, and releasing the real property or a right in real property from the security interest. The smart contract may be implemented in conjunction with a distribute ledger. The method may further comprise exercising a contingent property interest, e.g., the security interest, in the real property or a right in real property, after the predetermined period if the token is not returned.

The token may represent a fractional interest in the real property or a right in real property.

The smart contract may be implemented in conjunction with a distribute ledger.

The predetermined period may be tolled if a substitute asset is tendered.

The real property or a right in real property may comprise a mine having proven available reserves of the substitute asset. The substitute asset may be gold. The proven available reserves may be a predetermined multiple of the substitute asset.

The token may be generated as a transaction of a cryptographically-authenticated, distributed ledger comprising a database held and updated independently by each of a plurality of distributed elements, forming a consensus determination of transaction validity.

The agreement, secured by a security interest in the real property or the right in real property, may be terminated if the token is returned within the predetermined period, else a contingent property interest, e.g., the security interest, in the real property or a right in real property, may be exercised.

It is a further object to provide a method for creating a liquid token representation from an illiquid asset comprising: receiving a pledge of an illiquid asset; and digitizing the illiquid asset into fractional representations using a smart contract on a distributed ledger network, the fractional representations being secured by the pledge of the illiquid asset as collateral. The method may further comprise trading a fractional representation on an exchange, recorded in a distributed ledger network. The smart contract may comprise an illiquid asset description, an illiquid asset owner, a quantity, and at least one redemption rule. The at least one redemption rule may comprise a maturity date which triggers a release of the pledged illiquid asset as collateral back to the illiquid asset owner in exchange for return of all of the original fractional representations. The illiquid asset may comprise ore of a precious metal. The precious metal may be gold.

It is a still further object to provide a distributed ledger comprising terms of at least one smart contract representing an agreement which imposes a security interest in real property rights, comprising a term which authorizes creation of a token subject to the security interest, and subsequently deactivates the token and releases the security interest upon fulfillment of the smart contract terms.

It is another object to provide a computational node of a distributed communication network, configured to execute a portion of a distributed ledger comprising at least one smart contract representing an agreement which imposes a security interest in real property rights, comprising a contract term which authorizes creation of a token subject to the security interest, and subsequently deactivates the token and releases the security interest upon fulfillment of the smart contract terms.

The smart contract may comprise at least one term which imposes a predetermined period during which the terms must be fulfilled. The smart contract may comprise at least one term which provides a right to substitution to toll a foreclosure of the security interest. The distributed ledger may be provided in combination with computational nodes of a distributed communication network, configured to authenticate transactions involving the token, and automatically execute the terms of the smart contract, without centralized control.

It is a further object to provide a token system, employing a token representing an interest in a smart contract, comprising: a distributed ledger, storing parameters of a smart contract, the smart contract representing an agreement, secured by a security interest in property, to execute the security interest unless a token is returned within a period; a communication port configured to interface with an automated communication network for communications between a plurality of cryptographic hardware processors; and an automated distributed virtual state machine, hosted by the plurality of cryptographic hardware processors, employing a distributed consensus model for transaction validation, the automated distributed virtual state machine being configured to: communicate distributed consensus messages through the automated communication network; communicate the token; and execute the smart contract defined by the parameters, receiving inputs and producing outputs on a blockchain; communicate an immutable message for exercise of the security interest.

The automated distributed state machine may comprise an Ethereum virtual code machine. The automated distributed virtual state machine may charge a transaction fee for execution of the smart contract.

The agreement represented by the executable smart contract may further permit tolling of the period dependent on whether a substitute asset is tendered. The property may comprises a physical mine having proven available reserves of the substitute asset. Tthe proven available reserves may be a predetermined multiple of the substitute asset.

The token may represent a fractional interest in the property, wherein the token is fungible.

The token may be generated as a transaction of the automated distributed virtual state machine.

The blockchain may comprise a transaction list and a state of the smart contract.

The distributed virtual state machine may be Turing complete, and the executable smart contract may have a predefined maximum number of executable instructions.

It is a further object to provide a token transaction method, comprising: defining an executable smart contract, representing an agreement to return a token within a period, secured by a security interest in property, the executable smart contract being executed on an automated distributed virtual state machine, having inputs from and outputs to a blockchain on a distributed ledger; issuing the token and recording issuance of the token by the on the blockchain; controlling the automated distributed state machine in accordance with the executable smart contract to execute the security interest if the token is not tendered within the period; and communicating with an automated communication network between a plurality of cryptographic hardware processors, at least a portion of the blockchain, distributed consensus messages, the token.

The method may further comprise returning the token, and extinguishing the security interest.

The executable smart contract may be executed contingent on payment of a transaction fee.

The period may be extended if a substitute asset is tendered.

The property may comprise a mine having proven available reserves of the substitute asset, and wherein the proven available reserves may be a predetermined multiple of the substitute asset.

The token may be generated as a transaction recorded on the blockchain, and the blockchain may comprise a cryptographically-authenticated, distributed ledger held and updated independently by each of the plurality of cryptographic hardware processors, wherein the method further comprise forming a consensus determination of transaction validity.

The method may further comprise allocating the property in accordance with the security interest if the token is not returned within the period.

It is a still further object to provide a method for creating a token, comprising: receiving a pledge of an asset from an originator; tokenizing the asset as a fractional security interest in the asset, subject to a smart contract executing on a distributed virtual machine on a distributed ledger, the security interest being associated with an agreement which requires compensation by a portion of a production of the asset after a latency, and if the latency expires without the payment made, a token holder has a right to execute on the security interest to operate the asset to produce the portion; issuing the token to a token holder; and automatically monitoring, with the smart contract, whether the token remains outstanding and whether the payment has been made, wherein the smart contract executing on a distributed virtual machine on a distributed ledger is configured to record a message on the distributed ledger representing an authorization to execute on the security interest.

The method may further comprise delaying expiration of the latency by the smart contract and increasing the portion of the production of the asset required as compensation, wherein the smart contract automatically calculates the increase in the portion as a function of time.

The smart contract may be configured to withhold execution of the security interest if the compensation is tendered to the token holder.

The smart contract may execute to determine a precent value (or original issue discount) based on a set of financial parameters, and define an economic value in dependence on the execution.

These and other features of the present invention will become apparent from the drawings and the following detailed description.

DETAILED DESCRIPTION OF THE PREFERRED EMBODIMENTS

Example 1

Figure 1:
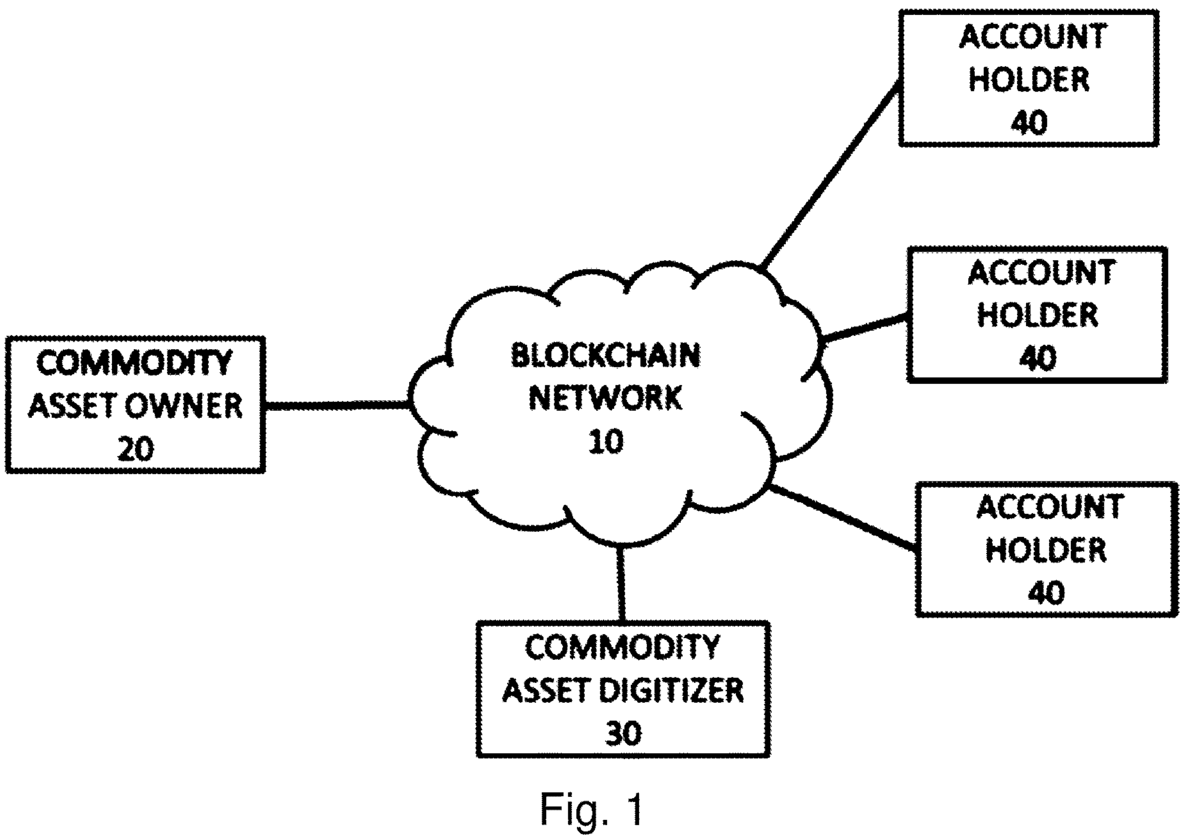
FIG. 1 is a block diagram of the distributed ledger (blockchain) Network used by a method according to the present invention.

FIG. 1 shows a block diagram of the network utilized in accordance with the method of the present invention. At the heart of the system is a distributed ledger (e.g., transaction chain or blockchain) network 10 preferably implemented on the Internet and providing a distributed ledger, which is immutable. The network may use public key/private key cryptography to ensure identification integrity and other algorithms to insure trust before a block of at least one transaction is added to the distributed ledger. The network can be implemented on any platforms that permit the running of smart contracts, such as the Hyperledger blockchain, Symbiont.io or the Ethereum blockchain.

Connected to the network 10 is a commodity asset owner 20 who is interested in pledging illiquid assets, such as unrefined gold that is still in the ground, to 3 create a liquid asset. Also connected to the network 10 is a digitizer party 30 who agrees to take the pledge of the illiquid assets subject to terms enforced in smart contracts running on the network 10, and digitize the asset into fractional representation that can be sold to account holders 40. For example, if the commodity asset was unrefined gold for which the owner can demonstrate that there is a proven gold reserve, the digitizer will provide 1 fractional representation (e.g., an Orebit.au) token for a defined amount of Reserves of gold. The assets will be pledged for 10 years, after which the asset owner must replace the entire reserve that was fractionalized.

The token can be sold to account holders on the network and each transaction is recorded immutably in a block on the distributed ledger to establish unquestionable ownership rights. The smart contracts, which are computer programs designed to operate on the distributed ledger network and carry out the terms of the method, automate the process and eliminate the need for human intervention in many steps.

Figure 2:
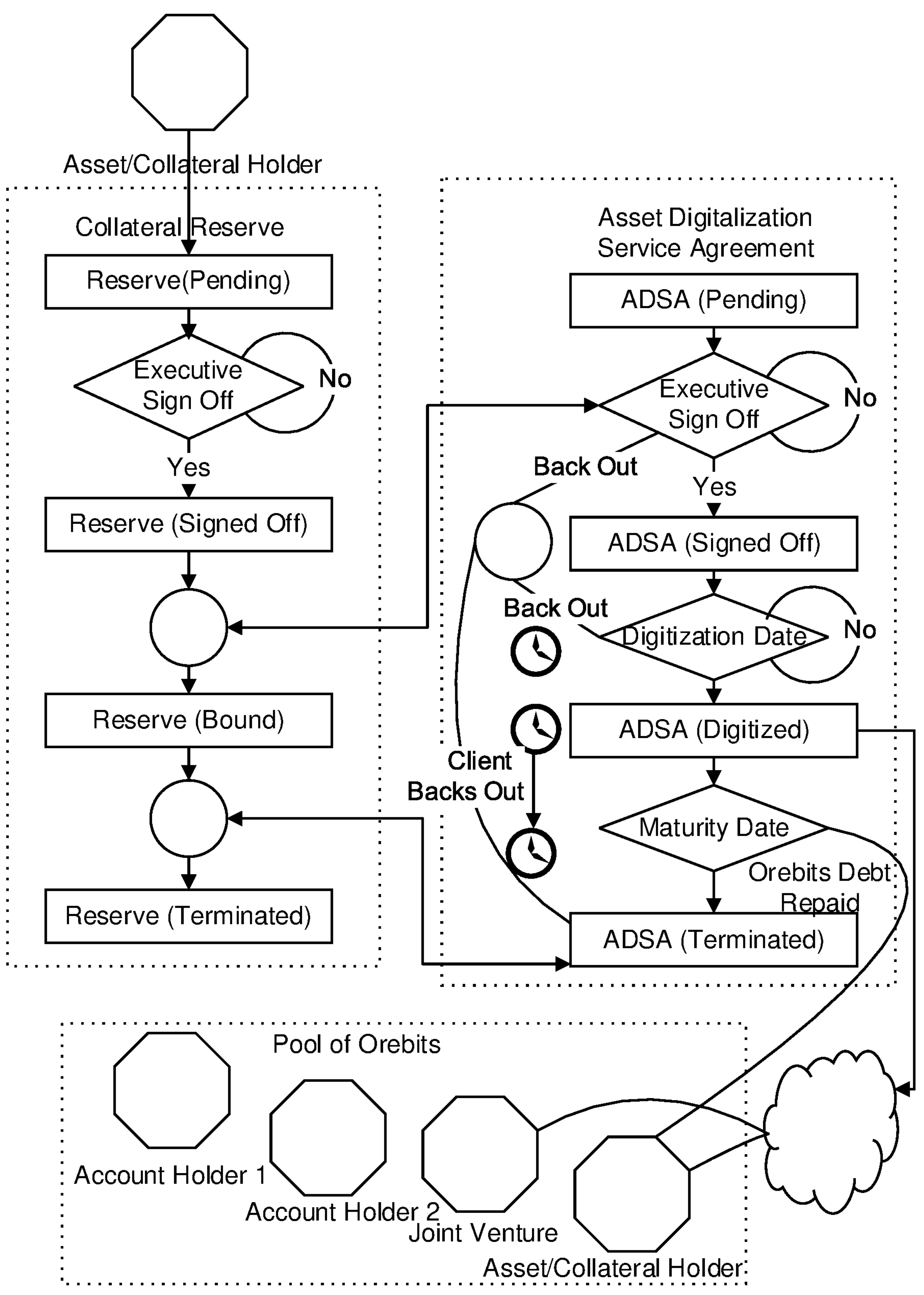
FIG. 2 is a flowchart of a first embodiment of the method according to the present invention.

FIG. 2 is a flowchart of one embodiment of the method according to the invention. According to the method of FIG. 2:

A reserve is created by the asset holder. A first Smart Contract creates the inventory of the total amount of reserves being placed in the pool by the asset holder for digitization.

The diamond indicates that an executive must sign off on the reserve once it is created before it can go to the "Signed Off" state. If there is no sign off, the system waits for the proper approval.

If the reserve has been approved (signed off), it is now ready to be digitized by the digitizer party using a smart contract process.

In order for the digitization to occur, the digitizer runs a second smart contract which is called an 'ADSA' (Asset Digitization Service Agreement) which is shown in a flow diagram in the second column. This contract knows the haircut (discount) and also is where the digitizer party puts in the maturity date, the digitization date and when digitized, creates the tokens. This is also where the digitizer associates the ADSA to a reserve and the number of tokens created for a particular reserve can be seen.

The created ADSA now waits for executive sign off similar to the reserve to create an object.

Once the digitization date is reached the reserve is bound, the ADSA is marked digitized and the tokens are created. FIG. 2 illustrates that until the digitization date comes and digitization occurs, the asset holder can still back out. However, if the digitization occurs, there is no backing out.

The ADSA now distributes the tokens created to the asset holder, and also deducts relevant on-ledger fees which are paid to both the network operator and the digitizer party.

The 10-year period now begins and after the maturity date, everything underneath happens at termination, i.e., the debt is repaid, the tokens are destroyed (e.g., redeemed and/or retired), the ADSA is terminated and the Reserve is terminated as long as there are no associated ADSA's.

Specifically, on termination the ADSA will look at the asset holder's account and sweep the tokens (exactly the number that was digitized) back for inactivation so that the lien can be lifted off the reserve. The inactivation, redemption, or retirement of a token is a transaction on the distributed ledger that labels the tokens with an updated status, to alert future buyers of that status, which would normally render them valueless, and thus block future transactions. (Note that, according to existing non-asset backed cryptocurrencies, the lack of asset backing does not preclude use, so technically, the transition from asset-backed to non-asset backed does not require that no party attribute value to the redeemed tokens.)

If for some reason the number of tokens in the asset holder's account are less than the original amount created the process goes into a default scenario. In event of a default, the legal process of foreclosure on the secured assets proceeds, and this provides security for the token-holders. Since the amount of feasible asset recovery exceeds the redemption value of the tokens, it is most probable that all token holders will be made whole, and indeed, the default process may make outstanding tokens more valuable than those that are redeemed in the normal course.

As a result of the method of the present invention, fungible liquidity is obtainable from commodity assets in various states of extraction or non-extraction and refinement. The method can create liquidity from pre-refined, combined and disparate commodity assets for each of those disparate commodity assets.

Example 2

System Architecture

It is a challenge for typical investors to get exposure to unrefined assets while, at the same time, owners of such assets often struggle to access liquidity. Asset digitization can provide investors with exposure to illiquid assets in a form that can be easily registered, traded and transferred. It also provides owners of illiquid physical assets with an opportunity to access new sources of liquidity. A distributed ledger technology platform is ideal for asset digitization because it provides an immutable record of the origination and provenance of digitized assets as well as a tamper-proof repository for all documentation supporting a given origination.

Tokens created according to the present paradigm are fundamentally different from most blockchain or distributed ledger offerings. Two core differences are that they are a cryptoasset, and not a cryptocurrency loosely backed by a hard asset, and directly represent the hard asset which is available as security for the set of transactions. The tokens are not decoupled from central management or rules of law. The platform is de-centralized from a resiliency and technological perspective but it is centrally managed by a service company. Unlike cryptocurrencies, such as Bitcoin or Ethereum, which are not centrally governed, it does not make sense to decouple a hard asset, which is subject to rules and regulations nor would you want to. Therefore, the divergence on this issue is both fundamental and philosophical. Since the linkage to a hard asset affords contingent property rights, the ability to operate with and within law is important. The same rules and regulations that protect the hard asset, i.e., preventing someone from usurping ownership of mineral rights, will protect any investment in the tokens, or the underlying smart contract. The tokens are subject to rule of law, and can and will be transferred in accordance with court rulings.

The hard asset backing the tokens may be, for example, proven reserves of unrefined gold. Primarily this will be in the form of in situ gold deposits but could include gold assets in interim stages of the refining process including head ore, concentrate, miner bars, and doré. The tokens represent a single mineral or commodity, and tokens tied to different security types will generally not be fungible among asset types. However, it is possible to define diversified pools, which consistently represent a plurality of asset types in predetermined ratios. Each token is fungible so a token from one source is equivalent and interchangeable to a corresponding token from another source without the need to trace its provenance. However, the provenance of each and every token is traceable within the pool and documented. The history of every transaction is stored in an immutable and tamper-proof ledger along with all supporting documentation.

Previously there was no platform for lending against unrefined proven reserves of gold. With this model, a secure auditable platform enables these transactions.

To validate the mineral deposits of any reserve or claim, one can use the "Canadian Institute of Mining" (CIM), National Instrument 43-101 (NI 43-101) guidelines for reporting. The NI 43-101, although Canadian based, is commonly used throughout North America, and even internationally. Although it is common to North America, the CIM/NI 43-101 reporting guidelines adhere to the "Committee for Mineral Reserves International Reporting Standards" (CRIRSCO). In the future, other CRIRSCO member guidelines may be used, including but not limited to the Australian "Joint Ore Reserves Committee" (JORC) reports. Each NI 43-101 report is conducted by an independent "qualified person(s)". At a minimum, the qualified person must be an experienced and accredited engineer or geoscientist with experience relevant to the subject matter of the mineral project (NI 43-101, 2011, p. 4). This report may be commissioned by the claim or reserve holder, but it is not carried out by the holder.

In order to understand the NI 43-101 report, the following definitions are required:

A Mineral Resource is a concentration or occurrence of solid material of economic interest in or on the Earth's crust in such form, grade or quality and quantity that there are reasonable prospects for eventual economic extraction.

The location, quantity, grade or quality, continuity and other geological characteristics of a Mineral Resource are known, estimated or interpreted from specific geological evidence and knowledge, including sampling.

Mineral Resources are sub-divided, in order of increasing geological confidence, into Inferred, Indicated and Measured categories. An Inferred Mineral Resource has a lower level of confidence than that applied to an Indicated Mineral Resource. An Indicated Mineral Resource has a higher level of confidence than an Inferred Mineral Resource but has a lower level of confidence than a Measured Mineral Resource.

The full report goes into greater detail on each Mineral Resource classification, however we are mainly concerned with minerals with the highest degree of confidence and those which can be converted into proven reserves. The following is a definition of a measured mineral resource:

A Measured Mineral Resource is that part of a Mineral Resource for which quantity, grade or quality, densities, shape, and physical characteristics are estimated with confidence sufficient to allow the application of Modifying Factors to support detailed mine planning and final evaluation of the economic viability of the deposit. Geological evidence is derived from detailed and reliable exploration, sampling and testing and is sufficient to confirm geological and grade or quality continuity between points of observation. A Measured Mineral Resource has a higher level of confidence than that applying to either an Indicated Mineral Resource or an Inferred Mineral Resource. It may be converted to a Proven Mineral Reserve or to a Probable Mineral Reserve. (CIM Definitions, 2014)

Measured Mineral Resources offer the highest level of confidence such that there is sufficient sampling and testing to confirm grade or quality between points of observation. However, to be accepted by the present system, the analysis must also ensure the economic feasibility of the deposit. The presence of gold is insufficient if it is in such low concentration that extraction is not economical, or if there are legal or environmental restrictions. The NI 43-101 also takes this into account as well as defined by "Mineral Reserves":

A Mineral Reserve is the economically mineable part of a Measured and/or Indicated Mineral Resource. It includes diluting materials and allowances for losses, which may occur when the material is mined or extracted and is defined by studies at Pre-Feasibility or Feasibility level as appropriate that include application of Modifying Factors. Such studies demonstrate that, at the time of reporting, extraction could reasonably be justified. The reference point at which Mineral Reserves are defined, usually the point where the ore is delivered to the processing plant, must be stated. It is important that, in all situations where the reference point is different, such as for a saleable product, a clarifying statement is included to ensure that the reader is fully informed as to what is being reported. The public disclosure of a Mineral Reserve must be demonstrated by a Pre-Feasibility Study or Feasibility Study. (CIM Definitions, 2014)

It is important to understand that the Modifying Factors are not limited in scope to just the economics of the extraction process:

Modifying Factors are considerations used to convert Mineral Resources to Mineral Reserves. These include, but are not restricted to, mining, processing, metallurgical, infrastructure, economic, marketing, legal, environmental, social and governmental factors. (CIM Definitions, 2014)

Once Modifying Factors are applied to the technical reports on the Mineral Resource Estimates a new category of Mineral Reserves are generated including Proven Mineral Reserves:

A Proven Mineral Reserve is the economically mineable part of a Measured Mineral Resource. A Proven Mineral Reserve implies a high degree of confidence in the Modifying Factors. Application of the Proven Mineral Reserve category implies that the Qualified Person has the highest degree of confidence in the estimate with the consequent expectation in the minds of the readers of the report. The term should be restricted to that part of the deposit where production planning is taking place and for which any variation in the estimate would not significantly affect the potential economic viability of the deposit. Proven Mineral Reserve estimates must be demonstrated to be economic, at the time of reporting, by at least a Pre-Feasibility Study. Within the CIM Definition standards the term Proved Mineral Reserve is an equivalent term to a Proven Mineral Reserve. (CIM Definitions, 2014)

Figure 3:
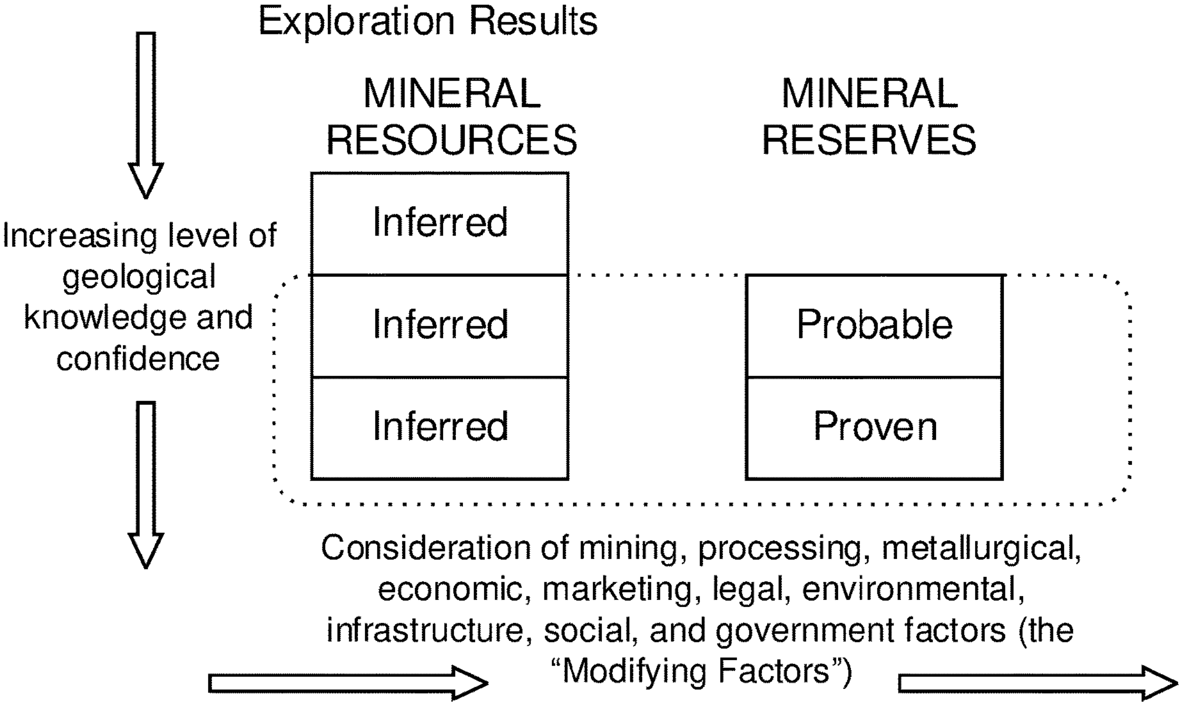
FIG. 3 shows a flow diagram of underlying asset verification and valuation.

FIG. 3 illustrates the relationship between the confidence of testing and samples versus Modifying factors.

Once a claim with an NI 43-101 has been reviewed and the Proven Reserves of gold have been validated, the value of the collateral, for all intents and purposes, is pegged at 1:5. For every 5 troy ounces of Proven Reserves of gold, exactly one token is issued. Ultimately, there is no definitive way to determine the value of the entire pledged claim, however, even by CRIRSCO reporting guidelines there is at least 5 times as much feasibly extractable gold. There are also Indicated Resources, there are also Inferred Resources and it is likely there are accompanying metals such as copper, molybdenum, silver and others that may or may not also have extractable value.

It is important to note that the pool is not purchasing the claims or the owner of the derived assets, it is only a pool for managing the title. The title to a claim is fully pledged to pool for the life of the loan and is to be returned to the claim holder once the loan has been repaid at Maturity. The asset represented in the form of a token are held by the account holder on initial digitization. The account holder may then use the platform to exchange tokens to another account holder. That account holder may then transfer tokens to another account holder, who may or may not be the original claim holder. The nature of the agreement, and the exchange of any non-token assets including but not limited to currency, stock or hard assets is between the two parties.

The services provided to run the pool include: the review and processing of Asset Digitization Service Agreement applications for perspective claim holders; the digitization of claims into smart certificates known as the token; the smart contracts to manage the lifecycle of the Asset Digitization Service Agreement; providing a secure platform to facilitate the trading of token; to provide an immutable and auditable history of transactions and documents including but not limited to claim titles. The services do not typically hold the derived value of assets; set the value of token; negotiate the terms of any loans or transactions; facilitate the transaction of assets other than token; or arbitrate agreements.

The business logic for the pool is codified within immutable Smart Contracts. The Smart Contracts ensure the agreed upon rules are correctly adhered to for the lifecycle of the ADSA. There are (2) primary Smart Contract types: ADSA: which represent the Asset Digitization Service Agreement; and Reserve: which represent the titled asset, typically a claim. The Smart Contracts allow for optional extensions. One such example is that presently only gold can be digitized. However, a claim is a defined section of land with Mineral Resources and is not limited to a particular mineral type. Therefore, other asset types may also be digitized, and those assets will be bound to the same Reserve object. If the digitization start and end periods of different asset types within a Reserve are not aligned, freeing up the title of a claim prematurely would cause ownership issues. Therefore, the Reserve is a separate object and is bound until the last ADSA is terminated.

The Reserve object or Smart Contract represents the titled claim and has the following attributes: "approved_timestamp"; "approver_id"; "country"; "created_timestamp"; "creator_id"; "documents"; "geolocation"; "internal_reserve_id"; "last_modified_timestamp"; "last_modifier_id"; "owner_id"; "proven_reserves"; "ready"; "reserve_description"; "reserve_id"; "reserve_type"; "signed_date"; "state"; "status"; "terminated_timestamp"; "terminator_id".

The ADSA object or Smart Contract represents the fungible asset and has the following attributes: "approved_timestamp"; "approver_id"; "country"; "created_timestamp"; "creator_id"; "documents"; "internal_reserve_id"; "last_modified_timestamp"; "last_modifier_id"; "owner_id"; "proven_reserves"; "asset_type"; "tokens"; "quantity"; "ready"; "reserve_description"; "reserve_id"; "reserve_type"; "signed_date"; "state"; "status"; "terminated_timestamp"; "terminator_id".

The Substitution objects or Smart Contracts represent the Reserve and ADSA equivalent except for Refined Gold. The only difference is the reserve_type for Reserve is substitution and the resulting ADSA quantity is digitized at a 1:1 ratio instead of the standard 1:5.

Figure 4:
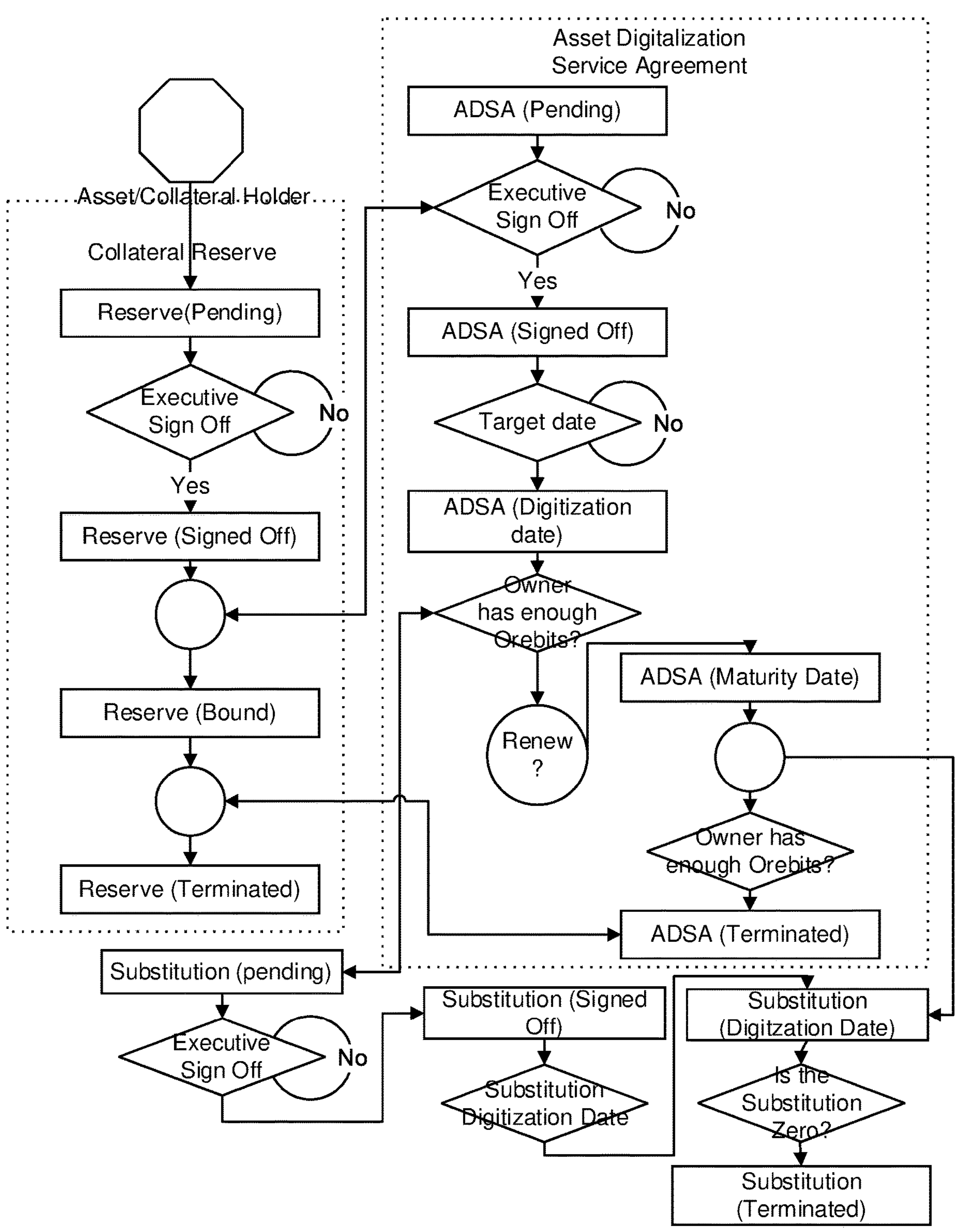
FIG. 4 is a flowchart of a second embodiment of the method according to the present invention.

The flow chart in FIG. 4 traces a simplified Reserve/ADSA lifecycle through the various states. The reserve status may be: Pending, Signed Off, Bound, Terminated ADSA status: Pending, Signed Off, Digitized, Terminated. According to FIG. 4:

1. Asset/Collateral Holder initiates a claim for review; Reserve (Pending).
2. The Reserve title is clear; Reserve (Signed Off).
3. The ADSA is submitted for review; ADSA (Pending).
4. The ADSA passes review; ADSA (Signed Off).
5. The Digitization date is set for the future; Reserve (Signed Off)/ADSA (Signed Off).
6. The Digitization date arrives and token are digitized; Reserve (Bound)/ADSA (Digitized).
7. The claim title is fully pledged to the pool.
8. The token are deposited into the Asset/Collateral Holder's account.
9. The Asset/Collateral Holder may transfer token to other accounts.
10. The Maturity date arrives and the original amount of digitized token are removed from the account; ADSA (Terminated)/Reserve (Terminated)
11. The claim title is returned.
12. The token are retired from the system.

It is possible to renew an ADSA past the original Maturity date, as defined by the Smart Contract. In order to terminate an ADSA, the Asset/Collateral Holder must acquire the original amount of tokens from the market to be retired. All of the tokens are accounted for on the system, but it is possible there may not be any for sale. To account for this anomaly an option exists for, and only for, ADSA owners who are approaching the maturity date, to pledge Refined Gold from a vault for the outstanding amount in a new Reserve. The original Reserve is terminated and the title to the claim is returned, however, there is a new obligation to recover sufficient tokens to release the pledged Refined Gold.

In the event there are insufficient tokens to cleanly terminate an ADSA on the Maturity date, the ADSA will default. Because the circumstances of each default are different and involve externalities, the Smart Contract principally flags the issue for remediation. However, to maintain the integrity of the platform, the only way to terminate an ADSA is to fully return the Digitized token.

There is no concept of a complete cycle. The smart contracts allow for any number of valid combinations. An Asset/Collateral Holder could Digitize an ADSA, renew, renew again, Digitize another ADSA, use the balance with the new claim to Terminate the original ADSA, default on the new ADSA, renew with penalties, pledge a substitution, Terminate the new ADSA, then repay the substitution at a later date, for example.

In its simplest form of the system uses distributed ledger technology (e.g., provided by Symbiont) to create a new digital asset class. While the term "blockchain" is the more widely recognized it is more technically correct to describe the platform of choice as a distributed ledger platform because transactions are appended one at a time rather than in "blocks". Indeed, in some cases, the technology may be implemented in blocks. Despite this minor distinction, the ledger retains the properties of traditional blockchains including replication, resiliency, immutability and enforced consistency. However, when implemented as a private ledger, many of challenges of the around privacy and performance of public distributed ledgers are inherently addressed.

The distributed ledger network may include trusted member nodes so the ledger is never publicly exposed. Alternate technologies employ cryptography that permit untrusted member nodes, which process the transactions in a verifiable and authenticated manner without access to the underlying data. Each member's data is encrypted and decrypted only by authorized members on the network. As a member, the pool leverages Smart Contracts which strictly enforce predetermined business rules. All activity is recorded on a tamper proof, append-only ledger along with times stamps and digital signatures. The pool preferably operates on a permissioned network negating the need for mining to enforce consensus. The distributed ledger preferably uses an implementation of a Byzantine Fault Tolerant algorithm (BFT-SMaRt, n.d.) that enforces consensus across the network. This approach provides resilience and performance orders of magnitude greater than mining, e.g., Bitcoin. All ledger data is encrypted and accessible only by authorized parties. When the pool queries the Smart Contracts, the encrypted data is read from the ledger, which only the pool member is able to decrypt. (In an alternate implementation, public verification is supported).

The news is full of stories where wallets have been compromised, cryptocurrency is stolen and there are few mechanisms to undo the damage. Private or permissioned based platforms mean everyone on the network or who has an account is a known entity who has passed a "Know Your Customer" (KYC) and AML. Compromising the system to benefit a particular account holder on a tamper-proof immutable ledger would be highly risky. In addition, since a service provider can administer the system, any transactions can be undone with complimentary transactions. This cannot be done in decentralized blockchains.

In addition to the data itself, the Smart Contract enforces business logic, which is also stored on the immutable ledger. Should a security hole, error or bug be identified in a Smart Contract, the distributed ledger platform may provide a straightforward mechanism for correcting it. Since all smart contract code is recorded as data on the immutable ledger, all parties have a record of both the error and the fix, and may employ legal recourse as necessary.

Along with financial data there it is possible to store various legal documentation data on the ledger as well. Examples include PDF documents, signed and scanned legal documents and stamped geological reports among others. Data, documents and business logic are all encapsulated on an immutable ledger for a completely secure and auditable solution.

The system is resilient and tolerant of failures. It can scale. Most importantly, it is a cryptographically-enforced, append only, immutable chain of all the history since inception. It is an ideal system for accountability and auditability. A permissioned distributed ledger adds no more attack vectors than the traditional stack while enabling full auditability in the event if they did happen. The present system may provide customized and modular APIs to securely interface with the platform.

Figure 5:
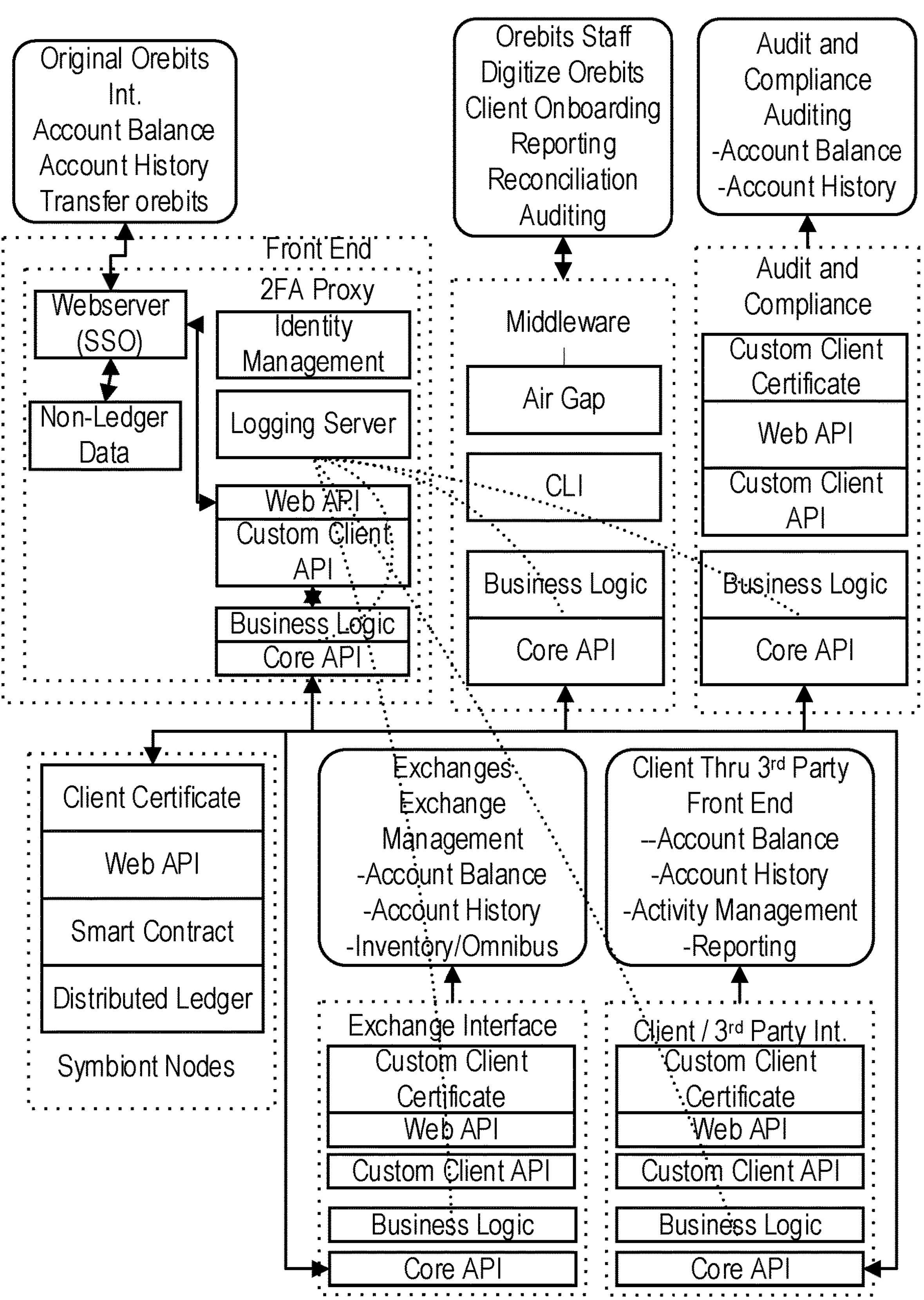
FIG. 5 is a flowchart of a proposed information flow according to the second embodiment of the invention.

A proposed information flow diagram is provided in FIG. 5.

REFERENCES

BFT-SMaRt. (n.d.). State Machine Replication for the Masses with BFT-SMART. www.di.fc.ul.pt/-bessani/publications/dsn14-bftsmart.pdf BusinessWire. (2017, March 15). Orebits & Symbiont Deploy Distributed Ledger Technology to Digitize Gold Ownership. www.businesswire.com/news/home/20170315005332/en/Orebits-Symbiont-Deploy-Distributed-Ledger-Technology-Digitize CIM. (n.d.). CIM. Canadian Institute of Mining, Metallurgy and Petroleum: cim.org/CIM Definitions. (2014, May 10). CIM Definition Standards for Mineral Resources and Mineral Reserves. www.cim.org/-/media/Files/PDF/Subsites/CIM_DEFINITION_STANDARDS_20142

NI 43-101. (2011, June 24). NI 43-101 Standards. Canadian Institute of Mining, Metallurgy and Petroleum: web.cim.org/standards/documents/Block484_Doc111.pdf

Example 3

Sovereign Financing

Financing a sovereign's deficit has become prominence for economic growth and stability, with the financial challenge, a sovereign is always in-need for a cash infusion.

Recently, sovereignty auspices are not enough to get finance at a prime rate. When a government is looking to add liquidity to the economy on a non-inflationary basis, it needs to look to foreign investment and trade to accomplish this.

Many governments have proven mineral reserves but to due to many reasons, these assets are not being utilized in any fashion. There is no mechanism to get the proven value of mineral reserves onto the central bank ledger to issue currency against these mineral reserves (e.g., gold) on a non-inflationary basis. The present technology permits a sovereign to finance and issue a debt obligation against a new asset class, such as a proven mineral reserve, which can be allocated in a way to provide leverage and a line of credit, without requiring extraction of the mineral, thus permitting preservation of the resource, with extraction only required in event of default.

Utilizing the Sovereign Government Proven Gold Mineral Reserve.

The sovereign government, in this case, assigns the proven reserves to an international mining corporation as part of a public-private partnership. This is a common practice where mining rights and the reserve ownership is given out under different systems depending on the company and record keeping of the reserves through the government department assigned these duties but generically they are referred to as mining claims.

To mitigate the political risk and logistical risk of adding any new territory, the new government also provides a government guarantee as for the value of the proven reserves and to further guarantee they will allow the mine to operate and export the product without hindrance. The goal is to bring the risk in-line with the existing ledger assets so all respective securities stay fungible.

The international mining corporation then takes this claim ownership and the sovereign guarantee information to a monetization entity, which "digitizes" the in-ground value through a smart contract.

The international mining corporation then has the fungible digital assets they can be put into a trust and securitized within international financial markets with an audited value.

Figure 6:
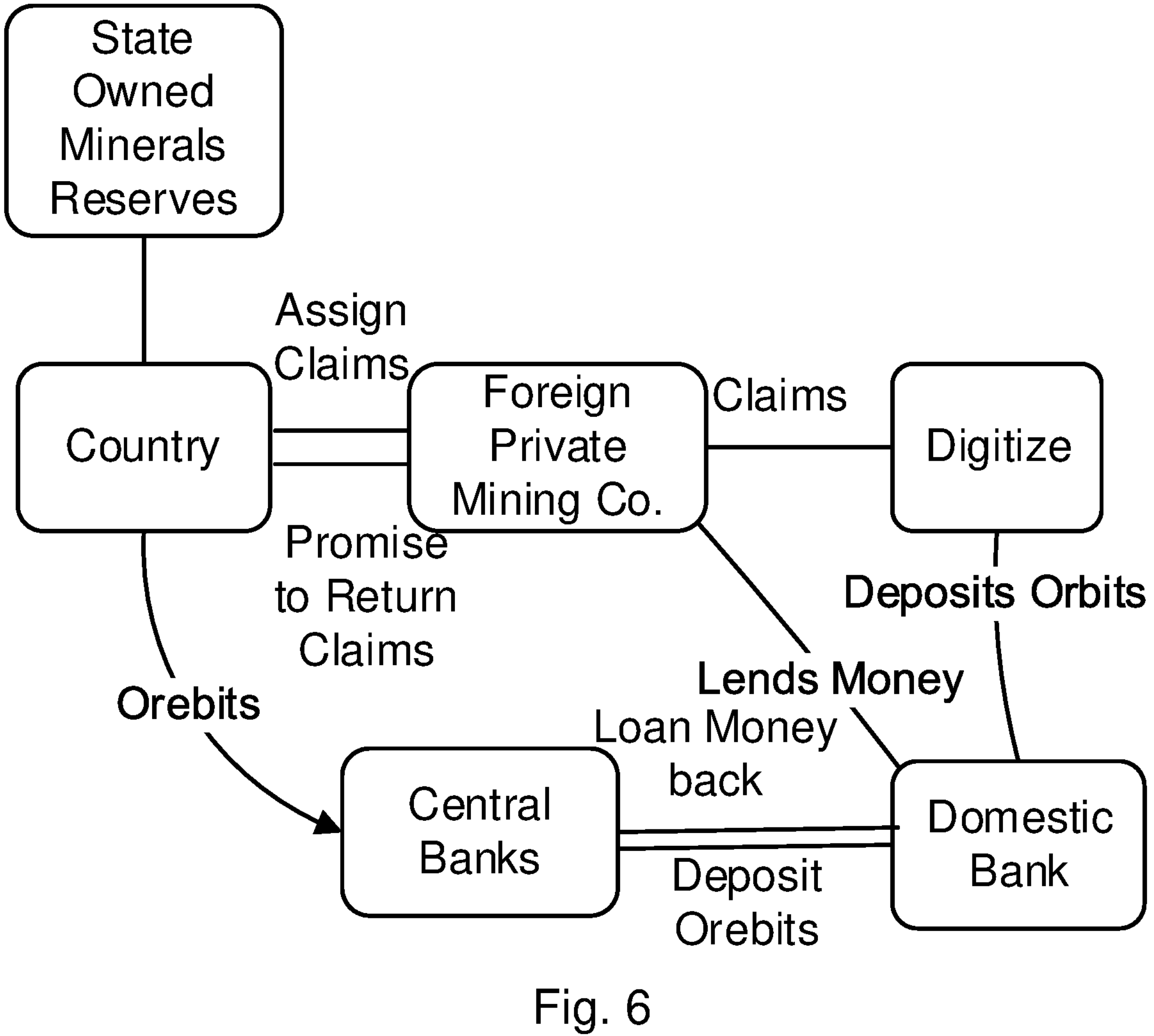
FIG. 6 is a state diagram of a sovereign-backed securitization model according to the present invention.

The international mining corporation can now pledge the digital assets in trust to a commercial bank (e.g., in the originating country). Utilizing normal bank protocols, the new asset can be pledged to the commercial bank, and the commercial bank can apply to the central bank for approval of the new crypto asset as well a pricing. The central bank can now create funds on a non-inflationary basis in the local economy including the finance activity to get the new mine into production. This scheme is represented in FIG. 6.

As discussed in U.S. Pat. No. 10,536,537, an oracle management service may be provided.

As discussed in U.S. Pat. No. 11,057,353, US 2020042989, US 20210256070, security interest may be recorded on a blockchain and managed by a smart contract.

The system may include communication interfaces, input interfaces and/or system circuitry. The system circuitry may include a processor or multiple processors. Alternatively or in addition, the system circuitry may include memory. The processor may be in communication with the memory. In some examples, the processor may also be in communication with additional elements, such as the communication interfaces, the input interfaces, and/or the user interface. Examples of the processor may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor may be one or more devices operable to execute logic. The logic may include computer executable instructions or computer code stored in the memory or in other memory that when executed by the processor, cause the processor to perform the operations the oracle management service, the master oracle, the participant node, and/or the system. The computer code may include instructions executable with the processor.

The processor is preferably a dedicated (special purpose) computational system that is not adapted for general purpose computing. The computational system is improved by the technology to permit specific asset secured transactions to be implemented using fungible, semi-fungible or non-fungible tokens, and in some cases to permit tokens to change fungibility after issuance.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive), solid-state drive or any other form of data storage device. The memory 820 may include at least one of the operations the oracle management service, the oracle index repository, the master oracle, the data index repository, the aggregation logic, the key management cache, the participant node, the blockchain, the smart contract and/or the system. Alternatively or in addition, the memory may include any other component or sub-component of the system described herein.

The user interface may include any interface for displaying graphical information. The system circuitry and/or the communications interface(s) may communicate signals or commands to the user interface that cause the user interface to display graphical information. Alternatively or in addition, the user interface may be remote to the system and the system circuitry and/or communication interface(s) may communicate instructions, such as HTML, to the user interface to cause the user interface to display, compile, and/or render information content. In some examples, the content displayed by the user interface may be interactive or responsive to user input. For example, the user interface may communicate signals, messages, and/or information back to the communications interface or system circuitry.

The system may be implemented in many different ways. In some examples, the system may be implemented with one or more logical components. For example, the logical components of the system may be hardware or a combination of hardware and software. The logical components may include the oracle management service, the oracle index repository, the master oracle, the data index repository, the aggregation logic, the key management cache, the participant node, the blockchain, the smart contract, and/or any component or subcomponent of the system. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory, for example, that comprises instructions executable with the processor or other processor to implement one or more of the features of the logical components. When any one of the logical components includes the portion of the memory that comprises instructions executable with the processor, the component may or may not include the processor. In some examples, each logical component may just be the portion of the memory or other physical memory that comprises instructions executable with the processor, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

Although the disclosure is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described example embodiments, and it will be understood by those skilled in the art that various changes and modifications to the previous descriptions may be made within the scope of the claims.

What is claimed is:

1. A cryptographic tokenization method of a productive asset, comprising:

collateralizing a property interest in the productive asset under a secured transaction with a security interest requiring payment of substitute collateral at the end of a term for outstanding interests in the secured transaction;

producing a plurality of tokens comprising cryptographic data structures on a distributed ledger system tracking a transfer of tokens, authenticating a current owner of tokens, and revealing inconsistent transfers of tokens;

the plurality of tokens being associated with a smart contract automatically executed by a distributed virtual machine instantiated across a plurality of network nodes that implements the security interest, each token representing a fractional share of the transaction, the smart contract having as inputs at least time, an ownership status of the plurality of tokens, and a substitute collateral status with respect to the plurality of tokens, and having as an output an immutable indicator recorded on the distributed ledger system that automatically triggers execution of the security interest to permit operation of the productive asset on behalf of outstanding token-holders to fulfill obligations of the secured transaction;

issuing the plurality of tokens on a market from an issuer;

transacting changes in ownership of the plurality of tokens on the market using the distributed ledger system; and automatically determining by the smart contract, upon expiration of the term, outstanding tokens from the issuer for which payment of the substitute collateral has not been made.

2. The cryptographic tokenization method of claim 1, wherein the smart contract further provides a condition for tolling of the expiration of the term.

3. The cryptographic tokenization method of claim 1, wherein the smart contract further monitors reacquisition of a token by the issuer.

4. The cryptographic tokenization method of claim 1, wherein the tokens are fungible tokens.

5. The cryptographic tokenization method of claim 1, wherein the tokens are semi-fungible tokens.

6. The cryptographic tokenization method of claim 1, wherein the productive asset is a mine, and the substitute collateral is a commodity extracted from the mine.

7. The cryptographic tokenization method of claim 1, wherein the collateralizing comprises appraising the productive capacity of the productive asset, and collateralizing the secured transaction with an amount of a product of the productive asset.

8. The cryptographic tokenization method of claim 1, wherein the payment of substitute collateral at the end of a term is in an amount dependent on time.

9. The cryptographic tokenization method of claim 1, further comprising reacquiring tokens on the market by the issuer to avoid payment of the substitute collateral.

10. The cryptographic tokenization method of claim 1, wherein the distributed virtual machine executes on a set of distributed nodes that support the distributed ledger system.

11. The cryptographic tokenization method of claim 1, wherein the terms of the smart contract are stored in the distributed ledger system.

12. The cryptographic tokenization method of claim 1, wherein a cost for execution of the smart contract is prepaid by the issuer.

13. The cryptographic tokenization method of claim 1, wherein a cost for execution of the smart contract is paid by a holder of an outstanding token.

14. The cryptographic tokenization method of claim 1, wherein the distributed ledger system is operated according to a distributed consensus model.

15. The cryptographic tokenization method of claim 1, wherein the smart contract further generates an immutable message in conjunction with the distributed ledger system for exercise of the security interest based on existence, upon expiration of the term, of outstanding tokens from the issuer for which payment of the substitute collateral has not been made.

16. The cryptographic tokenization method of claim 1, wherein the distributed ledger system comprises a blockchain.

17. A cryptographic tokenization method of a productive asset which produces a commodity, comprising:

collateralizing a property interest in the productive asset under a secured transaction with a security interest requiring delivery of substitute collateral representing an amount of the commodity at the expiration of a term for outstanding interests in the secured transaction;

producing a plurality of cryptographic tokens, each cryptographic token comprising a cryptographic data structure-representing a portion of the outstanding interests, represented on a blockchain system which tracks cryptographic token transfers and authenticates current cryptographic token ownership, wherein the blockchain system supports automatic execution of a distributed virtual machine instantiated across a plurality of network nodes that executes a smart contract that implements the security interest, the smart contract having as inputs at least time, current cryptographic token ownership, and substitute collateral status, and having as an output at least an immutable indicator recorded on the blockchain, the smart contract comprising instructions operating to determine a failure of satisfaction of terms of the secured transaction, and upon said determination, to authorize operation of the productive asset to fulfill obligations under the secured transaction;

transacting changes in ownership of the plurality of cryptographic tokens on a market using the blockchain; and automatically determining by the smart contract, a tolling contingency for expiration of the term, and a failure of delivery of the substitute collateral to an outstanding cryptographic token holder upon expiration of the term.

18. The cryptographic tokenization method of claim 17, wherein the plurality of cryptographic tokens are semi-fungible tokens representing fungible interests in the same productive asset, and wherein the substitute collateral is a commodity.

19. The cryptographic tokenization method of claim 1, wherein the payment of substitute collateral at the end of a term is in an amount dependent on time and an interest rate.

20. A cryptographic tokenization system, comprising:

a distributed ledger system comprising a plurality of nodes which together execute a fault tolerant distributed consensus system, which supports transactions in a market using tokens comprising cryptographic data structures, the distributed ledger system being configured to authenticate a current owner of a token, block an inconsistent transfer of the token, and provide an immutable record of token transfers, and supports execution of a distributed state machine for execution of a smart contract;

each token representing a portion of a secured transaction secured by collateral representing a property interest in a productive asset, under a security agreement requiring tender of substitute collateral at the end of a term for outstanding interests in the secured transaction to relinquish the collateral;

the smart contract being automatically executed by the distributed state machine, having as inputs at least time, an ownership status of the plurality of tokens, and a substitute collateral status with respect to the plurality of tokens, and having as an output an indicator that permits operation of the productive asset on behalf of outstanding interests to fulfill obligations of the secured transaction; and the distributed ledger system being configured to transact changes in ownership of the token using the distributed ledger system.

* * * * *